United States Patent [19]
Katsuno et al.

[11] Patent Number: 4,739,614
[45] Date of Patent: Apr. 26, 1988

[54] DOUBLE AIR-FUEL RATIO SENSOR SYSTEM IN INTERNAL COMBUSTION ENGINE

[75] Inventors: Toshiyasu Katsuno, Susono; Nobuaki Kayanuma, Gotenba; Yasushi Sato, Mishima; Toshio Tanahashi, Susono; Yoshiki Chujo, Mishima; Toshinari Nagai, Susono; Kohichi Hasegawa, Mishima; Hironori Bessho, Susono; Takatoshi Masui, Mishima, all of Japan

[73] Assignee: Toyota Jidosha Kabushiki Kaisha, Aichi, Japan

[21] Appl. No.: 831,566

[22] Filed: Feb. 21, 1986

[30] Foreign Application Priority Data

| Feb. 22, 1985 | [JP] | Japan | 60-32861 |
|---|---|---|---|
| Feb. 22, 1985 | [JP] | Japan | 60-32862 |
| Feb. 22, 1985 | [JP] | Japan | 60-32863 |
| Feb. 23, 1985 | [JP] | Japan | 60-33673 |
| Mar. 14, 1985 | [JP] | Japan | 60-49376 |
| Mar. 16, 1985 | [JP] | Japan | 60-51584 |
| Jun. 13, 1985 | [JP] | Japan | 60-127121 |
| Jun. 17, 1985 | [JP] | Japan | 60-129906 |
| Jul. 29, 1985 | [JP] | Japan | 60-165673 |
| Aug. 1, 1985 | [JP] | Japan | 60-168527 |
| Dec. 21, 1985 | [JP] | Japan | 60-195910 |
| Dec. 27, 1985 | [JP] | Japan | 60-293299 |
| Jan. 9, 1986 | [JP] | Japan | 61-001282 |

[51] Int. Cl.$^4$ ............................................. F02D 41/14
[52] U.S. Cl. ......................................... 60/274; 60/276; 60/285; 123/479; 123/589
[58] Field of Search ............... 123/479, 440, 489, 589, 123/492; 60/276, 285, 274; 364/431.05

[56] References Cited

U.S. PATENT DOCUMENTS

| 3,939,654 | 2/1976 | Creps | 60/276 |
|---|---|---|---|
| 4,027,477 | 6/1977 | Storey | 60/276 |
| 4,127,088 | 11/1978 | Ezoe | 123/440 |
| 4,130,095 | 12/1978 | Bowler et al. | 123/440 |
| 4,177,787 | 12/1979 | Hattori et al. | 123/440 |
| 4,235,204 | 11/1980 | Rice | 123/440 |
| 4,244,340 | 1/1981 | Herth et al. | 123/479 |
| 4,251,989 | 2/1981 | Norimatsu et al. | 123/440 |
| 4,475,517 | 10/1984 | Kobayashi et al. | 123/489 |
| 4,502,443 | 3/1985 | Hasegawa et al. | 123/479 |
| 4,539,958 | 9/1985 | Ito et al. | 123/440 |
| 4,561,400 | 12/1985 | Hattori | 123/478 |
| 4,571,683 | 2/1986 | Kobayashi et al. | 364/431.05 |

FOREIGN PATENT DOCUMENTS

| 52-102934 | 8/1977 | Japan . |
|---|---|---|
| 53-103796 | 9/1978 | Japan . |
| 55-37562 | 3/1980 | Japan . |
| 57-32772 | 7/1982 | Japan . |
| 57-32773 | 7/1982 | Japan . |
| 57-32774 | 7/1982 | Japan . |
| 58-27848 | 2/1983 | Japan . |
| 58-53661 | 3/1983 | Japan . |
| 58-48755 | 3/1983 | Japan . |
| 58-48756 | 3/1983 | Japan . |
| 58-72646 | 4/1983 | Japan . |
| 58-72647 | 4/1983 | Japan . |
| 58-135343 | 8/1983 | Japan . |
| 58-152147 | 9/1983 | Japan . |
| 58-150038 | 9/1983 | Japan . |
| 58-150039 | 9/1983 | Japan . |
| 59-32644 | 2/1984 | Japan . |
| 59-206638 | 11/1984 | Japan . |
| 60-1340 | 1/1985 | Japan . |
| 60-26138 | 2/1985 | Japan . |
| 60-53635 | 3/1985 | Japan . |
| 61-34330 | 2/1986 | Japan . |
| 61-53436 | 3/1986 | Japan . |

*Primary Examiner*—Andrew M. Dolinar
*Attorney, Agent, or Firm*—Parkhurst & Oliff

[57] ABSTRACT

In a double air-fuel ratio sensor system including two air-fuel ratio sensors upstream and downstream of a catalyst converter provided in an exhaust passage, the actual air-fuel ratio is adjusted in accordance with an air-fuel ratio correction amount calculated by using the output of the upstream-side air-fuel ratio sensor and an air-fuel ratio feedback control parameter such as delay time periods, skip amounts, or integration amounts calculated by using the output of the downstream-side air-fuel ratio sensor, and the calculation of the air-fuel ratio feedback control parameter is prohibited when the downstream-side air-fuel ratio sensor is in an abnormal state.

108 Claims, 49 Drawing Sheets

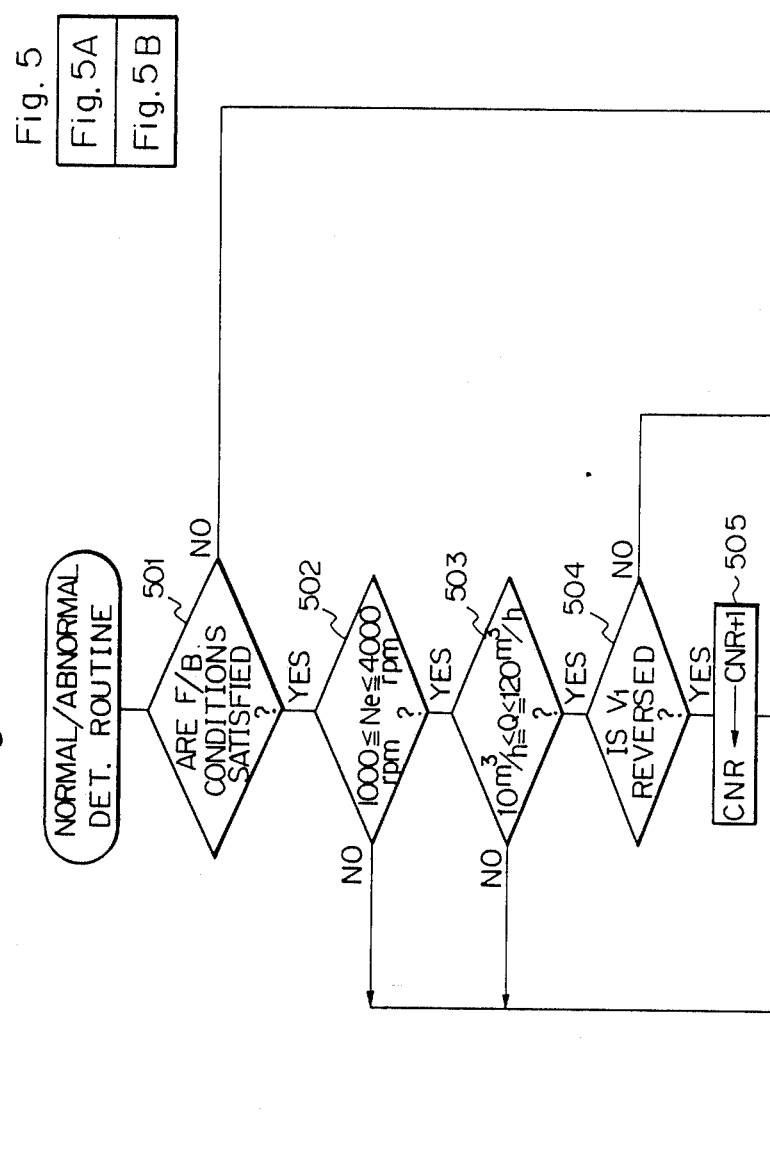

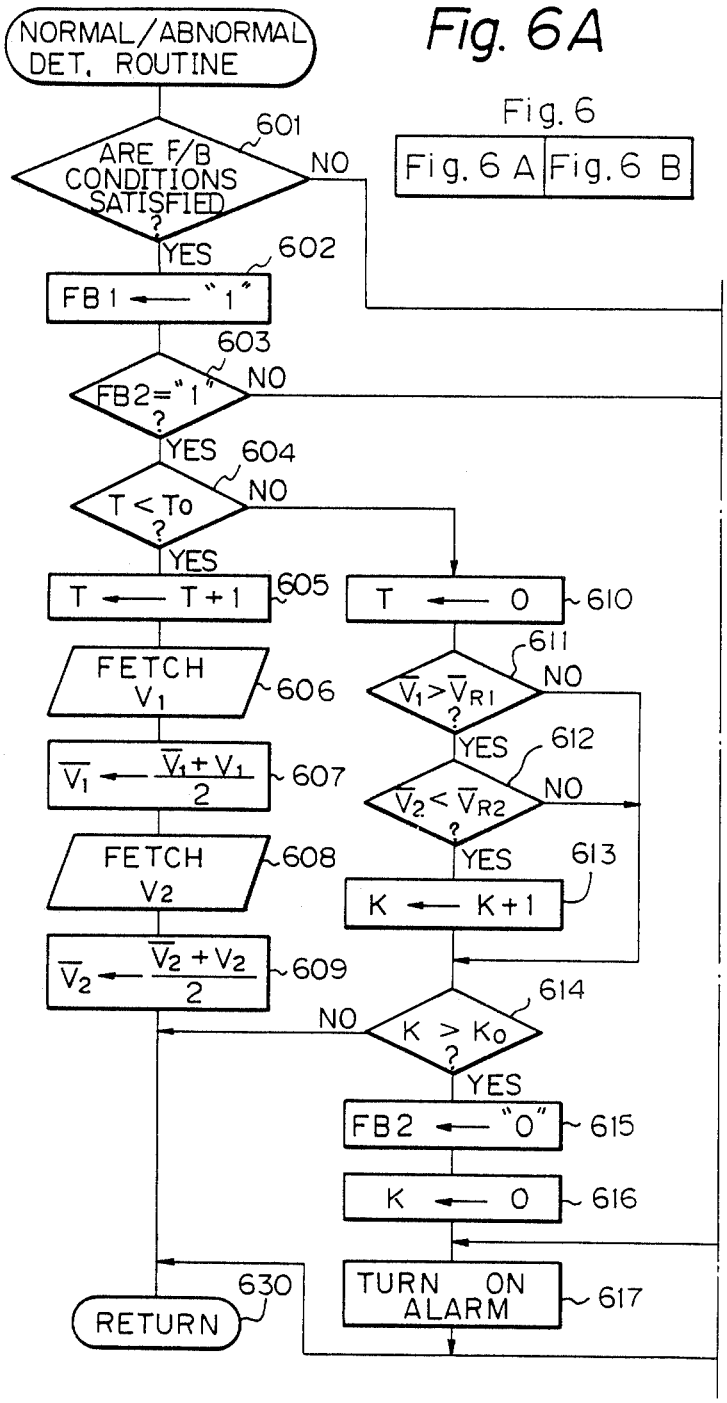

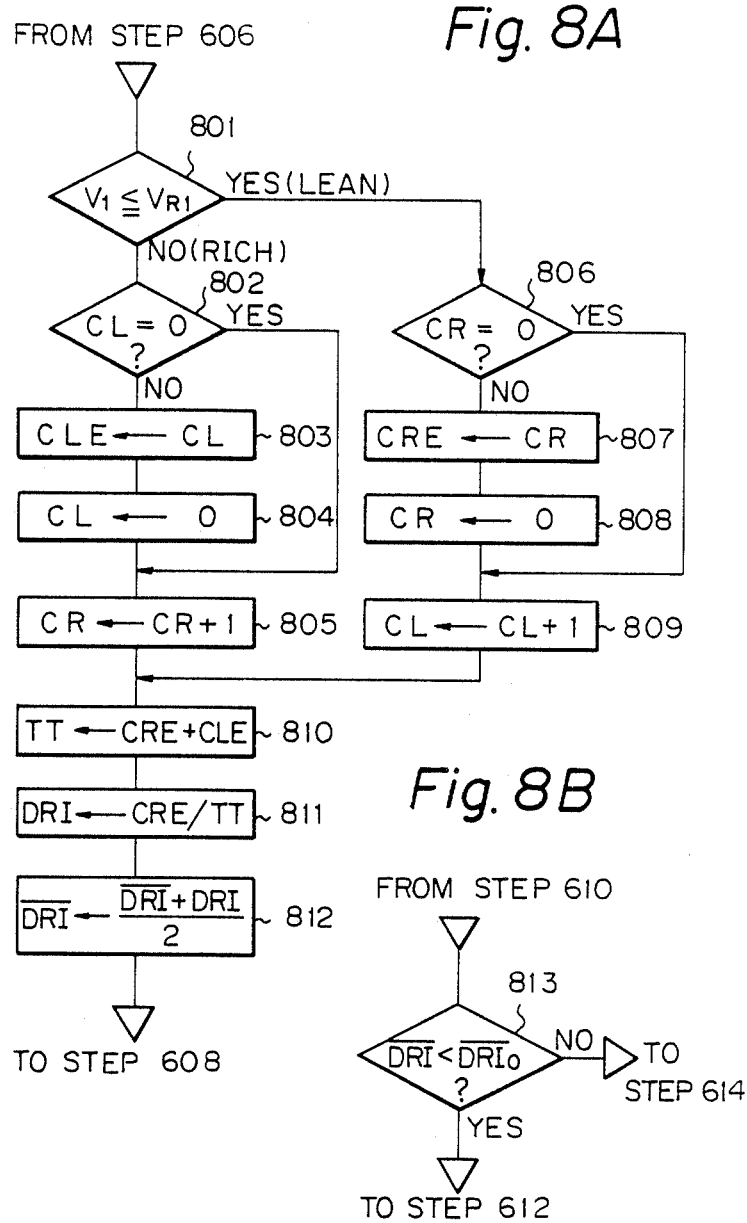

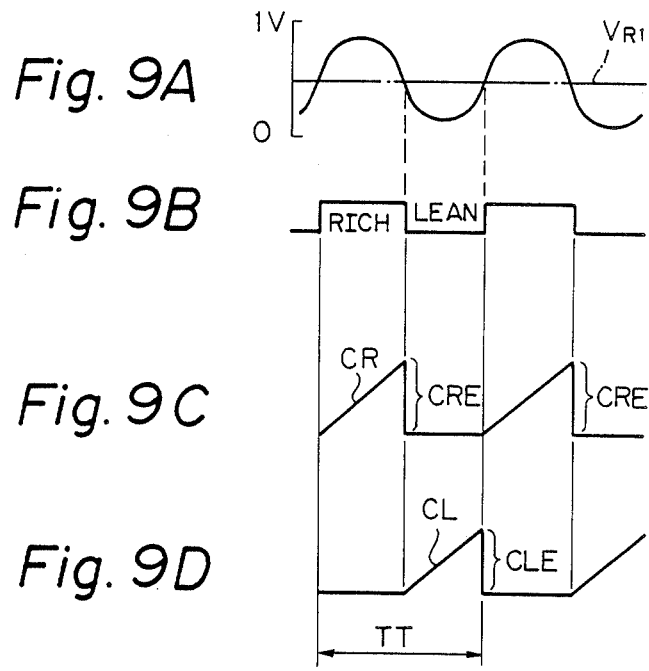

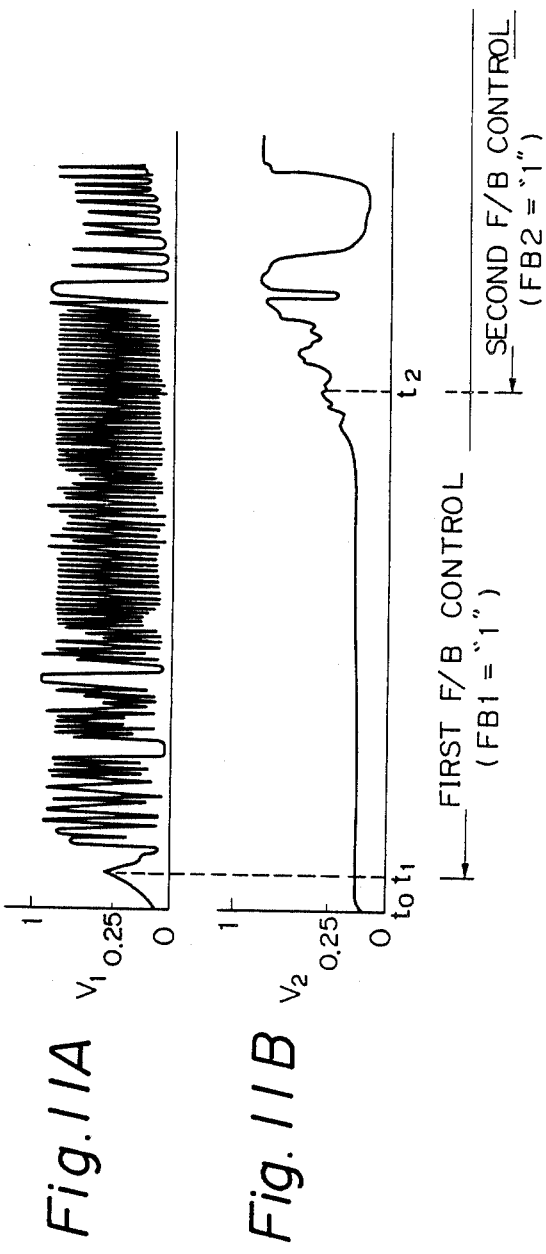

BEFORE DETERIORATION

AFTER DETERIORATION

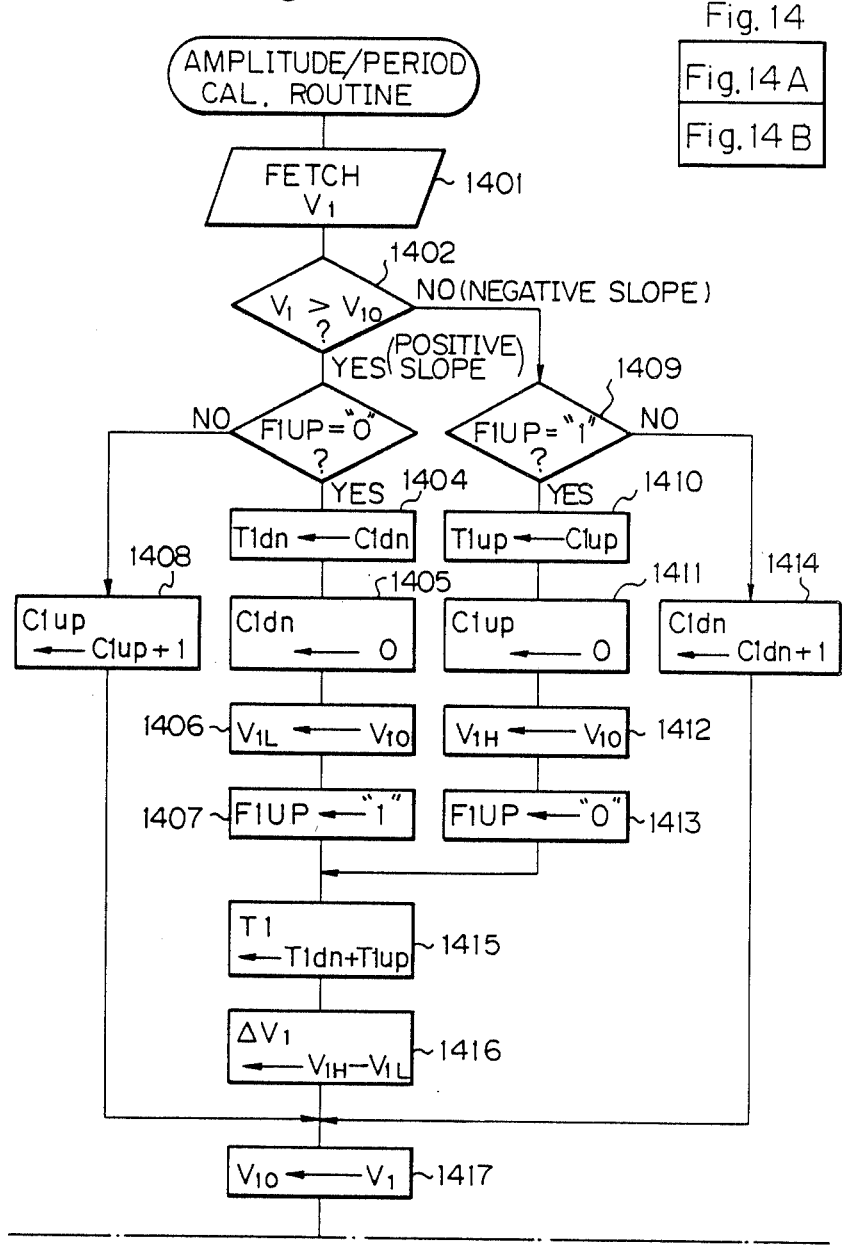

| Fig. 20A | Fig. 20B |

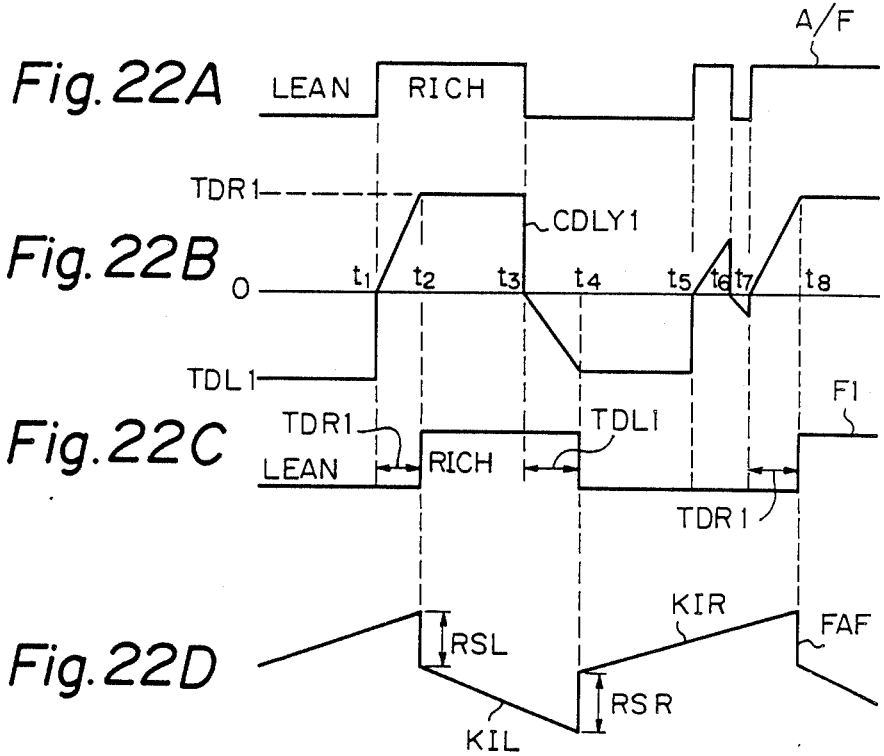

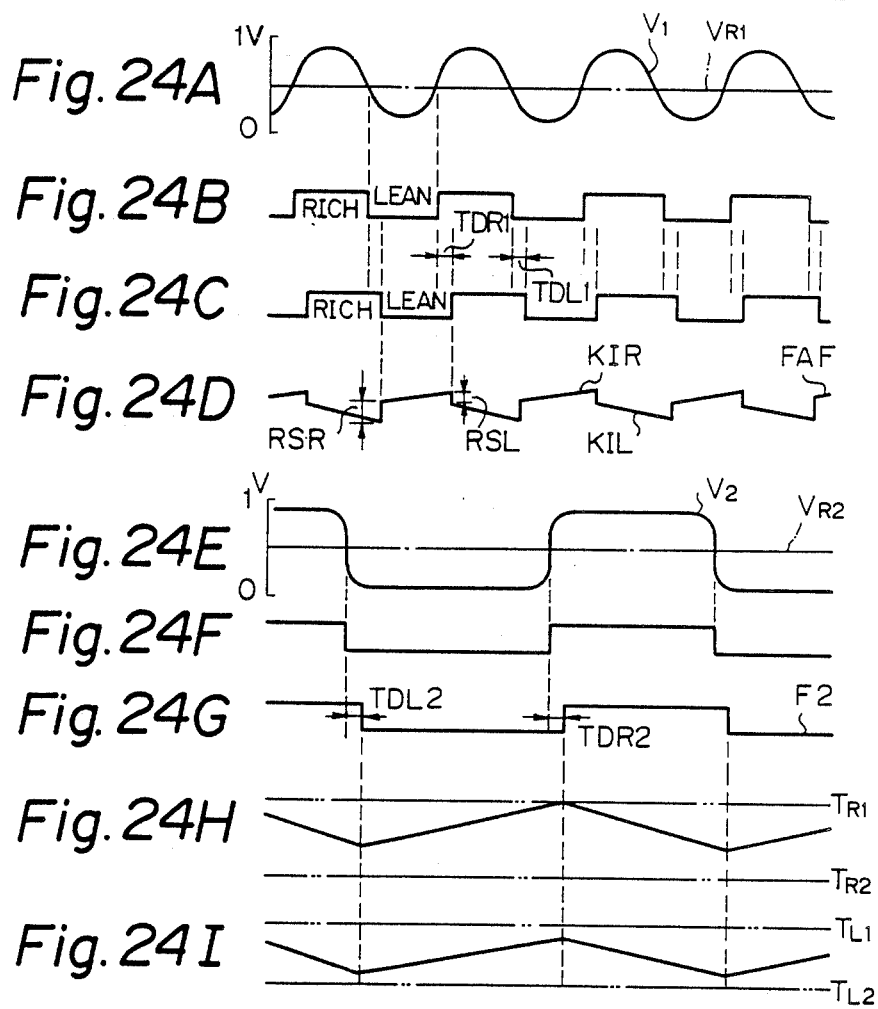

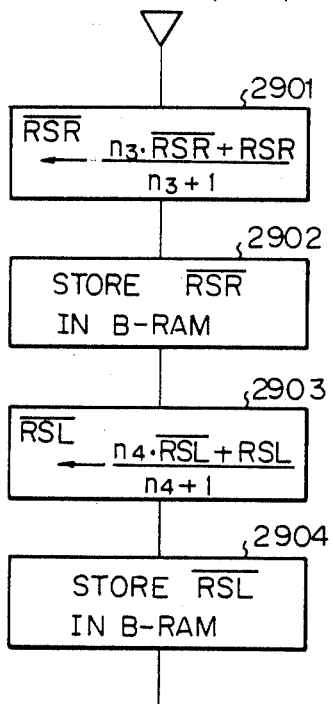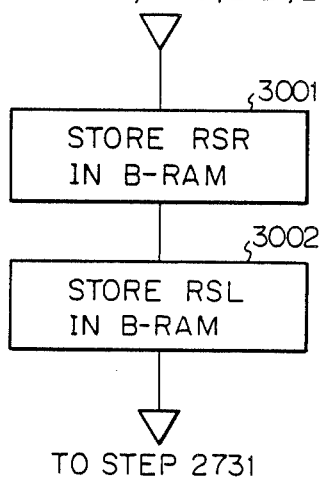

DOUBLE AIR-FUEL RATIO SENSOR SYSTEM IN INTERNAL COMBUSTION ENGINE

BACKGROUND OF THE INVENTION (1) Field of the Invention

The present invention relates to a method and apparatus for feedback control of an air-fuel ratio in an internal combustion engine having two air-fuel ratio sensors upstream and downstream of a catalyst converter disposed within an exhaust gas passage.

(2) Description of the Related Art

Generally, in a feedback control of the air-fuel ratio sensor ($O_2$ sensor) system, a base fuel amount TAUP is calculated in accordance with the detected intake air amount and detected engine speed, and the base fuel amount TAUP is corrected by an air-fuel ratio correction coefficient FAF which is calculated in accordance with the output signal of an air-fuel ratio sensor (for example, an $O_2$ sensor) for detecting the concentration of a specific component such as the oxygen component in the exhaust gas. Thus, an actual fuel amount is controlled in accordance with the corrected fuel amount. The above-mentioned process is repeated so that the air-fuel ratio of the engine is bright close to a stoichiometric air-fuel ratio. According to this feedback control, the center of the controlled air-fuel ratio can be within a very small range of air-fuel ratios around the stoichiometric ratio required for three-way reducing and oxidizing catalysts (catalyst converter) which can remove three pollutants CO, HC, and $NO_x$ simultaneously from the exhaust gas.

In the above-mentioned $O_2$ sensor system where the $O_2$ sensor is disposed at a location near the concentration portion of an exhaust manifold, i.e., upstream of the catalyst converter, the accuracy of the controlled air-fuel ratio is affected by individual differences in the characteristics of the parts of the engine, such as the $O_2$ sensor, the fuel injection valves, the exhaust gas recirculation (EGR) valve, the valve lifters, individual changes due to the aging of these parts, environmental changes, and the like. That is, if the characteristics of the $O_2$ sensor fluctuate, or if the uniformity of the exhaust gas fluctuates, the accuracy of the air-fuel ratio feedback correction amount FAF is also fluctuated, thereby causing fluctuations in the controlled air-fuel ratio.

To compensate for the fluctuation of the controlled air-fuel ratio, double $O_2$ sensor systems have been suggested (see: U.S. Pat. Nos. 3,939,654, 4,027,477, 4,130,095, 4,235,204). In a double $O_2$ sensor system, another $O_2$ sensor is provided downstream of the catalyst converter, and thus an air-fuel ratio control operation is carried out by the downstream-side $O_2$ sensor in addition to an air-fuel ratio control operation carried out by the upstream-side $O_2$ sensor. In the double $O_2$ sensor system, although the downstream-side $O_2$ sensor has lower response speed characteristics when compared with the upstream-side $O_2$ sensor, the downstream-side $O_2$ sensor has an advantage in that the output fluctuation characteristics are small when compared with those of the upstream-side $O_2$ sensor, for the following reasons:

(1) On the downstream side of the catalyst converter, the temperature of the exhaust gas is low, so that the downstream-side $O_2$ sensor is not affected by a high temperature exhaust gas.

(2) On the downstream side of the catalyst converter, although various kinds of pollutants are trapped in the catalyst converter, these pollutants have little affect on the downstream side $O_2$ sensor.

(3) On the downstream side of the catalyst converter, the exhaust gas is mixed so that the concentration of oxygen in the exhaust gas is approximately in an equilibrium state.

Therefore, according to the double $O_2$ sensor system, the fluctuation of the output of the upstream-side $O_2$ sensor is compensated for by a feedback control using the output of the downstream-side $O_2$ sensor. Actually, as illustrated in FIG. 1, in the worst case, the deterioration of the output characteristics of the $O_2$ sensor in a single $O_2$ sensor system directly effects a deterioration in the emission characteristics. On the other hand, in a double $O_2$ sensor system, even when the output characteristics of the upstream-side $O_2$ sensor are deteriorated, the emission characteristics are not deteriorated. That is, in a double $O_2$ sensor system, even if only the output characteristics of the downstream-side $O_2$ are stable, good emission characteristics are still obtained.

In the above-mentioned double $O_2$ sensor system, however, the downstream-side $O_2$ sensor is easily mechanically broken due to the impact of stones, water, mud, and the like thrown up from the road, when compared with the upstream-side $O_2$ sensor. As a result of a mechanical breakdown of the downstream-side air-fuel ratio sensor, when the output of the downstream-side air-fuel ratio sensor is inclined to the lean side, the controlled air-fuel ratio becomes overrich, thus deteriorating the fuel consumption, and the condition of the exhaust emissions such as HC and CO, and when the output of the downstream-side air-fuel ratio sensor is inclined to the lean side, the controlled air-fuel ratio sensor is inclined to the lean side and the controlled air-fuel ratio becomes overlean, thus deteriorating the drivability, and the condition of the exhaust emissions such as $NO_x$. Also, since the downstream-side air-fuel ratio sensor is located on a low temperature side when compared with the upstream-side air-fuel ratio sensor, it will take a relatively long time for the downstream-side air-fuel ratio sensor to be activated. Therefore, when a feedback control by the downstream-side air-fuel ratio sensor is carried out before the downstream-side air-fuel ratio sensor is activated, the controlled air-fuel ratio again becomes overrich or overlean due to the inclination of the output of the downstream-side air-fuel ratio sensor. Further, when the catalyst converter is deteriorated, the downstream-side air-fuel ratio sensor may be affected by unburned gas such as HC, CO, and $H_2$, thereby also deteriorating the output characteristics thereof. In this case, the controlled air-fuel ratio is fluctuated by a feedback control by the downstream-side air-fuel ratio sensor, thus also deteriorating the fuel consumption, the drivability, and the conditions of the exhaust emission characteristics for the HC, CO, and $NO_x$ components thereof.

SUMMARY OF THE INVENTION

It is an object of the present invention to provide a double air-fuel ratio sensor system in an internal combustion engine with which the fuel consumption, the drivability, and the exhaust emission characteristics are still improved even when the downstream-side $O_2$ sensor is in an abnormal state.

According to the present invention, in a double air-fuel ratio sensor system including two $O_2$ sensors upstream and downstream of a catalyst converter provided in an exhaust passage, the actual air-fuel ratio is adjusted in accordance with an air-fuel ratio correction amount calculated by using the output of the upstream-side $O_2$ sensor and an air-fuel ratio feedback control parameter such as delay time periods, skip amounts, or integration amounts calculated by using the output of the downstream-side air-fuel ratio sensor, and the calculation of the air-fuel ratio feedback control parameter is prohibited when the downstream-side $O_2$ sensor is in an abnormal state. That is, when the downstream-side $O_2$ sensor is mechanically broken, or in a nonactivation state, or when the characteristics of the catalyst converter have deteriorated, the feedback control by the downstream-side $O_2$ sensor is prohibited.

BRIEF DESCRIPTION OF THE DRAWINGS

The present invention will be more clearly understood from the description as set forth below with reference to the accompanying drawings, wherein:

FIGS. 5, 5A, 5B, 6, 6A, 6B, 7A, 7B, 8A, 8B, 10A, 10B, 14, 14A, 14B, 16, 20. 20A, 20B, 21, 21A–21C, 23, 23A, 23B, 25, 26, 27, 27A, 27B, 29, 30, 31, 31A, 31B, 33, 34, 35, 36, 36A, 36B and 37 are flow charts showing the operation of the control circuit of FIG. 2;

FIGS. 9A through 9D are timing diagrams explaining the flow charts of FIG. 8A;

FIGS. 11A and 11B are timing diagrams explaining the flow chart of FIG. 10A;

FIGS. 22A through 22D are timing diagrams explaining the flow chart of FIG. 21;

FIGS. 24A through 24I are timing diagrams explaining the flow chart of FIG. 23;

FIGS. 32A through 32I are timing diagrams explaining the flow chart of FIG. 31;

DESCRIPTION OF THE PREFERRED EMBODIMENTS

Figure 1:
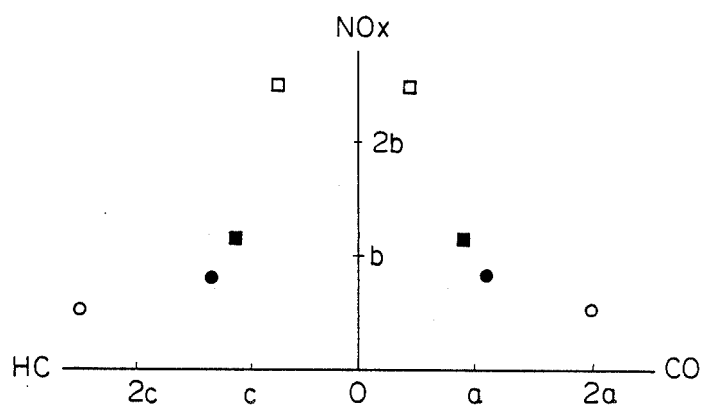
FIG. 1 is a graph showing the emission characteristics of a single $O_2$ sensor system (worst case) and a double $O_2$ sensor system.
Figure 2:
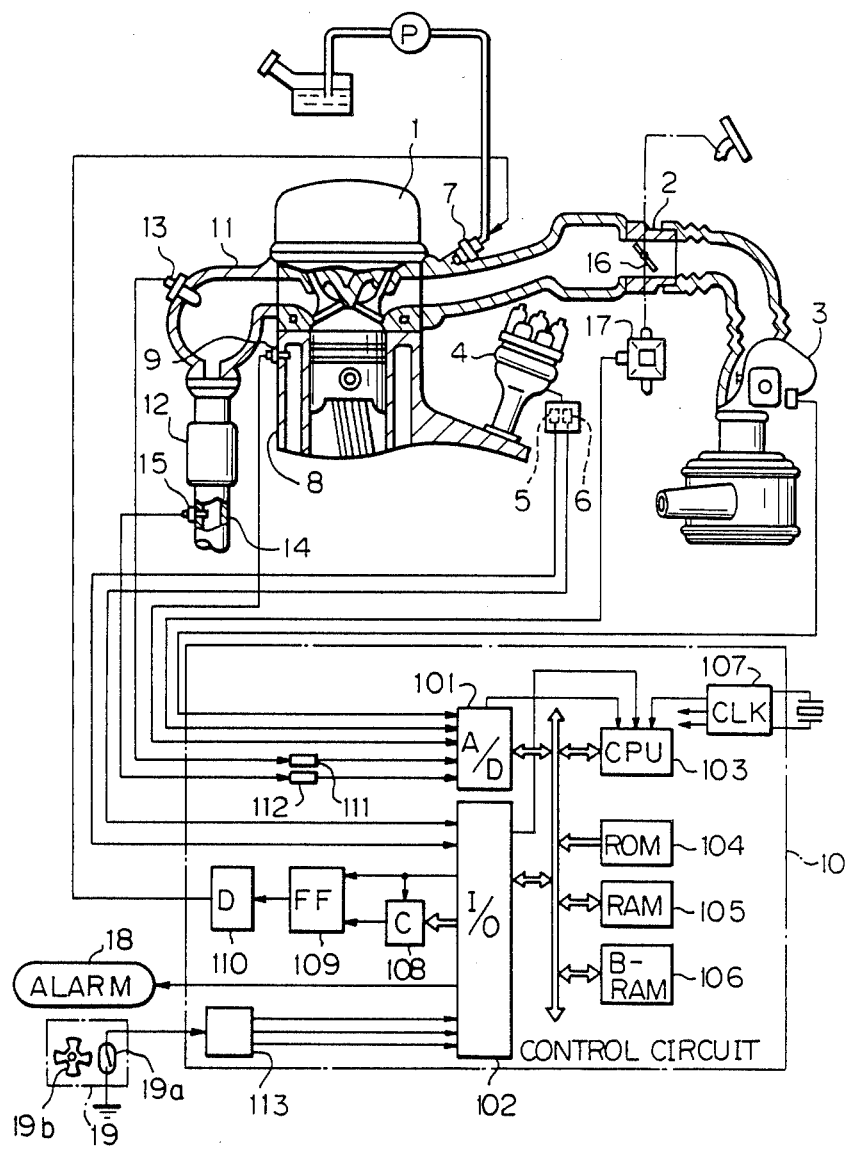
FIG. 2 is a schematic view of an internal combustion engine according to the present invention.

In FIG. 2, which illustrates an internal combustion engine according to the present invention, reference numeral 1 designates a four-cycle spark ignition engine disposed in an automotive vehicle. Provided in an air-intake passage 2 of the engine 1 is a potentiometer-type airflow meter 3 for detecting the amount of air taken into the engine 1 to generate an analog voltage signal in proportion to the amount of air flowing therethrough. The signal of the airflow meter 3 is transmitted to a multiplexer-incorporating analog-to-digital (A/D) converter 101 of a control circuit 10.

Disposed in a distributor 4 are crank angle sensors 5 and 6 for detecting the angle of the crankshaft (not shown) of the engine 1. In this case, the crank-angle sensor 5 generates a pulse signal at every 720° crank angle (CA) while the crank-angle sensor 6 generates a pulse signal at every 30°CA. The pulse signals of the crank angle sensors 5 and 6 are supplied to an input/output (I/O) interface 102 of the control circuit 10. In addition, the pulse signal of the crank angle sensor 6 is then supplied to an interruption terminal of a centeral processing unit (CPU) 103.

Additionally provided in the air-intake passage 2 is a fuel injection valve 7 for supplying pressurized fuel from the fuel system to the air-intake port of the cylinder of the engine 1. In this case, other fuel injection valves are also provided for other cylinders, though not shown in FIG. 2.

Disposed in a cylinder block 8 of the engine 1 is a coolant temperature sensor 9 for detecting the temperature of the coolant. The coolant temperature sensor 9 generates an analog voltage signal in response to the temperature of the coolant and transmits it to the A/D converter 101 of the control circuit 10.

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided on the concentration portion of the exhaust manifold 11, i.e., upstream of the catalyst converter 12, is a first $O_2$ sensor 13 for detecting the concentration of oxygen composition in the exhaust gas. Further, provided in an exhaust pipe 14 downstream of the catalyst converter 12 is a second $O_2$ sensor 15 for detecting the concentration of oxygen composition in the exhaust gas. The $O_2$ sensors 13 and 15 generate output voltage signals and transmit them via signal processing circuits 111 and 112 to the A/D converter 101 of the control circuit 10.

Provided in the intake air passage 2 is a throttle valve 16 arbitrarily operated by a driver. Also, fixed to the throttle valve 16 is a throttle opening sensor 17 for detecting the angle of the throttle valve 16. The output of the throttle opening sensor 17 is supplied to the A/D converter 101 of the control circuit 10.

Reference numeral 18 designates an alarm, and 19 a vehicle speed sensor formed by a lead switch 19a and a permanent magnet 19b. In the vehicle speed sensor 19, when the permanent magnet 19b is rotated by the speed meter cable (not shown), the lead switch 19a is switched on and off, to generate a pulse signal having a frequency in proportion to the vehicle speed SPD. The pulse signal is transmitted via a vehicle speed generating circuit 113 to the I/O interface 102 of the control circuit 10.

The control circuit 10, which may be constructed by a microcomputer, further comprises a central processing unit (CPU) 103, a read-only memory (ROM) 104 for storing a main routine, interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note that the battery (not shown) is connected directly to the backup RAM 106 and, therefore, the content thereof is never erased even when the ignition switch (not shown) is turned off.

The down counter 108, the flip-flop 109, and the driver circuit 110 are used for controlling the fuel injection valve 7. That is, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the carry-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103, when the A/D converter 101 completes an A/D conversion and generates an interrupt signal; when the crank angle sensor 6 generates a pulse signal; and when the clock generator 109 generates a special clock signal.

The intake air amount data Q of the airflow meter 3, the coolant temperature data THW of the coolant sensor 9, and the throttle angle data TA of the throttle opening sensor 17 are fetched by an A/D conversion routine(s) executed at every predetermined time period and are then stored in the RAM 105. That is, the data Q, THW, and TA in the RAM 105 are renewed at every predetermined time period. The engine speed Ne is calculated by an interrupt routine executed at 30°CA, i.e., at every pulse signal of the crank angle sensor 6, and is then stored in the RAM 105.

Figure 3A:
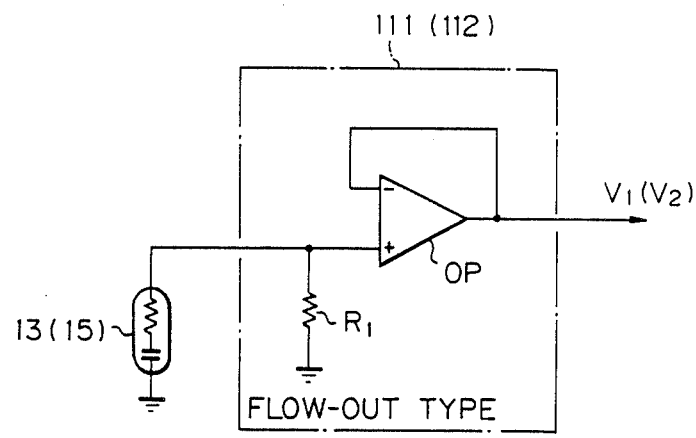
FIGS. 3A and 3B are circuit diagrams of the signal processing circuits of FIG. 2.
Figure 3B:
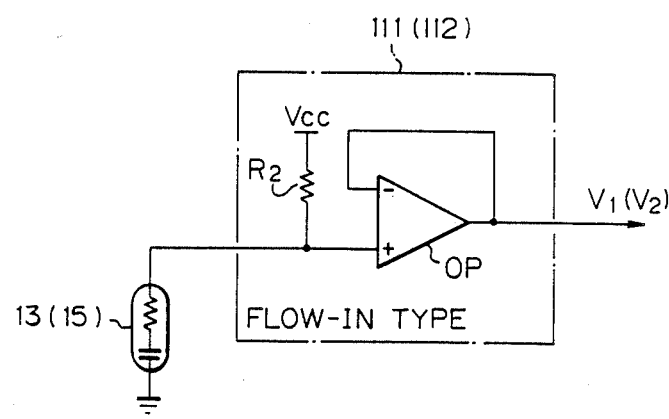
Figure 4A:
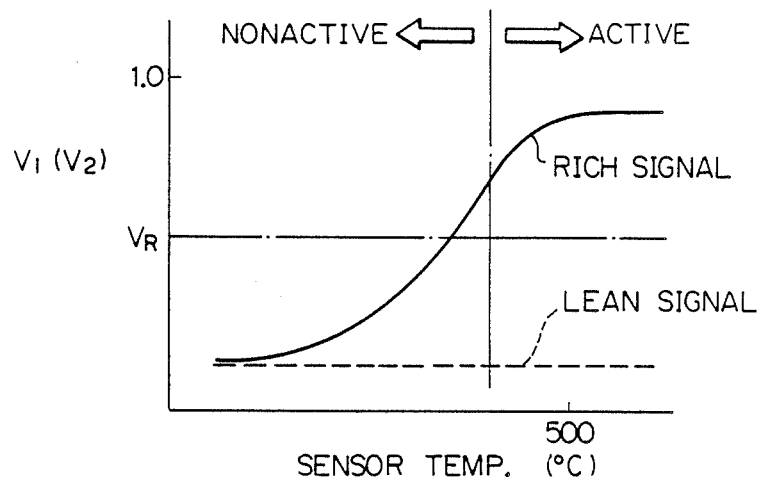
FIGS. 4A and 4B are graphs showing the output characteristics of the signal processing circuits of FIGS. 3A and 3B, respectively.
Figure 4B:
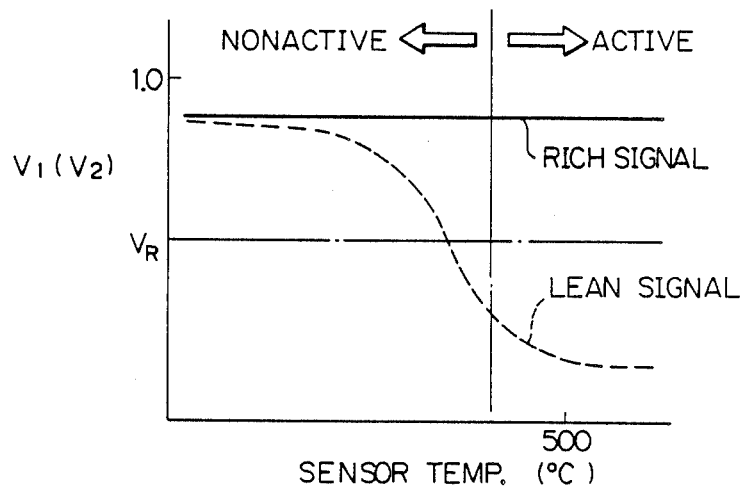

There are two types of signal processing circuits 111 and 112, i.e., the flow-out type and the flow-in type. As illustrated in FIG. 3A, the flow-out type signal processing circuit comprises a grounded resistor $R_1$ and a voltage buffer OP. Therefore, as shown in FIG. 4A, when the temperature of the $O_2$ sensor 13 (or 15) is low and the $O_2$ sensor 13 (or 15) is in a nonactive state, the output of the signal processing circuit 111 (or 112) is low, due to sink currents by the resistor $R_1$, regardless of the rich or lean state of the $O_2$ sensor 13 (or 15). Contrary to this, when the $O_2$ sensor 13 (or 15) is activated by an increase of the temperature of the signal processing circuit 111 (or 112) generates a rich signal which has a high potential or a lean signal which has a low potential. Therefore, in this case, the activation/deactivation state of the $O_2$ sensor 13 (or 15) can be determined by whether a rich signal is low or high. On the other hand, as illustrated in FIG. 3B, the flow-in type signal processing circuit comprises a resistor $R_2$ connected to a power supply $V_{CC}$ and a voltage buffer OP. Therefore, when the temperature of the $O_2$ sensor 13 (or 15) is low and the $O_2$ sensor 13 (or 15) is in a nonactive state, the output of the signal processing circuit 111 (or 112) is high, due to source currents by the resistor $R_2$, regardless of the rich or lean stage of the $O_2$ sensor 13 (or 15). Contrary to this, when the $O_2$ sensor 13 (or 15) is activated by an increase of the temperature thereof, the signal processing circuit 111 (or 112) generates a high potential rich signal or a low potential lean signal. Therefore, in this case, the activation/deactivation state of the $O_2$ sensor 13 (or 15) can be determined by whether a lean signal is low or high.

Note that, hereinafter, the signal processing circuits 111 and 112 are the flow-out type.

The operation of the control circuit 2 of FIG. 2 will be now explained.

Figure 5B:
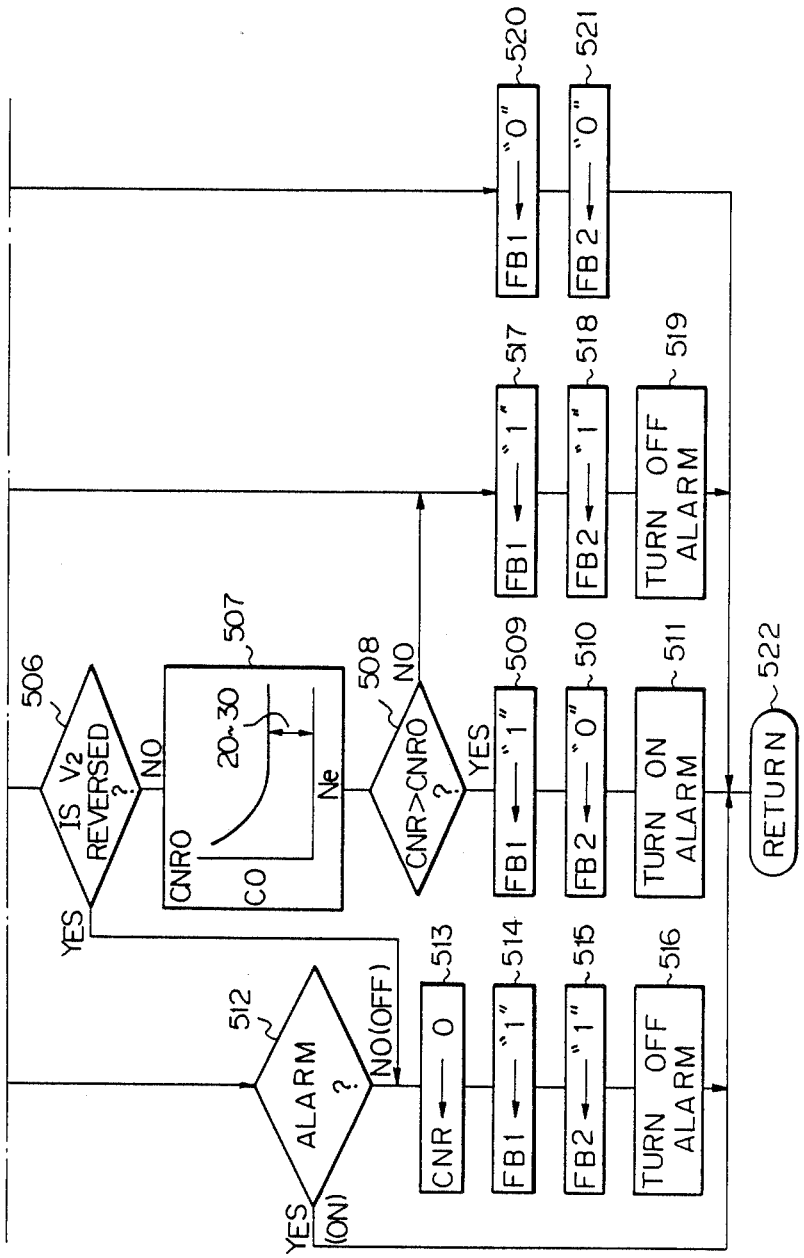

FIG. 5 is a routine for determining whether the $O_2$ sensors 13 and 15 are normal or abnormal, executed at every predetermined time period such as 4 ms. That is, when the upstream-side $O_2$ sensor 13 is in a normal state, an air-fuel ratio feedback control execution flag FB1 is set to carry out an air-fuel ratio feedback control by the upstream-side $O_2$ sensor 13. Also, when the downstream-side $O_2$ sensor 15 is in a normal state, an air-fuel ratio feedback control execution flag FB2 is set to carry out an air-fuel ratio feedback control by the downstream-side $O_2$ sensor 15.

At step 501, it is determined whether or not all the feedback control (closed-loop control) conditions are satisfied. The feedback control conditions are as follows:

(i) the engine is not in a starting state;
(ii) the coolant temperature THW is higher than 50° C.; and
(iii) the power fuel increment FPOWER is 0.

Of course, other feedback control conditions are introduced as occasion demands. However, an explanation of such other feedback control conditions is omitted. Also, the feedback control conditions by the upstream-side $O_2$ sensor 13 can be different from those by the downstream-side $O_2$ sensor 15.

If one or more of the feedback control conditions is not satisfied, the control proceeds to step 520 which clears the feedback control execution flag FB1, and further proceeds to step 521, which clears the feedback control execution flag FB2. That is, none of the air-fuel ratio feedback controls are carried out.

Contrary to the above, at step 501, if all of the feedback control conditions are satisfied, the control proceeds to step 502.

At step 502, the engine speed data Ne is read out of the RAM 105, and it is determined whether or not 1000 rpm$\leq$Ne$\leq$4000 rpm. Only if 1000 rpm$\leq$Ne$\leq$4000 rpm, does the control proceed to step 503. That is, when the engine speed Ne is to small, the response speed of the downstream-side $O_2$ sensor 15 is reduced, so that the normal/abnormal determination of the downstream-side $0_2$ sensor 15 is suspended. Contrary to this, when the engine speed Ne is too large, so that the air-fuel control enters into a rich air-fuel ratio region, the controlled air-fuel ratio invites hunting at the boundary of such a rich air-fuel region. Thus, also in this case, the normal/abnormal determination of the downstream-side $O_2$ sensor 15 is suspended.

Similarly, at step 503, the intake air amount data Q is read out of the RAM 105, and it is determined whether or not 10 m$^3$/h≦Q≦120 m$^3$/h. Only if 10 m$^3$/h≦Q≦120 m$^3$/h, does the control proceed to step 504. That is, the intake air amount Q is too small, the response speed of the downstream-side $O_2$ sensor 15 is reduced, so that the normal/abnormal determination of the downstream-side $O_2$ sensor 15 is suspended. Contrary to this, when the Ne is too large, so that the air-fuel control also enters into a rich air-fuel region, the controlled air-fuel ratio invites hunting at the boundary of such a rich air-fuel region. Thus, in this case also, the normal/abnormal determination of the downstream-side $O_2$ sensor 15 is suspended.

Note that one of the steps 502 and 503 can be deleted, and the upper and lower limits of Ne and Q can be changed as occasion demands.

At step 504, it is determined whether or not the output $V_1$ of the upstream-side $O_2$ sensor 13 is reversed. In this case, a lean state is determined by $V_1 \leq 0.45$ V, and a rich state is determined by $V_1 > 0.45$ V. As a result, one reversion from the lean state to the rich state or vice versa is generated in the output $V_1$ of the upstream-side $O_2$ sensor 13, and the control proceeds to step 505 which counts up a reversion counter CNR by 1. Otherwise, the control proceeds to steps 517 and 518 which set the air-fuel ratio feedback control execution flags FB1 and FB2, thereby carrying out feedback controls by the upstream-side $O_2$ sensor 13 and the downstream-side $O_2$ sensor 15. Further, at step 519, if the alarm 18 is being turned ON, the alarm 18 is turned OFF.

At step 506, it is determined whether or not the output $V_2$ of the downstream-side $O_2$ sensor 15 is reversed. In this case, a lean state is determined by $V_1 \leq 0.55$ V, and a rich state is determined by $V_1 > 0.55$ V. As a result, when no reversion is generated in the output $V_2$ of the downstream-side $O_2$ sensor 15, the control proceeds to step 507 which calculates a reference value CNRO from a one-dimensional map stored in the RAM 105 by using the load parameter such as the engine speed Ne. In this case, since the reduction of the engine speed Ne reduces the response speed of the downstream-side $O_2$ sensor 15, the reference value CNRO is increased when the engine speed Ne is reduced. Then, at step 507, it is determined whether or not CNR>CNRO.

Note that, due to the difference in the characteristics of the upstream-side $O_2$ sensor 13 and the downstream-side $O_2$ sensor 15, the reference voltage (=0.55 V) at step 506 is higher than the reference voltage (=0.45 V) at step 504.

If CNR≦CNRO at step 508, the downstream-side $O_2$ sensor 15 is neither deteriorated nor mechanically broken, and accordingly, the control proceeds to steps 517 and 518 which set both of the feedback control execution flags FB1 and FB2, thereby carrying out feedback controls by the upstream-side $O_2$ sensor 13 and the downstream-side $O_2$ sensor 15. Further, at step 519, if the alarm 18 is being turned ON, the alarm 18 is turned OFF.

If CNR>CNRO, the control proceeds to step 509 which sets the feedback control execution flag FB1, and then proceeds to step 510 which clears the feedback control execution flag FB2, thereby carrying out only feedback control by the upstream-side $O_2$ sensor 13.

Further, at step 511, the alarm 18 is turned ON. Thus, after the reversion of the output of the downstream-side $O_2$ sensor 15, when the number of reversions of the upstream-side $O_2$ sensor 15 exceeds the reference value CNRO, it is considered that the downstream-side $O_2$ sensor 15 is deteriorated or mechanically broken.

On the other hand, if the determination at step 502 or 503 is negative, the control proceeds to step 512 which determines whether or not the alarm is being turned ON. As a result, if the alarm is being turned ON, the control proceeds directly to step 522. That is, the feedback control execution flags FB1 and FB2 remain at a previous state. In this case, since at least the feedback control execution flag FB2 is made "0" by the flow of steps 509 through 511 or the flow of steps 520 and 521, at least the feedback control by the downstream-side $O_2$ sensor 15 is suspended.

If it is determined at step 512 that the alarm 18 is not turned ON, or if it is determined at step 506 that the output of the downstream-side $O_2$ sensor 15 is reversed, the control proceeds to step 513, which clears the counter CNR, and then proceeds to steps 514 and 515, which set the air-fuel ratio feedback control execution flags FB1 and FB2, thereby carrying out feedback controls by the upstream-side $O_2$ sensor 13 and the downstream-side $O_2$ sensor 15. Further, at step 516, if the alarm 18 is being turned ON, the alarm 18 is turned OFF.

Note that when the alarm is once turned ON at step 511, this can be written into the backup RAM 106, thereby causing an inspection of the downstream-side $O_2$ sensor 15 afterwards.

Figure 6B:
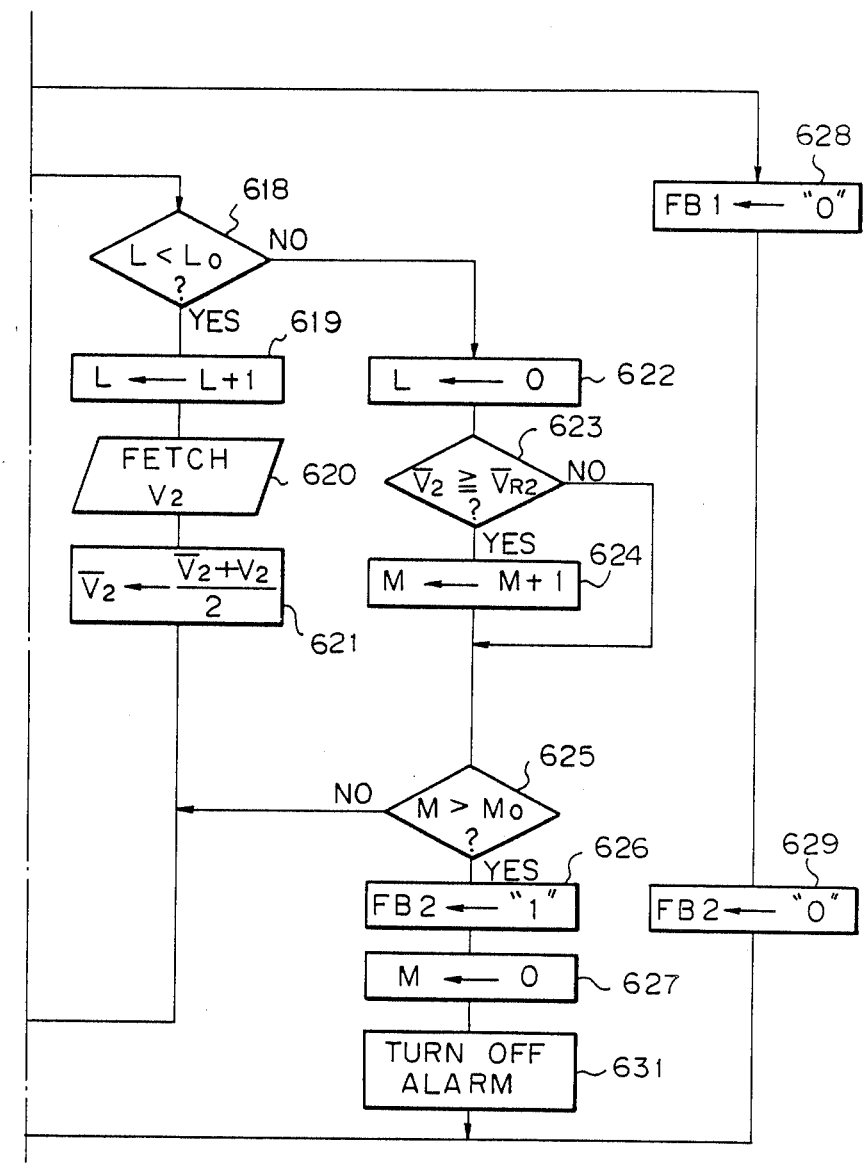

FIG. 6 is also a routine for determining whether the $O_2$ sensor 13 and 15 are normal or abnormal, executed at every predetermined time period. Note that counters T, K, L, and M are cleared by the initial routine (not shown).

At step 601, it is determined whether or not all of the feedback control (closed-loop control) conditions are satisfied in the same way as at step 501 of FIG. 5. Also, in this case, if one or more of the feedback control conditions is not satisfied, the control proceeds to step 628 which clears the feedback control execution flag FB1, and further proceeds to step 628 which clears the feedback control execution flag FB2. That is, none of the air-fuel ratio feedback controls are carried out.

Contrary to the above, at step 601, if all of the feedback control conditions are satisfied, the control proceeds to step 602 which sets the feedback control execution flag FB1 thereby carrying out a feedback control by the upstream-side $O_2$ sensor 13.

At step 603, it is determined whether or not the feedback control execution flag FB2 is "1". If FB2+"1", the control proceeds to steps 604 through 617 for detecting that the downstream-side sensor 15 is abnormal, and if FB2="0", the control proceeds to steps 618 through 627 for determining that the downstream-side $O_2$ sensor 15 is recovered.

Steps 604 to 617 will be explained below. At step 604, it is determined whether or not the value of the counter T is smaller than a predetermined value $T_0$. As a result, if $T < T_0$, the control proceeds to step 605 which counts up the counter T by 1, and then, at step 606, an A/D conversion operation is performed upon the output $V_1$ of the upstream-side $O_2$ sensor 13 (precisely, the output of the signal processing circuit 111). At step 607, the mean or blunt value $\bar{V}_1$ of the output $V_1$ of the upstream-side $O_2$ sensor 13 is calculated by $$\overline{V}_1 \leftarrow \frac{V_1 + V_1}{2}.$$

Then, at step 608, an A/D conversion operation is performed upon the output $V_2$ of the downstream-side $O_2$ sensor 15 (precisely, the output of the signal processing circuit 112). At step 609, the means or blunt value $\overline{V}_2$ of the output $V_2$ of the upstream-side $O_2$ sensor 15 is calculated by $$\overline{V}_2 \leftarrow \frac{V_2 + V_2}{2}.$$

Then, the control proceeds to step 630.

Thus, when the flow at step 605 through 609 is repeated so that the counter T reaches the predetermined value $T_0$, the flow at step 604 proceeds to step 610. As a result, the counter T is cleared, and at step 611, it is determined whether or not $$\overline{V}_1 > \overline{V}_{R1}$$

where $\overline{V}_{R1}$ is, for example, 0.45 V. That is, the determination at step 611 relates to whether or not the flow-out type signal processing circuit 111 generates a rich signal during an active mode. If $\overline{V}_1 > \overline{V}_{R1}$, the control proceeds to step 612 which determines whether or not $$\overline{V}_2 < \overline{V}_{R2}$$

where $\overline{V}_{R2}$ is, for example, 0.30 V. That is, the determination at step 612 relates to whether or not the signal processing circuit 112 of a flow-out type generates a lean signal.

If $\overline{V}_2 < \overline{V}_{R2}$ at step 612, then the control proceeds to step 613 which counts up the counter K by 1. Note that the counter K represents the duration for which the downstream-side $O_2$ sensor 15 (precisely, the signal processing circuit 112) generates a lean signal.

At step 614, it is determined whether $K > K_0$ where $K_0$ is a predetermined value. If $K > K_0$, the control proceeds to step 615 which clears the feedback control execution flag FB2, so that a feedback control by the downstream-side $O_2$ sensor 15 is not carried out. Then, at step 616, the counter K is cleared, and at step 617, the alarm 18 is turned ON. Thus, this routine is completed by step 630.

After the feedback control execution flag FB2 is set, when the routine of FIG. 6 is again carried out, the flow at step 603 proceeds to the flow of steps 618 through 627, which will be explained below.

At step 618, it is determined whether or not the value of the counter L is smaller than a predetermined value $L_0$. As a result, when $L < L_0$, the control proceeds to step 619 which counts up the counter L by 1. Then at step 620, an A/D conversion is performed upon the output $V_2$ of the downstream-side $O_2$ sensor 15, and at step 621, the mean or blunt value $\overline{V}_2$ of the output $V_2$ of the downstream-side $O_2$ sensor is calculated by $$\overline{V}_2 \leftarrow \frac{V_2 + V_2}{2}.$$

Then at step 617, the alarm 18 remains in an ON State, thus completing this routine by step 630.

Thus, when the flow at steps 618 through 621 and 617 is repeated so that the counter L reaches the predetermined value $L_0$, the flow at step 617 proceeds to step 622. As a result, the counter L is cleared, and at step 623, it is determined whether or not $$\overline{V}_2 \geq \overline{V}_{R2}.$$

That is, the determination at step 623 is opposite to that at step 612, and relates to whether or not the flow-out type signal processing circuit 112 generates a rich signal during an active mode. Only when $\overline{V}_2 \geq \overline{V}_{R2}$, does the control proceed to step 624 which counts up the counter M by 1. Note that the counter M represents the duration for which the downstream-side $O_2$ sensor 15 (precisely, the signal processing circuit 112) generates a rich signal during an active mode.

At step 625, it is determined whether $M > M_0$ where $M_0$ is a predetermined value. If $M > M_0$, the control proceeds to step 626 which sets the feedback control execution flag FB2, thereby carrying out a feedback control by the downstream-side $O_2$ sensor 15. That is, in this case, it is considered that the downstream-side $O_2$ sensor 15 is activated, or is recovered to the normal state from an abnormal state. Then, at step 631, the alarm 18 is turned OFF, and this routine is completed by step 630.

Thus, when the feedback control execution flag FB2 is set, the flow at step 603 again proceeds to steps 604 through 617.

As explained above, when the mean or blunt value $\overline{V}_1$ of the output $V_1$ of the upstream-side $O_2$ sensor 13 represents a rich signal during an active mode, and the mean or blunt value $\overline{V}_2$ of the output $V_2$ of the downstream-side $O_2$ sensor 15 represents a lean signal, the duration thereof is counted by the counter K. As a result, when this duration exceeds a predetermined time period, it is considered that the downstream-side $O_2$ sensor 15 is in an abnormal state. Also, when the downstream-side $O_2$ sensor 15 is in an abnormal state and the mean or blunt value $\overline{V}_2$ of the output $V_2$ of the downstream-side $O_2$ sensor 15 represents a rich signal during an active mode, the duration thereof is counted by the counter M. As a result, when this duration exceeds a predetermined time period, it is considered that the downstream-side $O_2$ sensor 15 has recovered to the normal state.

Note that if the signal processing circuits 111 and 112 are of a flow-in type as shown in FIG. 3B, at step 611, it is determined whether or not $\overline{V}_1 < \overline{V}_{R1}$ is satisfied; at step 612, it is determined whether or not $\overline{V}_2 > \overline{V}_{R2}$ is satisfied; and at step 623, it is determined whether or not $\overline{V}_2 \leq \overline{V}_{R2}$ is satisfied. That is, in this case, when the mean or blunt value $\overline{V}_1$ of the output $V_1$ of the upstream-side $O_2$ sensor 13 represents a lean signal during an active mode and the mean or blunt value $\overline{V}_2$ of the output $V_2$ of the downstream-side $O_2$ sensor 15 represents a rich signal, the duration thereof is counted by the counter K. As a result, when this duration exceeds a predetermined time period, it is considered that the downstream-side $O_2$ sensor 15 is in an abnormal state. Also, when the downstream-side $O_2$ sensor 15 is in an abnormal state and the mean or blunt value $\overline{V}_2$ of the output $V_2$ of the downstream-side $O_2$ sensor 15 represents a lean signal during an active mode, the duration thereof is counted by the counter M. As a result, when this duration exceeds a predetermined time period, it is considered that the downsteam-side $O_2$ sensor 15 has recovered to the normal state.

Figure 7A:
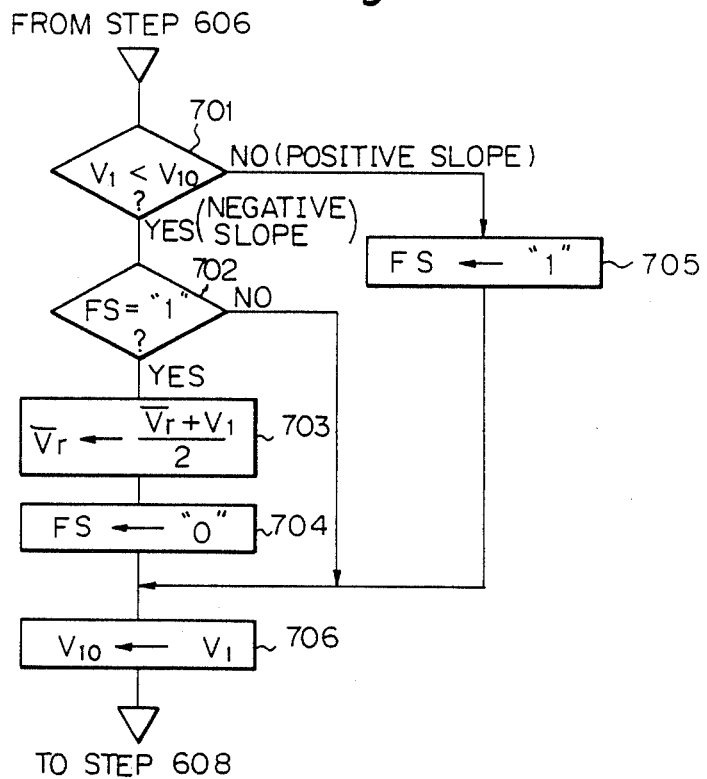
Figure 7B:
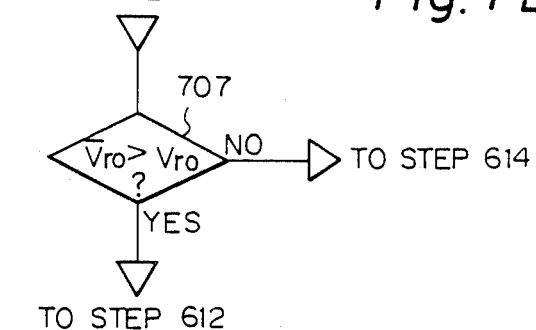

FIG. 7A is a modification of the flow at step 607 of FIG. 6 and FIG. 7B is a modification of the flow at step 611 of FIG. 6. That is, at step 701, it is determined whether or not $V_1 < V_{10}$ is satisfied. Here, $V_{10}$ is a value of the output $V_1$ of the upstream-side $O_2$ sensor 13 obtained at a previous execution of this routine. If $V_1 < V_{10}$ (negative slope), the control proceeds to step 702 which determines whether or not a slope flag FS is "1" (positive slope). If FS="1", this means that the slope of the output $V_1$ of the upstream-side $O_2$ sensor 15 is changed from positive to negative, i.e., a maximum value is detected in the output $V_1$ of the upstream-side $O_2$ sensor 13. Therefore, in this case, at step 703, the mean or blunt value $\overline{V}_r$ of the output $V_1$ of the upstream-side $O_2$ sensor 15 is calculated by $$V_r \leftarrow \frac{V_r + V_1}{2}.$$

At step 704, the slope flag FS is cleared, and at step 706, in order to prepare the next execution, $$V_{10} \leftarrow V_1.$$

Also, at step 702, when the slope flag FS is "0", the slope of the output $V_1$ of the upstream-side $O_2$ sensor 13 remains negative, so that the control proceeds directly to step 706. Further, at step 701, when $V_1 \geq V_{10}$ (positive slope), the control proceeds to step 705 which sets the slope flag FS, and then proceeds to step 706.

On the other hand, at step 707 of FIG. 7B, it is determined whether or not $\overline{V}_r > \overline{V}_{r0}$ is satisfied. Here, for example, $\overline{V}_{r0}$ is 0.7 V.

Thus, in the routine of FIG. 6 modified by FIGS. 7A and 7B, when the mean or blunt value $\overline{V}_r$ of maximum value $V_r$ of the output $V_1$ of the upstream-side $O_2$ sensor 13 represents a high level, i.e., a rich signal during an active mode and the mean or blunt value $\overline{V}_2$ of the output $V_2$ of the downstream-side $O_2$ sensor 15 represents a lean signal, the duration is counted by the counter K. As a result, when this duration exceeds a predetermined time period, it is considered that the downstream-side $O_2$ sensor 15 is in an abnormal state. Also, when the downstream-side $O_2$ sensor 15 is in an abnormal state and the means or blunt value $\overline{V}_2$ of the output $V_2$ of the downstream-side $O_2$ sensor 15 represents a rich signal during an active mode, the duration is counted by the counter M. As a result, when this duration exceeds a predetermined time period, it is considered that the downstream-side $O_2$ sensor 15 has recovered to the normal state.

Note that if the signal processing circuits 111 and 112 are of a flow-in type as shown in FIG. 3B, at step 701, it is determined whether or not $V_1 > V_{10}$ is satisfied, and at step 707, it is determined whether or not $\overline{V}_r < \overline{V}_{r0}'$ is satisfied. Here, for example, $V_{r0}'$ is 0.3 V, and $\overline{V}_r$ represents the minimum mean or blunt value of the output $V_1$ of the upstream-side $O_2$ sensor 13. Therefore, in this case, when the minimum mean or blunt value $\overline{V}_r$ of the output $V_1$ of the upstream-side $O_2$ sensor 13 represents a low level, i.e., a lean signal during an active mode and the mean or blunt value $\overline{V}_2$ of the output $V_2$ of the downstream-side $O_2$ sensor 15 represents a rich signal, the duration thereof is counted by the counter K. As a result, when this duration exceeds a predetermined time period, it is considered that the downstream-side $O_2$ sensor 15 is in an abnormal state. Also, when the downstream-side $O_2$ sensor 15 is in an abnormal state and the minimum mean or blunt value $\overline{V}_2$ of the output $V_2$ of the downstream-side $O_2$ sensor 15 represents a lean signal during an active mode, the duration is counted by the counter M. As a result, when this duration exceeds a predetermined time period, it is considered that the downstream-side $O_2$ sensor 15 has recovered to the normal state.

FIG. 8A is also a modification of the flow at step 607 of FIG. 6, FIG. 8B is also a modification of the flow at step 611 of FIG. 6, and FIGS. 9A through 9D are timing diagrams explaining the flow chart of FIG. 8A. As shown in FIGS. 9A through 9D, a rich counter CR is used for counting the duration of a rich state where $V_1 > V_{R1}$ (=0.45 V), and a lean counter CL is used for counting the duration of a lean state where $V_1 \leq V_{R1}$. That is, at step 801, it is determined whether or not $V_1 \leq V_{R1}$ is satisfied. If $V_1 > V_{R1}$ (rich), the control proceeds to step 802 which determines whether or not CL=0. Unless CL=0, this means a change from lean to rich is generated in the output $V_1$ of the upstream-side $O_2$ sensor 13. Therefore, at step 803, the value of the lean counter CL is caused to be a lean duration CLE, and at step 804, the lean counter CL is cleared. Next, at step 805, the rich counter CR is counted up by 1. On the other hand, if CL=0 at step 802, then no change from the rich state to the lean state is generated in the output $V_1$ of the upstream-side $O_2$ sensor 13, and the control proceeds directly to step 805 which counts up the rich counter CR by 1. At step 801, if $V_1 \leq V_{R1}$ (lean), the control proceeds to step 806 which determines whether or not CR=0. Unless CR=0, this means a change from rich to lean is generated in the output $V_1$ of the upstream-side $O_2$ sensor 13. Therefore, at step 807, the value of the rich counter CR is caused to be a rich duration CRE, and at step 808, the rich counter CR is cleared. Next, at step 809, the lean counter CL is counted up by 1. On the other hand, if CR=0 at step 806, then no change from the lean state to the rich state is generated in the output $V_1$ of the upstream-side $O_2$ sensor 13, and the control proceeds directly to step 809 which counts up the lean counter CL by 1.

Thus, the lean duration CLE and the rich duration CRE are always renewed.

Next, at step 810, a total duration TT is calculated by

TT←CRE+CLE.

Then, at step 811, a duty ratio DRI is calculated by

DRI←CRE/TT.

Further, at step 812, a mean or blunt value $\overline{DRI}$ of the duty ratio DRI is calculated by $$\overline{DRI} \leftarrow \frac{\overline{DRI} + DRI}{2}.$$

On the other hand, at step 813 of FIG. 8B, it is determined whether or not $\overline{DRI} < \overline{DRI}_0$ is satisfied. Here, $\overline{DRI}_0$ is a definite value.

Thus, in the routine of FIG. 6 modified by FIGS. 8A and 8B, when the mean or blunt value $\overline{DRI}$ of duty ratios of a rich in signal the output $V_1$ of the upstream-side $O_2$ sensor 13 is lower than a predetermined value and the mean or blunt value $\overline{V}_2$ of the output $V_2$ of the downstream-side $O_2$ sensor 15 represents a lean signal, the duration thereof is counted by the counter K. As a result, when this duration exceeds a predetermined time period, it is considered that the downstream-side $O_2$ sensor 15 is in an abnormal state. Also, when the downstream-side $O_2$ sensor 15 is in an abnormal state and the mean or blunt value $\overline{V}_2$ of the output $V_2$ of the downstream-side $O_2$ sensor 15 represents a rich signal during an active mode, the duration is counted by the counter M. As a result, when this duration exceeds a predetermined time period, it is considered that the downstream-side $O_2$ sensor 15 has recovered to the normal state.

Note that if the signal processing circuits 111 and 112 are of a flow-in type as shown in FIG. 3B, at step 811, the duty ratio is calculated by

DRI←CLE/TT.

Therefore, in this case, when the mean or blunt value $\overline{DRI}$ of duty ratios of a lean signal in the output $V_1$ of the upstream-side $O_2$ sensor 13 is lower than a predetermined value and the mean or blunt value $\overline{V}_2$ of the output $V_2$ of the downstream-side $O_2$ sensor 15 represents a rich signal, the duration thereof is counted by the counter K. As a result, when this duration exceeds a predetermined time period, it is considered that the downstream-side $O_2$ sensor 15 is in an abnormal state. Also, when the downsteam-side $O_2$ sensor 15 is in an abnormal state and the mean or blunt value $\overline{V}_2$ of the output $V_2$ of the downstream-side $O_2$ sensor 15 represents a lean signal during an active mode, the duration is counted by the counter M. As a result, when this duration exceeds a predetermined time period, it is considered that the downstream-side $O_2$ sensor 15 has recovered to the normal state.

Note that the determination of recovery of the downstream-side $O_2$ sensor 15 by the flow of steps 618 through 627 can be carried out by determining whether the output $V_2$ of the downstream-side $O_2$ sensor 15 exceeds the reference voltage $V_{R2}$ at a definite number of times.

FIG. 10 is a further routine for determining whether the $O_2$ sensors 13 and 15 are normal or abnormal, executed at every predetermined time period such as 4 ms. In this routine, the normal abnormal determination of the $O_2$ sensors 13 and 15 is carried out by determining whether or not the outputs of the $O_2$ sensors reach the corresponding activation reference voltages, which are lower than the reference voltages $V_{R1}$ and $V_{R2}$ for feedback controls by the $O_2$ sensors 13 and 15, respectively.

Note that if the signal processing circuits 111 and 112 are of a flow-out type as shown in FIG. 3A, the reference voltage $V_{R1}$ for a feedback control by the upstream-side $O_2$ sensor 13 is, for example, 0.45 V, and the reference voltage $V_{R2}$ for a feedback control by the downstream-side $O_2$ sensor 15 is, for example, 0.55 V. Such a difference in the reference voltages is due to the difference in the output characteristics of the $O_2$ sensors 13 and 15, since the upstream-side $O_2$ sensor 13 is affected strongly by the exhaust gas when compared with the downstream-side $O_2$ sensor 15.

Figure 10A:
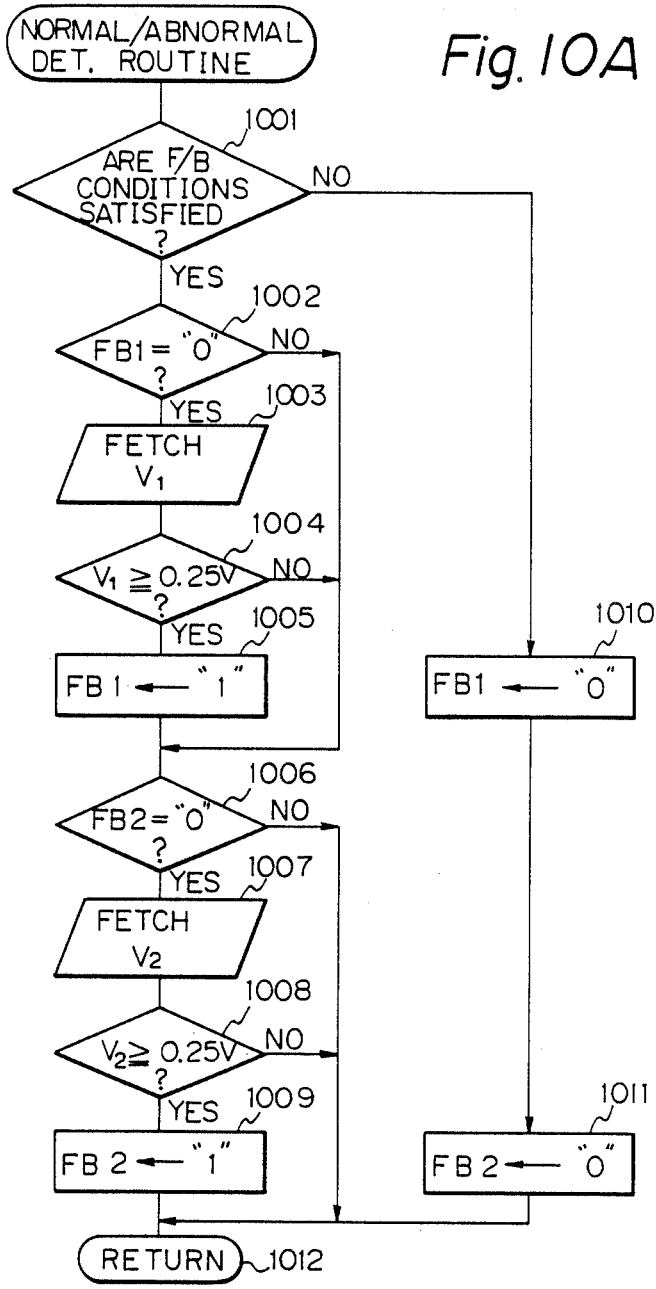

In the routine of FIG. 10A, the activation reference voltage is 0.25 V which is lower than both of the reference voltages $V_{R1}$ and $V_{R2}$.

At step 1001, it is determined whether or not all the feedback control (closed-loop control) conditions are satisfied in the same way as at step 501 of FIG. 5. Also, in this case, if one or more of the feedback control conditions is not satisfied, the control proceeds to step 1010 which clears the feedback control execution flag FB1, and further proceeds to step 1011 which clears the feedback control execution flag FB2. That is, none of the air-fuel ratio feedback controls are carried out.

Contrary to the above, at step 1001, if all of the feedback control conditions are satisfied, the control proceeds to step 1002.

At step 1002, it is determined whether or not the feedback control execution flag FB1 is "0". If FB1="0", the control proceeds to step 1003 which performs an A/D conversion upon the output $V_1$ of the upstream-side $O_2$ sensor 13, and at step 1004, it is determined whether or not $V_1 \geq 0.25$ V is satisfied. If $V_1 \geq 0.25$ V, the control proceeds to step 1005 which sets the feedback control execution flag FB1, thereby carrying out a feedback control by the upstream-side $O_2$ sensor 13 as shown in FIG. 11A. If FB1="1" at step 1002, or if $V_1 < 0.25$ V at step 1004, the control proceeds directly to step 1006.

Similarly, at step 1006, it is determined whether or not the feedback control execution flag FB2 is "0". If FB2="0", the control proceeds to step 1007 which performs an A/D conversion upon the output $V_2$ of the downstream-side $O_2$ sensor 15, and at step 1008, it is determined whether or not $V_2 \geq 0.25$ V is satisfied. If $V_2 \geq 0.25$ V, the control proceeds to step 1009 which sets the feedback control execution flag FB2, thereby carrying out a feedback control by the downstream-side $O_2$ sensor 15 as shown in FIG. 11B. If FB2="1" at step 1006, or if $V_2 < 0.25$ V at step 1008, the control proceeds directly to step 1012, thus completing this routine.

Note that if the signal processing circuits 111 and 112 are of a flow-in type as shown in FIG. 3B, at step 1004, it is determined whether or not $V_1 < 0.75$ V is satisfied, and at step 1008, it is determined whether or not $V_2 < 0.75$ V.

According to the routine of FIG. 10A, if the $O_2$ sensors are in an activation state, the feedback controls by the $O_2$ sensors are relatively promptly stated, as illustrated in FIGS. 11A and 11B, thereby improving the fuel consumption, the drivability, and the exhaust emission characteristics.

Figure 10B:
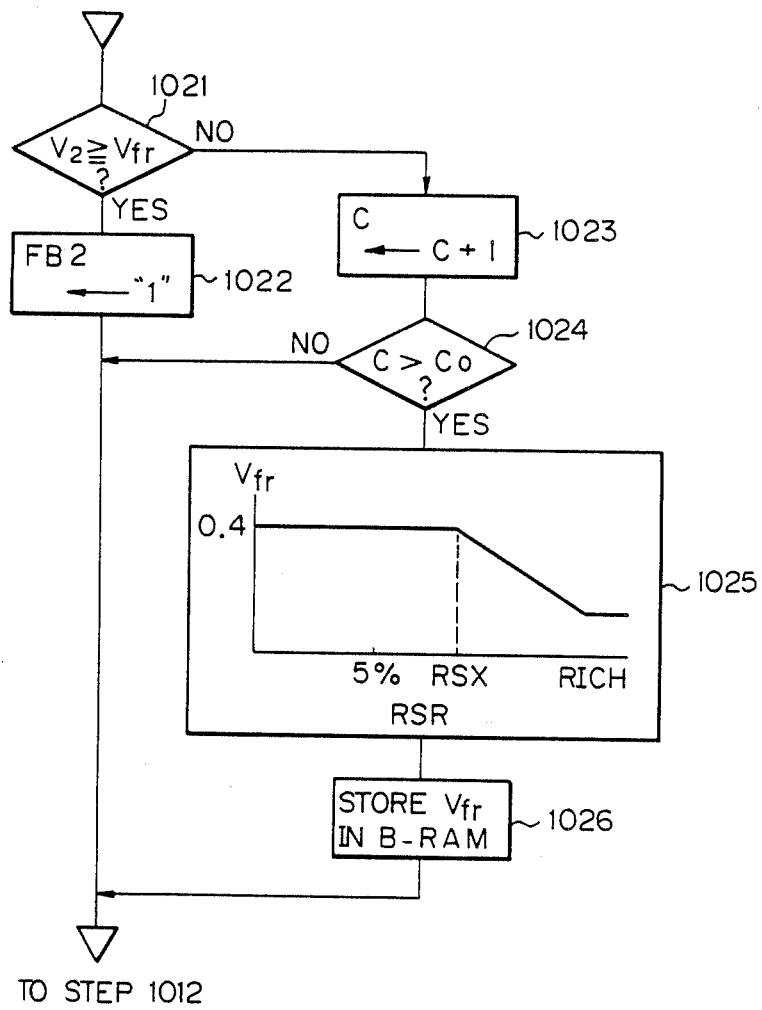

FIG. 10B is a modification of the flow at steps 1008, and 1009 of FIG. 10A. In this routine, the activation reference voltage $V_{fr}$ is variable. Note that the activation reference voltage $V_{fr}$ is initially set at 0.4 V and is stored in the backup RAM 106, and a counter C is initially cleared. At step 1021, it is determined whether or not $V_2 \geq V_{fr}$ is satisfied. If $V_2 \geq V_{fr}$, the control proceeds to step 1022 which sets the feedback control execution flag FB2, thereby carrying out a feedback control by the downstream-side $O_2$ sensor 15. Otherwise, the control proceeds to step 1023 which counts up the counter C by 1. Note that the counter C is used for counting the duration for which $V_2 < V_{fr}$. Then, at step 1024, it is determined whether or not $C > C_0$ is satisfied. Here, $C_0$ is a definite time period. Only if $C > C_0$, does the control proceed to step 1025 which calculates an activation reference voltage $V_{fr}$. In this case, $V_{fr}$ is calculated from a one-dimensional map stored in the ROM 104 using an air-fuel feedback control parameter such as a rich skip amount RSR (or a lean skip amount RSL). That is, in this case, the rich skip amount RSR can be varied by the feedback control by the downstream-side $O_2$ sensor 15. As a result, if the rich skip amount RSR is changed on the rich side and is larger than a predetermined value RSX, the activation reference voltage $V_{fr}$ is reduced. Then, at step 1026, the calculated activation reference voltage $V_{fr}$ is stored in the backup RAM 106.

Note that the parameter at step 1025 can be other air-fuel feedback control parameters which are controlled by the feedback control by the downstream-side $O_2$ sensor 15, e.g., the coolant temperature, the engine speed, the intake air pressure, and the like. Also, if the signal processing circuits 111 and 112 are of a flow-in type as shown in FIG. 3B, at step 1021, it is determined whether or not $V_2 < V_{fr}$ is satisfied, and at step 1025, the activation reference voltage $V_{fr}$ is larger than the parameter such as RSL is on the leaner side.

As explained above, the activation reference voltage $V_{fr}$ is stored in the backup RAM 106, thereby improving the drivability at the restart of the engine. However, when the engine adopts a learning control, at step 1026, the activation reference voltage $V_{fr}$ is stored in the RAM 105, thereby restoring the original value thereof.

Figure 12:
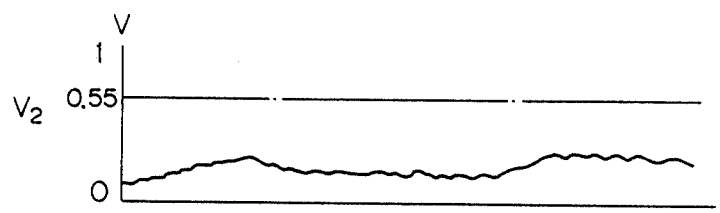
FIGS. 12A through 12F are timing diagrams explaining the flow chart of FIG. 10B.
Figure 12:
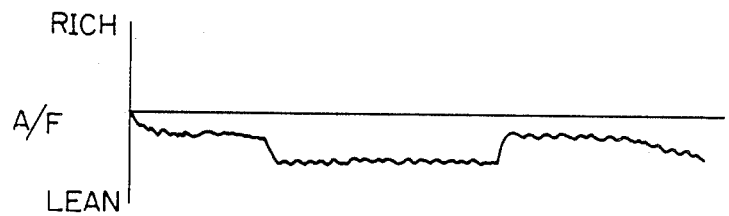
Figure 12:
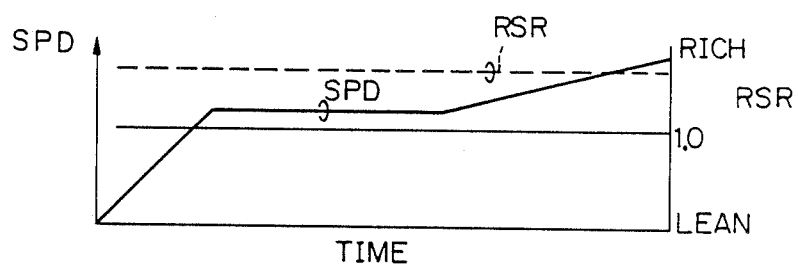
Figure 12D:
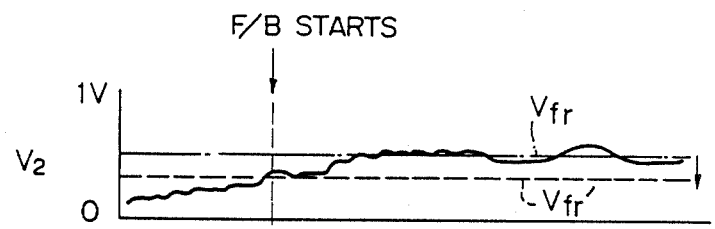
Figure 12E:
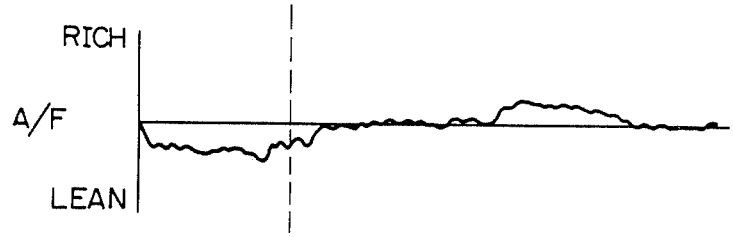

The effect of the routine 10A modified by the flow of FIG. 10B will be explained with reference to FIGS. 12A through 12F. first, the case wherein the activation reference voltage is a relatively high definite value such as 0.55 V will be explained. That is, where the signal processing circuits 111 and 112 are of a flow-out type, if the air-fuel ratio of the entire engine due to the individual differences in the fuel injection valves, the aging of the downstream-side $O_2$ sensor 15, or the like, is lean as shown in FIG. 12B, it is impossible for the output $V_2$ of the downstream-side $O_2$ sensor 15 to reach the activation reference voltage 0.55 V as shown in FIG. 12A, and accordingly, a feedback control by the downstream-side $O_2$ sensor 15 is not started. As a result, the air-fuel ratio feedback control parameter such as RSR is fixed on the rich side as shown in FIG. 12C. Thus, the drivability, the NOx emission characteristics, and the like are deteriorated. Similarly, where the signal processing circuits 111 and 112 are of a flow-in type, if the air-fuel ratio of the entire engine due to the individual differences in the fuel injection valves, the aging of the downstream-side $O_2$ sensor 15, or the like, is rich, it is impossible for the output $V_2$ of the downstream-side $O_2$ sensor 15 to reach the activation reference voltage, and accordingly, a feedback control by the downstream-side $O_2$ sensor 15 is not started. As a result, the air-fuel ratio feedback control parameter such as RSR is fixed on the lean side. Thus, the drivability, the HC and CO emission characteristics, and the like are deteriorated.

Figure 12F:
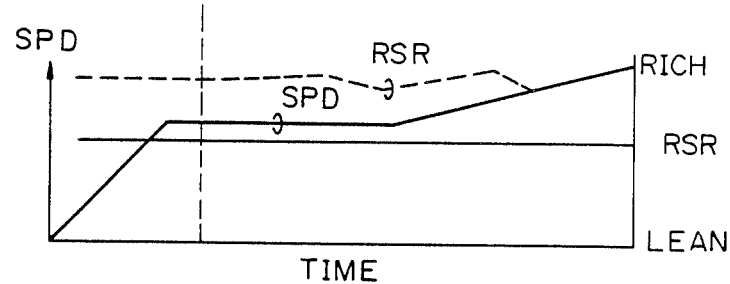

Contrary to the above, according to the routine of FIG. 10A modified by the flow of FIG. 10B, where the signal processing circuits are of a flow-out type, if the air-fuel ratio of the entire engine due to the individual differences in the fuel injection valves, the aging of the downstream-side $O_2$ sensor 15, or the like, is lean as shown in FIG. 12B, the activation reference voltage $V_{fr}$ is reduced to $V_{fr}'$, thereby starting a feedback control by the downstream-side $O_2$ sensor 15. As a result, the air-fuel ratio feedback control parameter such as RSR is controlled as shown in FIG. 12F, thereby improving the drivability, the NOx emission characteristics, and the like. Similarly, where the signal processing circuits 111 and 112 are of a flow-in type, if the air-fuel ratio of the entire engine due to the individual differences in the fuel injection valves, the aging of the downstream-side $O_2$ sensor 15, or the like, is rich, the activation reference voltage is increased, thereby starting a feedback control by the downstream-side $O_2$ sensor 15. As a result, the air-fuel ratio feedback control parameter such as RSR is controlled, thereby improving the drivability, the HC and CO emission characteristics, and the like.

Figure 13A:
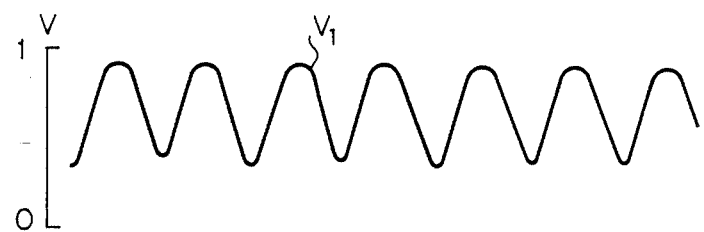
FIGS. 13A through 13C are timing diagrams showing the deterioration of the catalyst converter of FIG. 2.
Figure 13B:
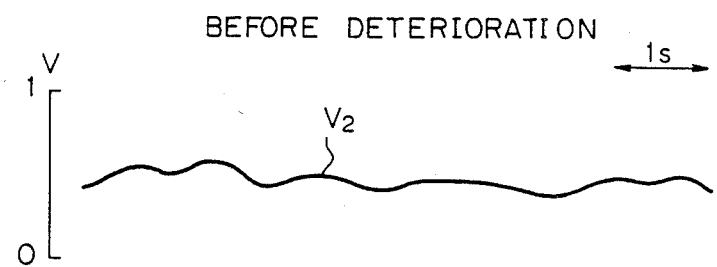
Figure 13C:
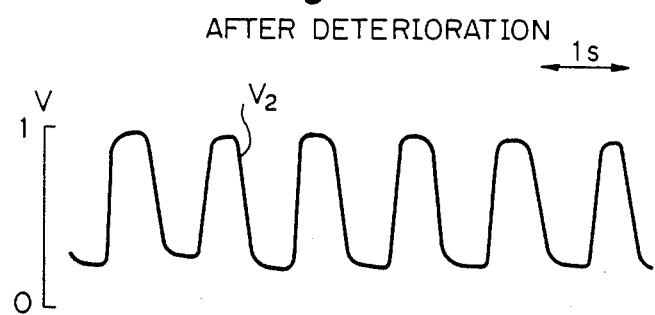

In a double $O_2$ sensor system, when the output characteristics of the upstream-side $O_2$ sensor 13 are shown in FIG. 13A, the output characteristics of the downstream-side $O_2$ sensor 15 are shown in FIG. 13B, since the downstream-side $O_2$ sensor 15 is located downstream of the catalyst converter 12 so that the $O_2$ sensor 15 is only a little affected by unburned gas such as HC, CO, or $H_2$ emissions. However, if the catalyst converter 14 is deteriorated, the downstream-side $O_2$ sensor 15 as well as the upstream-side $O_2$ sensor 13 is affected by unburned gas, and therefore, the output characteristics of the downstream-side $O_2$ sensor 15 are deteriorated as shown in FIG. 13C. That is, the output $V_2$ of the downstream-side $O_2$ sensor 15 has a large amplitude and a small period, thereby fluctuation of the feedback control is caused by the downstream-side $O_2$ sensor 15, thus inviting a determination of the fuel consumption, the drivability, and the HC, CO, and $H_2$ emission characteristics. Thus, the normal/abnormal determination of the downstream-side $O_2$ sensor 15 can be carried out by determining whether or not the catalyst converter 12 is deteriorated, which will be explained with reference to FIGS. 14, 15A through 15D, and 16.

Figure 14B:
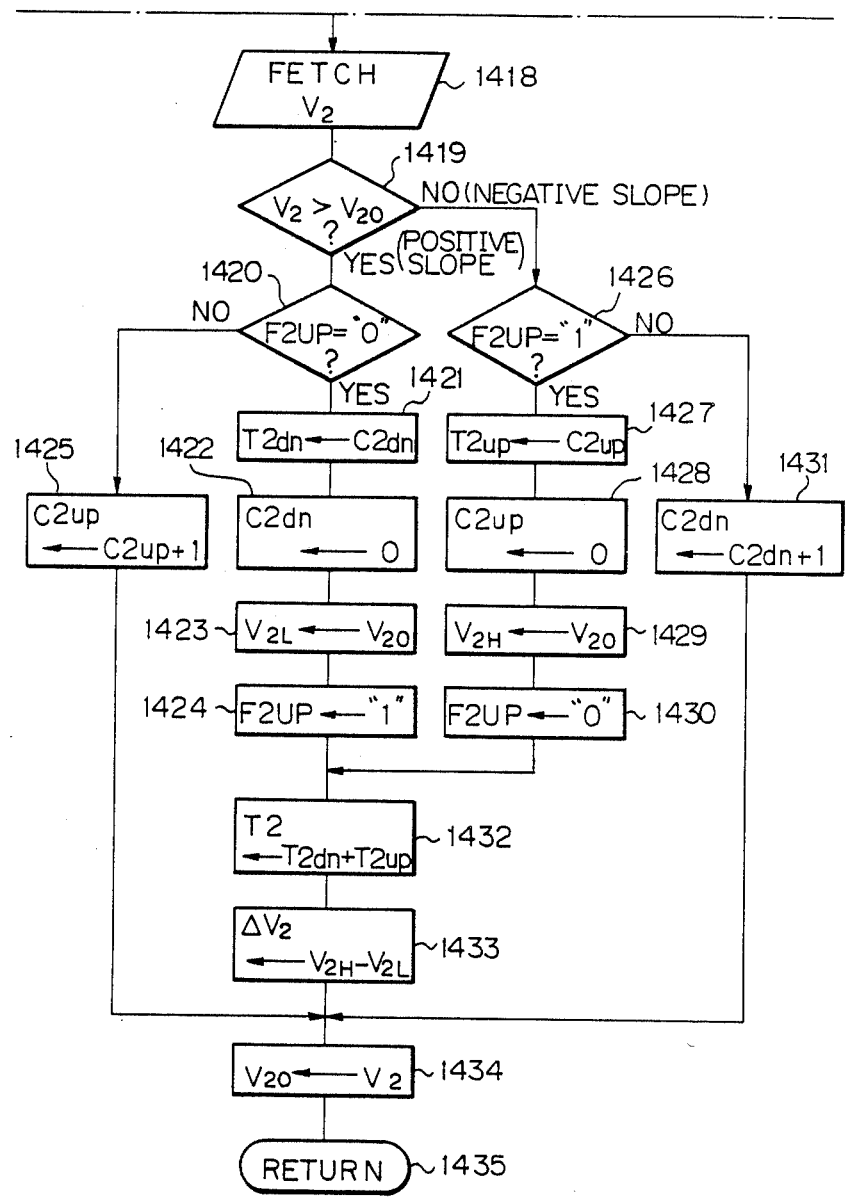

FIG. 14 is a routine for calculating amplitudes and periods of the outputs $V_1$ and $V_2$ of the $O_2$ sensors 13 and 15, executed at every predetermined time period such as 4 ms. Steps 1401 through 1417 are used for the upstream-side $O_2$ sensor 13, and steps 1418 through 1434 are used for the downstream-side $O_2$ sensor 15.

At step 1401, an A/D conversion is performed upon the output $V_1$ of the upstream-side $O_2$ sensor 13, and at step 1402, it is determined whether or not $V_1 > V_{10}$ is satisfied. Here, $V_{10}$ is a value of the output $V_1$ previously fetched by this routine. If $V_1 > V_{10}$ (positive slope), the control proceeds to step 1403 which determines whether or not a flag F1UP is "0", and if $V_1 \leq V_{10}$ (negative slope), the control proceeds to step 1409 which determines whether or not the flag F1UP is "1". Here, the flag F1UP (="1") shows that the output $V_1$ of the upstream-side $O_2$ sensor 13 is being increased. Therefore, at step 1403, if F1UP="0", this means that the output $V_1$ of the upstream-side $O_2$ sensor 13 is reversed from the decrease side to the increase side, and if F1UP="1", this means that the output $V_1$ of the upstream-side $O_2$ sensor 13 is being increased. On the other hand, at step 1409, if F1UP="1", this means that the output $V_1$ of the upstream-side $O_2$ sensor 13 is reversed from the increase side to the decrease side and if F1UP="0", this means that the output $V_1$ of the upstream-side $O_2$ sensor 13 is being decreased.

When the output $V_1$ of the upstream-side $O_2$ sensor 13 is being increased, the control proceeds to step 1408 which counts up an increase period counter C1up by 1, when the output $V_1$ of the upstream-side $O_2$ sensor 13 is being decreased, the control proceeds to step 1414 which counts up a decrease period counter C1dn by 1.

Figures 15A, 15B, 15C, 15D:
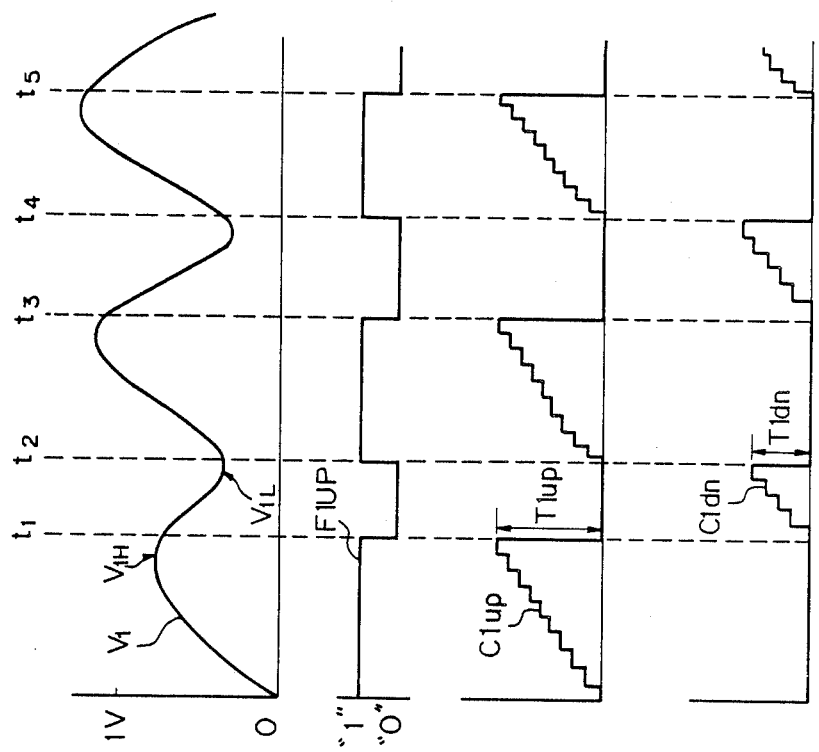
FIGS. 15A through 15D are timing diagrams explaining the flow charts of FIG. 14.

Thus, when the output $V_1$ of the upstream-side $O_2$ sensor 13 is changed as shown in FIG. 15A, the flag F1UP is changed as shown in FIG. 15B. As a result, the increase period counter C1up and the decrease period counter C1dn are changed as shown in FIGS. 15C and 15D.

At each time $t_2, t_4, \ldots$, when the output $V_1$ of the upstream-side $O_2$ sensor 13 is reversed from the decrease side to the increase side, the control proceeds to steps 1404 through 1407, 1415, and 1416. That is, at step 1404, a decrease period T1dn is calculated by T1dn ← C1dn.

Then, at step 1405, the decrease period counter C1dn is cleared. Next, at step 1406, a minimum $V_{1L}$ of the output $V_1$ of the upstream-side $O_2$ sensor is calculated by $V_{1L} \leftarrow V_{10}$.

Further, at step 1407, the flag F1UP is reversed.

At step 1415, a period T1 of the output $V_1$ of the upstream-side $O_2$ sensor 13 is calculated by T1 ← T1dn + T1up.

Also, at step 1416, an amplitude $\Delta V_1$ of the output $V_1$ of the upstream-side $O_2$ sensor 13 is calculated by $\Delta V_1 \leftarrow V_{1H} - V_{1L}$.

Here, $V_{1H}$ is a maximum value of the output $V_1$ of the upstream-side $O_2$ sensor 13.

Also, at each time $t_1, t_3, t_5, \ldots$, when the output $V_1$ of the upstream-side $O_2$ sensor 13 is reversed from the increase side to the decrease side, the control proceeds to steps 1410 through 1413, 1415, and 1416. That is, at step 1410, as increase period T1up is calculated by T1up ← C1up.

Then, at step 1411, the increase period counter C1up is cleared. Next, at step 1412, a minimum $V_{1H}$ of the output $V_1$ of the upstream-side $O_2$ sensor is calculated by $V_{1H} \leftarrow V_{10}$.

Further, at step 1413, the flag F1UP is reversed. Then, at step 1415, a period T1 of the output $V_1$ of the upstream-side $O_2$ sensor 13 is calculated by T1 ← T1dn + T1up.

Also, at step 1416, an amplitude $\Delta V_1$ of the output $V_1$ of the upstream-side $O_2$ sensor 13 is calculated by $\Delta V_1 \leftarrow V_{1H} - V_{1L}$.

At step 1417, in order to prepare a next operation of this routine, the previous value $V_{10}$ is replaced by the current value $V_1$.

Similarly, the flow at steps 1418 through 1434 calculates a period T2 and an amplitude $\Delta V_2$ for the output $V_2$ of the downstream-side $O_2$ sensor 15.

Thus, this routine is completed by step 1435.

Figure 16:
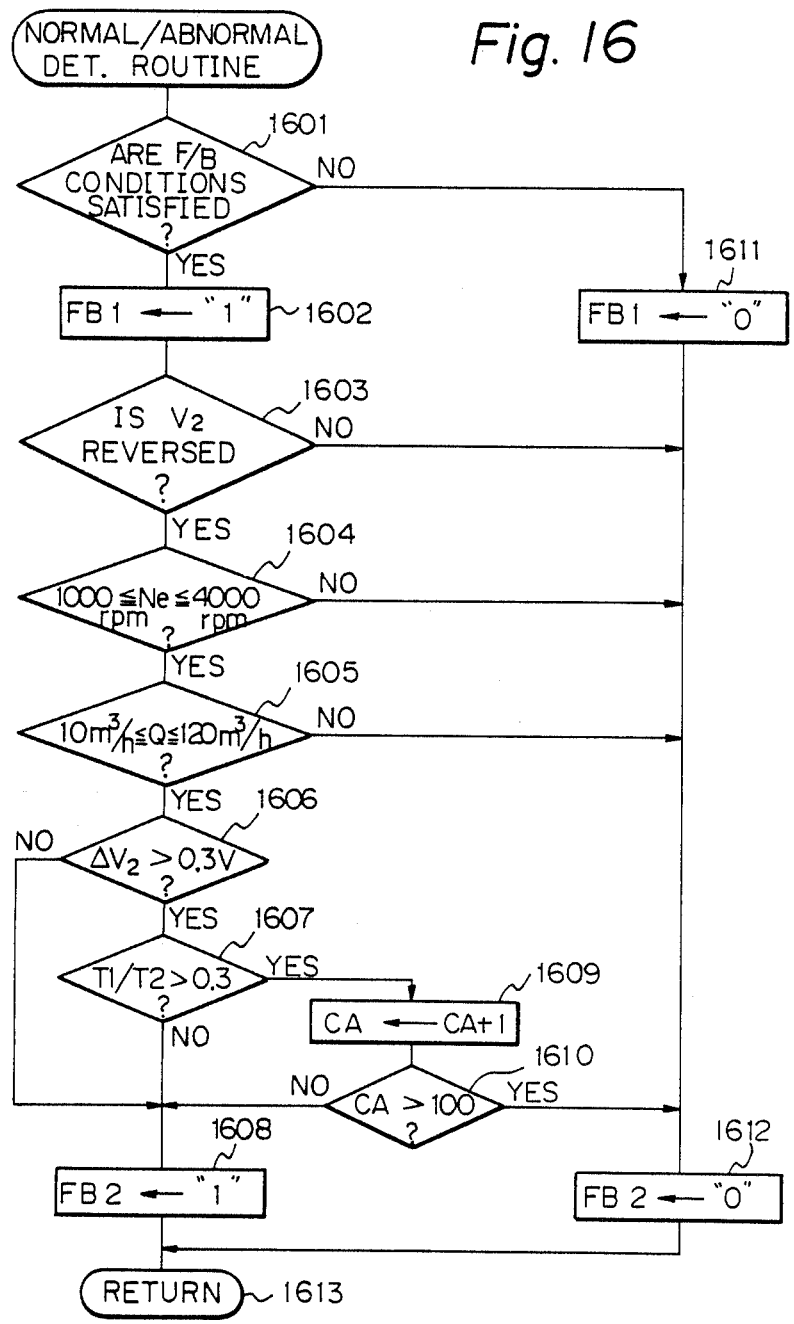

FIG. 16 is a routine for determining whether the $O_2$ sensors are normal or abnormal, by using the calculation result of the routine of FIG. 14. This routine is also carried out at every predetermined time period such as 4 ms.

At step 1601, it is determined whether or not all the feedback control (closed-loop control) conditions are satisfied in the same way as at step 501 of FIG. 5. Also, in this case, if one or more of the feedback control conditions is not satisfied, the control proceeds to step 1611 which clears the feedback control execution flag FB1, and further proceeds to step 1612 which clears the feedback control execution flag FB2. That is, none of the air-fuel ratio feedback controls are carried out.

Contrary to the above, at step 1601, if all of the feedback control conditions are satisfied, the control proceeds to step 1602 which sets the feedback control execution flag FB1, thereby carrying and a feedback control by the upstream-side $O_2$ sensor 13.

At step 1603, it is determined whether or not the downstream-side $O_2$ sensor 15 is in an activation state by determining whether or not the output $V_2$ of the downstream-side $O_2$ sensor 15 is reversed. If the downstream-side $O_2$ sensor 15 is in an activation state, the control proceeds to step 1604. Otherwise, the control proceeds to step 1613 which clears the feedback control execution flag FB2, so that a feedback control by the downstream-side $O_2$ sensor 15 is not carried out.

At step 1604, the engine speed data Ne is read out of the RAM 105, and it is determined whether or not 1000 rpm ≤ Ne ≤ 4000 rpm. This step 1604 corresponds to step 502 of FIG. 5. Only if 1000 rpm ≤ Ne ≤ 4000 rpm, does the control proceed to step 1605. The intake air amount data Q is read out of the RAM 105, and it is determined whether or not 10 $m^3/h$ ≤ Q ≤ 120 $m^3/h$. This step 1605 corresponds to step 503 of FIG. 5. Only if 10 $m^3/h$ ≤ Q ≤ 120 $m^3/h$, does the control proceed to step 1606.

At step 1606, it is determined whether or not the amplitude $\Delta V_2$ of the downstream-side $O_2$ sensor 15 is larger than a predetermined value such as 0.3 V. Only if $\Delta V_2 > 0.3$ V, the control proceeds to step 1607.

At step 1607, it is determined whether or not the ratio of the period T1 of the output $V_1$ of the upstream-side $O_2$ sensor 13 to the period T2 of the output $V_2$ of the downstream-side $O_2$ sensor 15 is larger than a predetermined value such as 0.3. Only if $\Delta V_2 > 0.3$ V and T1/T2 > 0.3, this means that the catalyst converter 12 is deteriorated, and accordingly, the control proceeds to step 1609 which counts up an accumulation counter CA for measuring the duration for which the catalyst converter 12 is deteriorated.

If at least one of the determinations at steps 1606 and 1607 is negative, the control proceeds to step 1608 which sets the feedback control execution flag FB2 thereby carrying out a feedback control by the downstream-side $O_2$ sensor 15.

On the other hand, at step 1610, it is determined whether or not the accumulation counter CA exceeds a predetermined value such as 100. If CA > 100, the control proceeds to step 1612 which clears the feedback control execution flag FB2, and if CA ≤ 100, the control proceeds to step 1608 which sets the feedback control execution flag FB2.

This routine is completed by step 1613.

In FIG. 16, at step 1607, it can be determined whether or not the period T2 of the output $V_2$ of the downstream-side $O_2$ sensor 15 is smaller than a predetermined value dependent upon a driving parameter such as the engine speed Ne.

Figure 17:
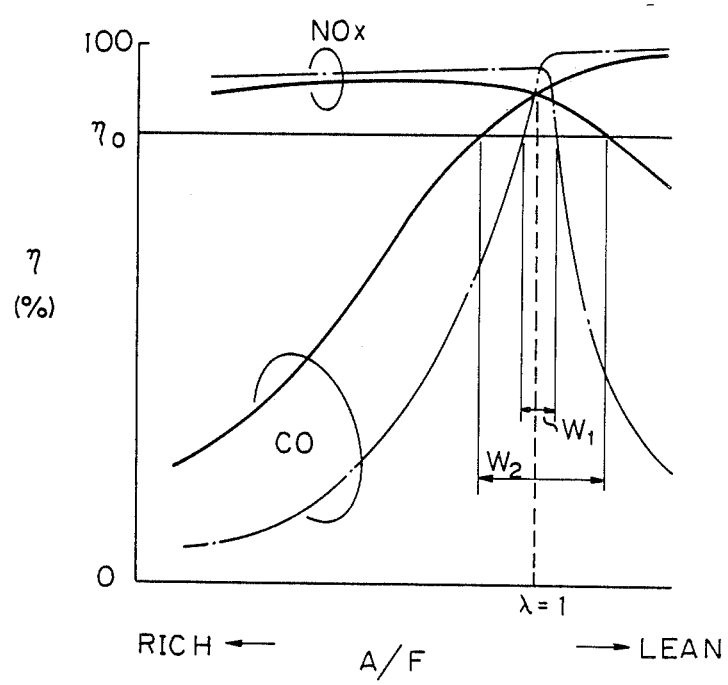
FIG. 17 is a graph showing the $O_2$ storage effect of the three-way reducing and oxidizing catalysts.

Next, the $O_2$ storage effect of a three-way reducing and oxidizing catalyst converter will be explained with reference to FIG. 17. As indicated by dot-solid lines in FIG. 17, the purifying rate $\eta$ for the $NO_x$ component is large on the rich side with respect to the stoichiometric ratio ($\lambda = 1$), and the purifying rate $\eta$ for the CO component (or HC component) is large on the lean side with respect to the stoichiometric ratio ($\lambda = 1$). Note that the purifying rate $\eta$ for the HC component has the same tendency as the purifying rate $\eta$ for the CO component.

Figure 18A:
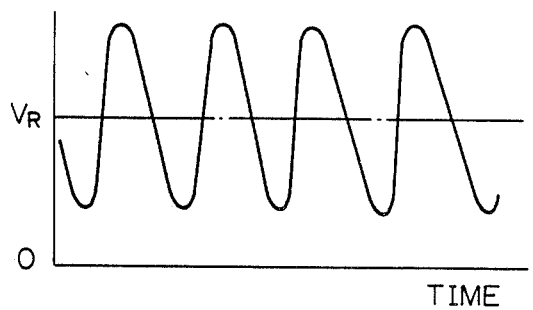
FIGS. 18A and 18B are timing diagrams of examples of the output of an $O_2$ sensor.

Therefore, if $\eta_0$ is a required purifying rate, the controllable window of the air-fuel ratio is very narrow ($W=W_1$), and therefore, the feedback control for the stoichiometric ratio should be carried out essentially within this range $W_1$. However, in the three-way reducing and oxidizing catalysts, when a lean air-fuel ratio atmosphere prevails, $O_2$ is absorbed thereinto, and when a rich air-fuel ratio atmosphere prevails, HC and CO are absorbed thereinto, and are reacted with the absorbed $O_2$. This is a so-called $O_2$ storage effect. An air-fuel feedback control operation provides an optimum frequency and amplitude of the air-fuel ratio thereby positively making use of such an $O_2$ storage effect. Therefore, according to the air-fuel feedback control, as indicated by solid lines in FIG. 17, the purifying rate $\eta$ is improved and the controllable air-fuel ratio window is substantially broad ($W=W_2$). In this case, the output $V_1$ of the upstream-side $O_2$ sensor 13 is swung at a frequency of about 2 Hz as shown in FIG. 18A.

Figure 18B:
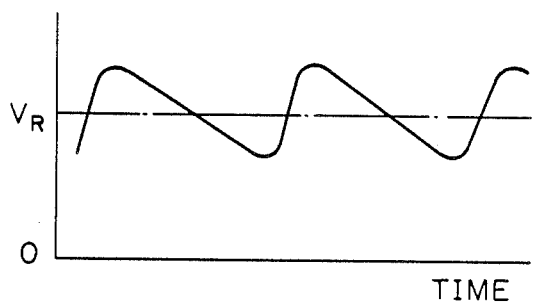

Contrary to the above, when the $O_2$ sensor is deteriorated, only a little oxygen penetrates the zirconium elements of the $O_2$ sensor. As a result, when the exhaust gas is changed from a rich state to a lean state, the change of the output of the $O_2$ sensor from a rich signal to a lean signal is delayed, so that a time period of change of the output of the $O_2$ sensor from maximum to minimum becomes long. That is, before the output of the $O_2$ sensor becomes sufficiently low, the controlled air-fuel ratio is reversed. As a result, the frequency of the controlled air-fuel ratio is reduced as shown in FIG. 18B, thereby reducing the $O_2$ storage effect of the three way catalysts. Thus, when the $O_2$ storage effect is reduced, the controllable air-fuel ratio window W is also reduced, for example, $W=W_1$ corresponding to a frequency 1 Hz. In this case, the amplitude of the output of the $O_2$ sensor is also reduced.

Figure 19:
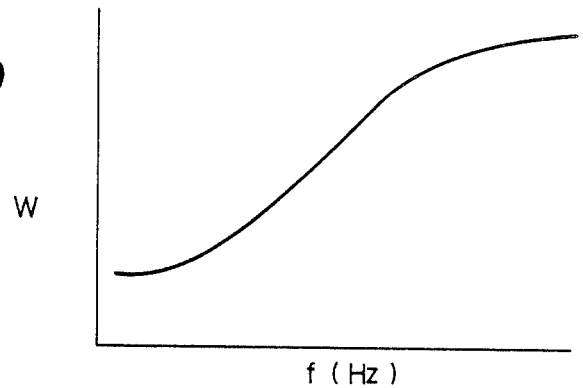
FIG. 19 is a graph showing the relationship between the controlled air-fuel ratio and the air-fuel ratio window.

Note that FIG. 19 represents the relationship between the air-fuel ratio window W and the frequency f of the controlled air-fuel ratio.

Thus, the normal/abnormal determination of the downstream $O_2$ sensor 15 can be carried out by whether or not the amplitude of the output of the downstream-side $O_2$ sensor 15 is larger than a predetermined value, which will be explained with reference to FIG. 20.

Figures 20, 20A:
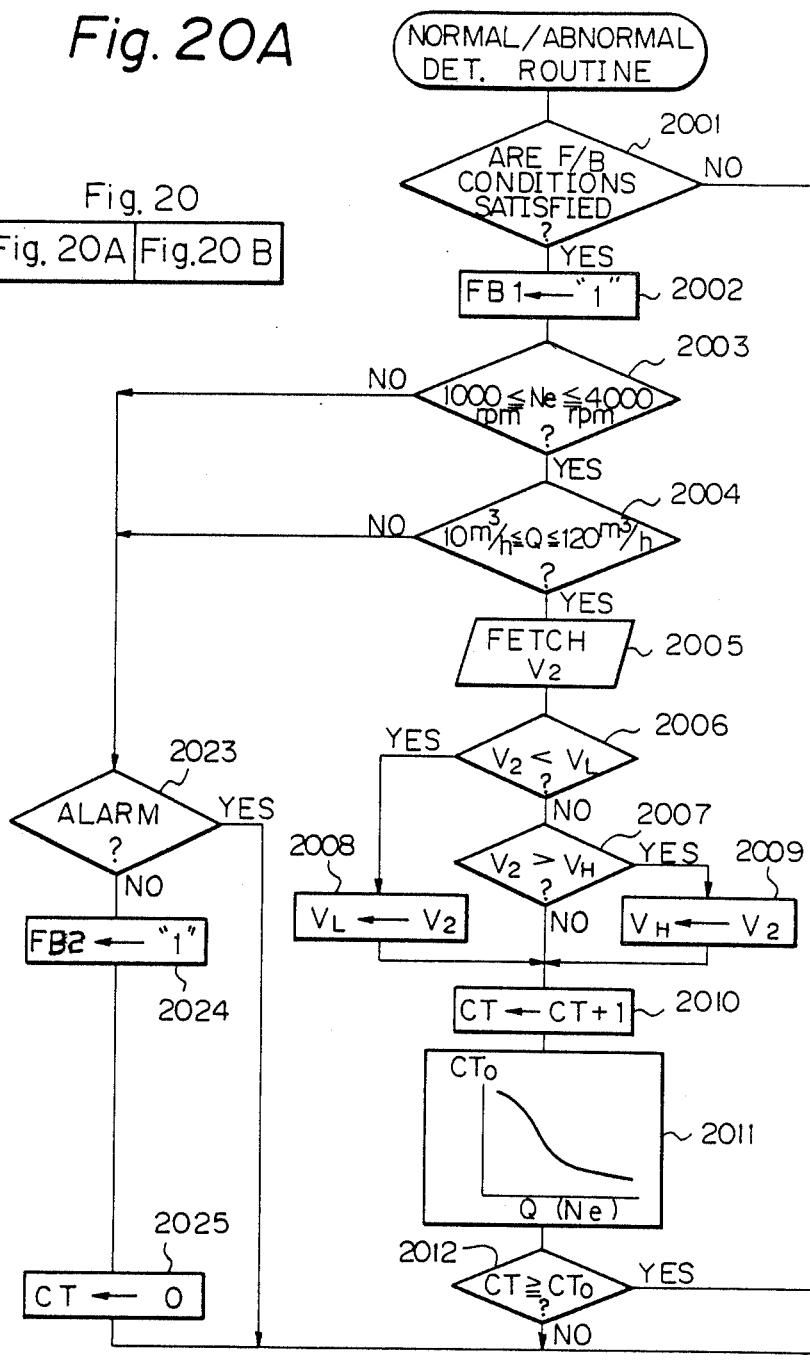
Figure 20B:
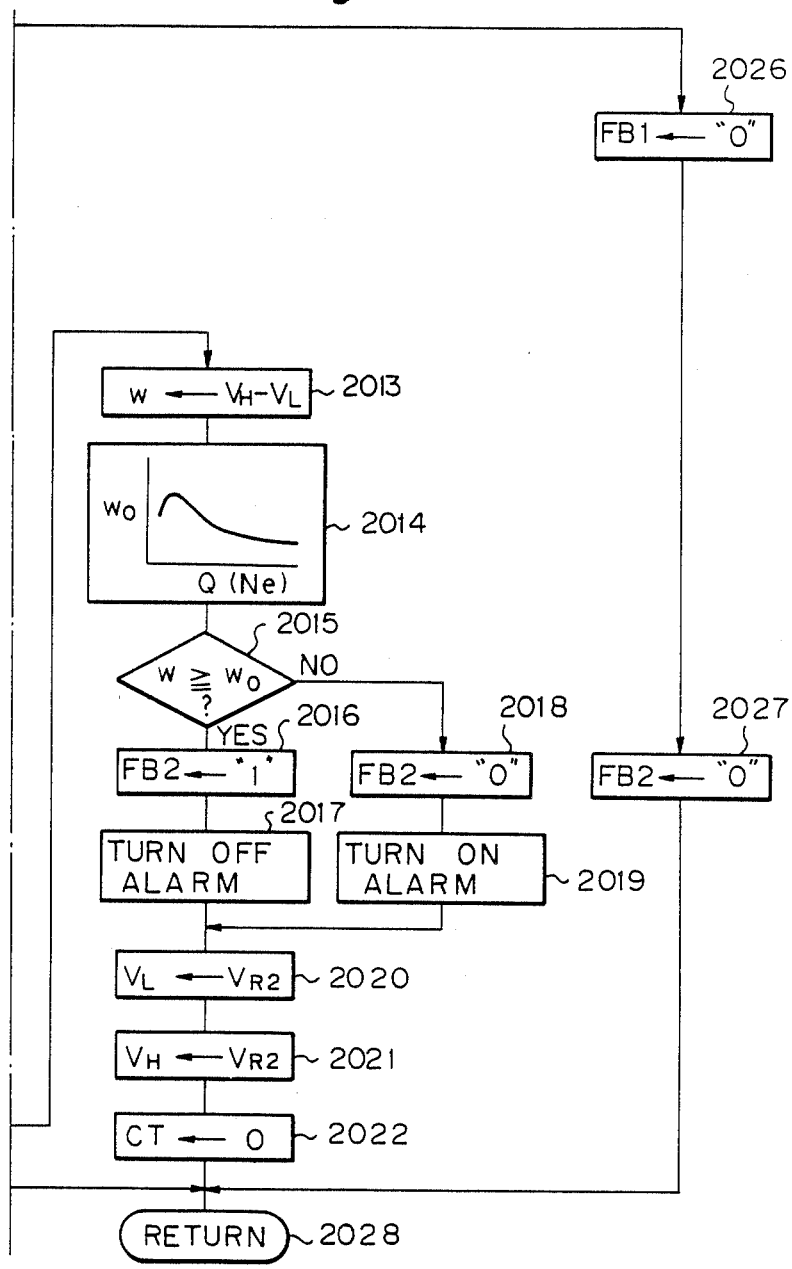

FIG. 20 is a further routine for determining whether the $O_2$ sensors 13 and 15 are in a normal or abnormal state.

At step 2001, it is determined whether or not all the feedback control (closed-loop control) conditions are satisfied in the same way as at step 501 of FIG. 5. Also, in this case, if one or more of the feedback control conditions is not satisfied, the control proceeds to step 2026 which clears the feedback control execution flag FB1, and further proceeds to step 2027 which clears the feedback control execution flag FB2. That is, none of the air-fuel ratio feedback controls are carried out.

Contrary to the above, at step 1601, if all of the feedback control conditions are satisfied, the control proceeds to step 1602, which sets the feedback control execution flag FB1, thereby carrying out a feedback control by the upstream-side $O_2$ sensor 13.

At step 2003, the engine speed data Ne is read out of the RAM 105, and it is determined whether or not 1000 rpm$\leq$Ne$\leq$4000 rpm. This step 2003 corresponds to step 502 of FIG. 5. Only if 1000 rpm$\leq$Ne$\leq$4000 rpm, does the control proceed to step 1605, the intake air amount data Q is read out of the RAM 105, and it is determined whether or not 10 m$^3$/h$\leq$Q$\leq$120 m$^3$/h.

This step 2004 corresponds to step 503 of FIG. 5. Only if 10 m$^3$/h$\leq$Q$\leq$120 m$^3$/h, does the control proceed to step 2005.

At step 2005, an A/D conversion is performed upon the output $V_2$ of the downstream-side $O_2$ sensor 15. Then, at step 2006, it is determined whether or not the output $V_2$ is smaller than a minimum level $V_L$, and at step 2007, it is determined whether or not the output $V_L$ is larger than a maximum level $V_H$. Note that the levels $V_2$ and $V_H$ are made to the reference voltage $V_{R2}$ such as 0.55 V by the initial routine (not shown). As a result, if $V_L \leq V_2 \leq V_H$, the control proceeds to step 2010, so that no change is performed upon the minimum level $V_L$ and the maximum level $V_H$. If $V_2 < V_L$, the control proceeds to step 2008 which renews the minimum level $V_L$ by the current voltage $V_2$, and if $V_2 > V_H$, the control proceeds to step 2009 which renews the minimum level $V_H$ by the current voltage $V_2$. Thus, the minimum level $V_L$ and the maximum level $V_H$ of the output $V_2$ of the downstream-side $O_2$ sensor 15 are calculated by steps 2006 to 2009.

At step 2010, a counter CT is counted up by 1. Note that the counter CT is initially cleared by the initial routine (not shown). At step 2011, a reference value $CT_0$ of the counter CT is calculated from a one-dimensional map stored in the ROM 104 usng a load parameter such as the intake air amount Q or the engine speed Ne. At step 2011, when the load is reduced, the reference value $CT_0$ is also reduced, since the response speed of the downstream-side $O_2$ sensor 15 is reduced. However, this reference value $CT_0$ may be a definite value such as 30. Then, at step 2010, it is determined whether or not $CT \leq CT_0$ is satisfied. Therefore, only if the conditions at step 2001, 2003, and 2004 are satisfied and the flow at steps 2005 to 2012 is repeated $CT_0$ times, does the control proceed to step 2013. Otherwise, the control proceeds directly to step 2028, so that the feedback control execution flag FB2 and the alarm 18 each remain in a previous state.

At step 2013, the difference w between the maximum level $V_H$ and the minimum level $V_L$ is calculated, i.e., $$w \leftarrow V_H - V_L.$$

At step 2014, a reference value $w_0$ of the difference w is calculated from a one-dimensional map stored in the ROM 104 using a load parameter such as the intake air amount Q or the engine speed Ne. At step 2104, when the load is reduced, the reference value $w_0$ is increased, since a gas transport time to the downstream-side $O_2$ sensor 15 is increased, thereby increasing the output amplitude of the downstream-side $O_2$ sensor 15. Further, when the load is remarkably reduced in an idling state, the reference value $w_0$ is reduced, since the downstream-side O sensor 15 is cooled, thereby reducing the amplitude of the output thereof. However, the reference value $w_0$ may be a definite value such as 0.4 V.

Then, at step 2015, it is determined whether or not $w \leq w_0$ is satisfied. If $w \leq w_0$, this means that the downstream-side $O_2$ sensor 15 is not yet deteriorated, and accordingly, the control proceeds to step 2016 which sets the feedback control execution flag FB2 thereby carrying out a feedback control by the downstream-side $O_2$ sensor 15. Thus, a feedback control by both of the $O_2$ sensors 13 and 15 is carried out. Then, at step 2017, if the alarm 18 is being turned ON, the alarm 18 is turned OFF.

At step 2015, when $w<w_0$, the control proceeds to step 2018 which clears the feedback control execution flag FB2. Therefore, a feedback control by the upstream-side $O_2$ sensor 15 only is carried out. Then, at step 2019, the alarm 18 is turned ON. Thus, when the difference w between the maximum level $V_H$ and the minimum level $V_L$ of the output $V_2$ of the downstream-side $O_2$ sensor 15 during a predetermined period determined by the value $CT_0$ is smaller than the value $w_0$, this means that the downstream-side $O_2$ sensor 15 is deteriorated.

Steps 2020 to 2022 are used for initializing the levels $V_L$, $V_H$, and the counter CT. That is, at steps 2020 and 2021, the minimum level $V_L$ and the maximum level $V_H$ are made to $V_{R2}$ (=0.55 V), and at step 2022, the counter CT is cleared.

On the other hand, if at least one of the determinations at steps 2003 and 2004 is negative, the control proceeds to step 2023 which determines whether or not the alarm 18 is being turned ON. If the alarm 18 is being turned ON, the control proceeds directly to step 2028. That is, in this case, a feedback control by the upstream-side $O_2$ sensor 13 only is carried out. At step 2023, if the alarm 18 is not being turned ON, the control proceeds to step 2024 which sets the feedback control execution flag FB2, thereby carrying out a feedback control by both of the $O_2$ sensors 13 and 15, and then at step 2025, the counter CT is cleared.

Thus, when the difference between the maximum level $V_H$ and the minimum level $V_L$ of the output $V_2$ of the downstream-side $O_2$ sensor 15 becomes smaller than the predetermined value $w_0$, it is considered that the downstream-side $O_2$ sensor 15 is deteriorated, and accordingly, the feedback control execution flag FB2 is cleared.

Note that, at step 2019, when the alarm 18 is turned ON, this can be written into the backup RAM 106, thereby storing the hysteresis of the alarm 18.

As explained above, the feedback control execution flags FB1 and FB2 are calculated by the routine of FIGS. 5, 6 (7A, 7B, 8A, 8B), 10A (10B), 16 (14), or 20, and as a result, the air-fuel ratio feedback control is carried out based upon the calculated feedback control execution flags FB1 and FB2, which will be explained below.

Figure 21A:
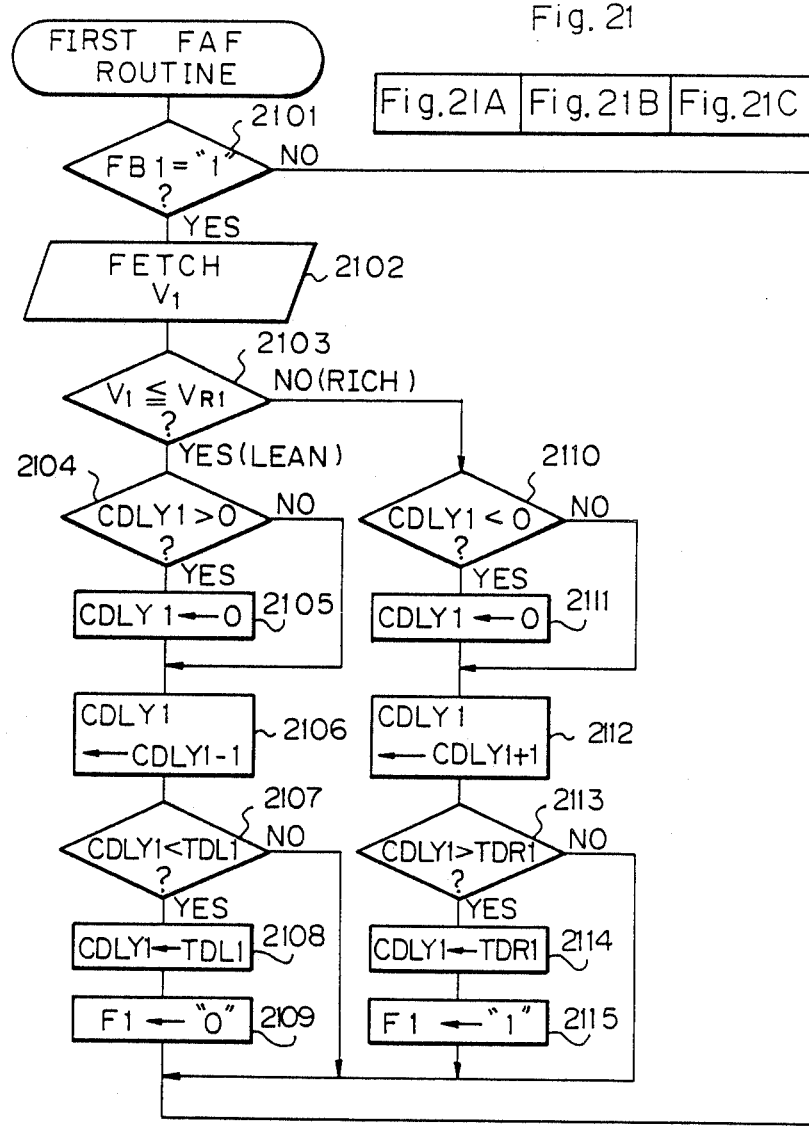
Figure 21B:
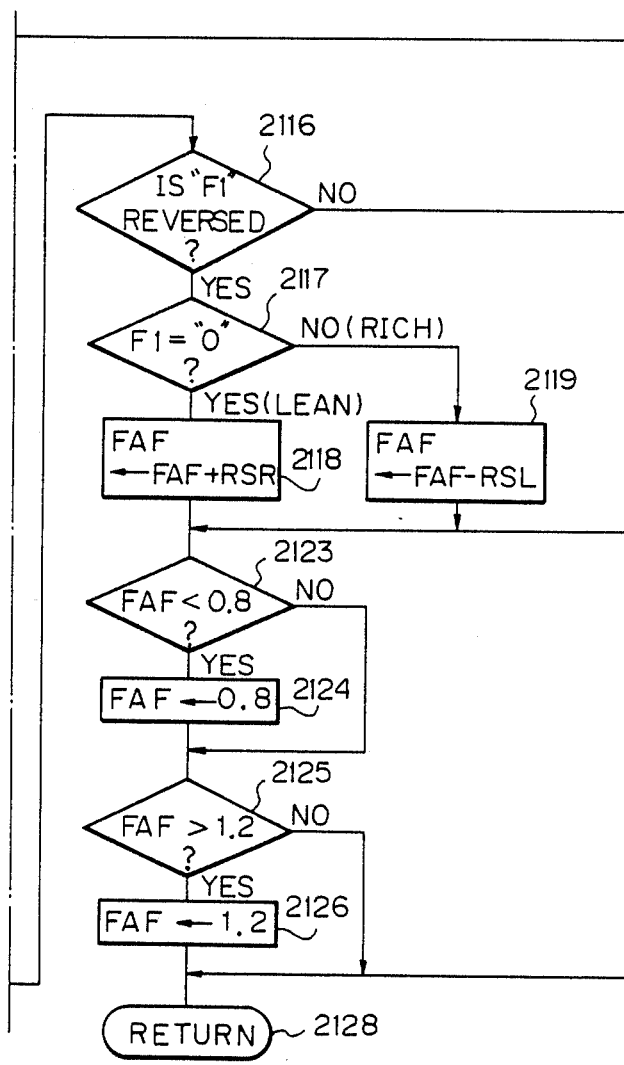
Figure 21C:
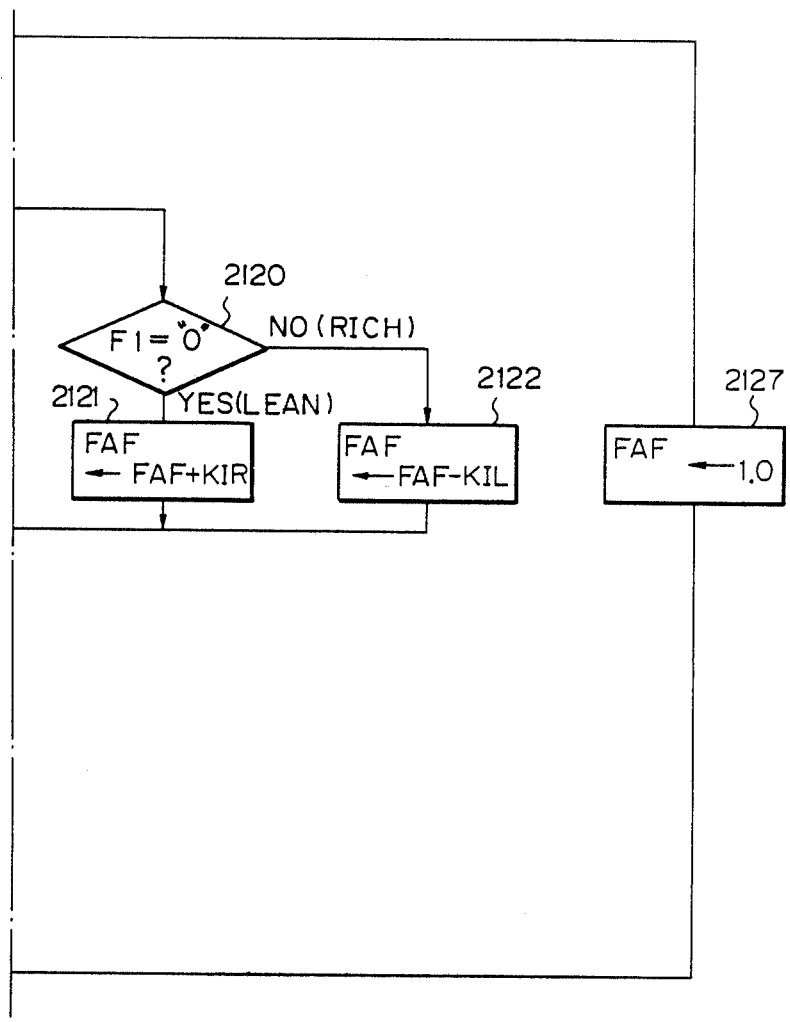

FIG. 21 is a routine for calculating a first air-fuel ratio feedback correction amount FAF in accordance with the output of the upstream-side $O_2$ sensor 13 executed at every predetermined time period such as 4 ms.

At step 2101, it is determined whether or not the feedback control execution flag FB1 is "1". If FB1="0", the control proceeds to step 2127, in which the correction amount FAF is caused to be 1.0 (FAF=1.0), thereby carrying out an open-loop control operation. Note that, in this case, the correction amount FAF can be a learning value or a value immediately before the feedback control by the upstream-side $O_2$ sensor 13 is stopped.

Contrary to the above, at step 2101, if FB1="1", the control proceeds to step 2102.

At step 2102, an A/D conversion is performed upon the output voltage $V_1$ of the upstream-side $O_2$ sensor 13, and the A/D converted value thereof is then fetched from the A/D converter 101. Then, at step 2103, the voltage $V_1$ is compared with a reference voltage $V_{R1}$ such as 0.45 V, thereby determining whether the current air-fuel ratio detected by the upstream-side $O_2$ sensor 13 is on the rich side or on the lean side with respect to the stoichiometric air-fuel ratio.

If $V_1 \leq V_{R1}$, which means that the current air-fuel ratio is lean, the control proceeds to step 2104, which determines whether or not the value of a first delay counter CDLY1 is positive. If CDLY1>0, the control proceeds to step 2105, which clears the first delay counter CDLY1, and then proceeds to step 2106. If CDLY1$\leq$0, the control proceeds directly to step 2106. At step 2106, the first delay counter CDLY1 is counted down by 1, and at step 2107, it is determined whether or not CDLY1<TDL1. Note that TDL1 is a lean delay time period for which a rich state is maintained even after the output of the upstream-side $O_2$ sensor 13 is changed from the rich side to the lean side, and is defined by a negative value. Therefore, at step 2107, only when CDLY1<TDL1 does the control proceed to step 2108, which causes CDLY1 to be TDL1, and then to step 2109, which causes a first air-fuel ratio flag F1 to be "0" (lean state). On the other hand, if $V_1>V_{R1}$, which means that the current air-fuel ratio is rich, the control proceeds to step 2110, which determines whether or not the value of the first delay counter CDLY1 is negative. If CDLY1<0, the control proceeds to step 2111, which clears the first delay counter CDLY1, and then proceeds to step 2112. If CDLY1$\geq$0, the control directly proceeds to 2112. At step 2112, the first delay counter CDLY1 is counted up by 1, and at step 2113, it is determined whether or not CDLY1>TDR1. Note that TDR1 is a rich delay time period for which a lean state is maintained even after the output of the upstream-side $O_2$ sensor 13 is changed from the lean side to the rich side, and is defined by a positive value. Therefore, at step 2113, only when CDLY1>TDR1 does the control proceed to step 2114, which causes CDLY1 to be TDR1, and then to step 2115, which causes the first air-fuel ratio flag F1 to be "1" (rich state).

Next, at step 2116, it is determined whether or not the first air-fuel ratio flag F1 is reversed, i.e., whether or not the delayed air-fuel ratio detected by the upstream-side $O_2$ sensor 13 is reversed. If the first air-fuel ratio flag F1 is reversed, the control proceeds to steps 2117 to 2119, which carry out a skip operation. That is, if the flag F1 is "0" (lean) at step 2117, the control proceeds to step 2118, which remarkably increases the correction amount FAF by a skip amount RSR. Also, if the flag F1 is "1" (rich) at step 2117, the control proceeds to step 2119, which remarkably decreases the correction amount FAF by the skip amount RSZ. On the other hand, if the first air-fuel ratio flag F1 is not reversed at step 2116, the control proceeds to steps 2120 to 2122, which carries out an integration operation. That is, if the flag F1 is "0" (lean) at step 2120, the control proceeds to step 2121, which gradually increases the correction amount FAF by a rich integration amount KIR. Also, if the flag F1 is "1" (rich) at step 2120, the control proceeds to step 2122, which gradually decreases the correction amount FAF by a lean integration amount KIL.

The correction amount FAF is guarded by a minimum value 0.8 at steps 2123 and 2124, and by a maximum value 1.2 at steps 2125 and 2126, thereby also preventing the controlled air-fuel ratio from becoming overrich or overlean.

The correction amount FAF is then stored in the RAM 105, thus completing this routine of FIG. 21 at step 2128.

The operation by the flow chart of FIG. 21 will be further explained with reference to FIGS. 22A through 22D. As illustrated in FIG. 22A, when the air-fuel ratio A/F is obtained by the output of the upstream-side $O_2$ sensor 13, the first delay counter CDLY1 is counted up during a rich state, and is counted down during a lean state, as illustrated in FIG. 22B. As a result, a delayed air-fuel ratio corresponding to the first air-fuel ratio flag F1 is obtained as illustrated in FIG. 22C. For example, at time $t_1$, even when the air-fuel ratio A/F is changed from the lean side to the rich side, the delayed air-fuel ratio F1 is changed at time $t_2$ after the rich delay time period TDR1. Similarly, at time $t_3$, even when the air-fuel ratio A/F is changed from the rich side to the lean side, the delayed air-fuel ratio F1 is changed at time $t_4$ after the lean delay time period TDL1. However, at time $t_5$, $t_6$, or $t_7$, when the air-fuel ratio A/F is reversed within a smaller time period than the rich delay time period TDR1 or the lean delay time period TDL1, the delayed air-fuel ratio F1 is reversed at time $t_8$. That is, the delayed air-fuel ratio F1 is stable when compared with the air-fuel ratio A/F. Further, as illustrated in FIG. 22D, at every change of the delayed air-fuel ratio F1 from the rich side to the lean side, or vice versa, the correction amount FAF is skipped by the skip amount RSR or RSL, and also, the correction amount FAF is gradually increased or decreased in accordance with the delayed air-fuel ratio F1.

Air-fuel ratio feedback control operations by the downstream-side $O_2$ sensor 15 will be explained. There are two types of air-fuel ratio feedback control operations by the downstream-side $O_2$ sensor 15, i.e., the operation type in which a second air-fuel ratio correction amount FAF2 is introduced thereinto, and the operation type in which an air-fuel ratio feedback control parameter in the air-fuel ratio feedback control operation by the upstream-side $O_2$ sensor 13 is variable. Further, as the air fuel ratio feedback control parameter, there are nominated a delay time period TD (in more detail, the rich delay time period TDR1 and the lean delay time period TDL1), a skip amount RS (in more detail, the rich skip amount RSR and the lean skip amount RSL), and an integration amount KI (in more detail, the rich integration amount KIR and the lean integration amount KIL).

For example, if the rich delay time period becomes larger than the lean delay time period (TDR1>TDL1), the controlled air-fuel ratio becomes richer, and if the lean delay time period becomes larger than the rich delay time period (TDL1>TDR1), the controlled air-fuel ratio becomes leaner. Thus the air-fuel ratio can be controlled by changing the rich delay time period TDR1 and the lean delay time period TDL1 in accordance with the output of the downstream-side $O_2$ sensor 15. Also, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream-side $O_2$ sensor 15. Further, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner.

Thus, the air-fuel ratio can be controlled by changing the rich integration amount KIR and the lean integration amount KIL in accordance with the output of the downstream-side $O_2$ sensor 15. Still further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream-side $O_2$ sensor 15.

A double $O_2$ sensor system, in which an air-fuel ratio feedback control parameter of the air-fuel ratio feedback control by the downstream-side $O_2$ sensor is variable, will be explained with reference to FIGS. 23, 24A through 24I, 25, and 26. In this case, the delay time periods TDR1 and TDL1 as the air-fuel ratio feedback control constants are variable.

Figure 23A:
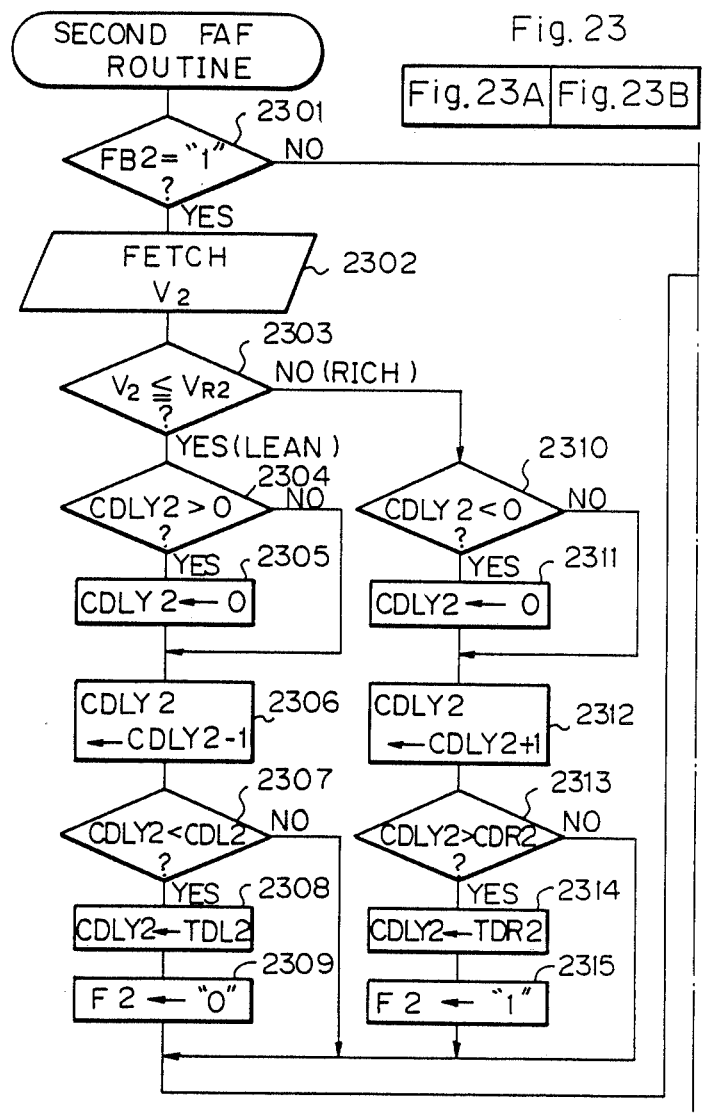
Figure 23B:
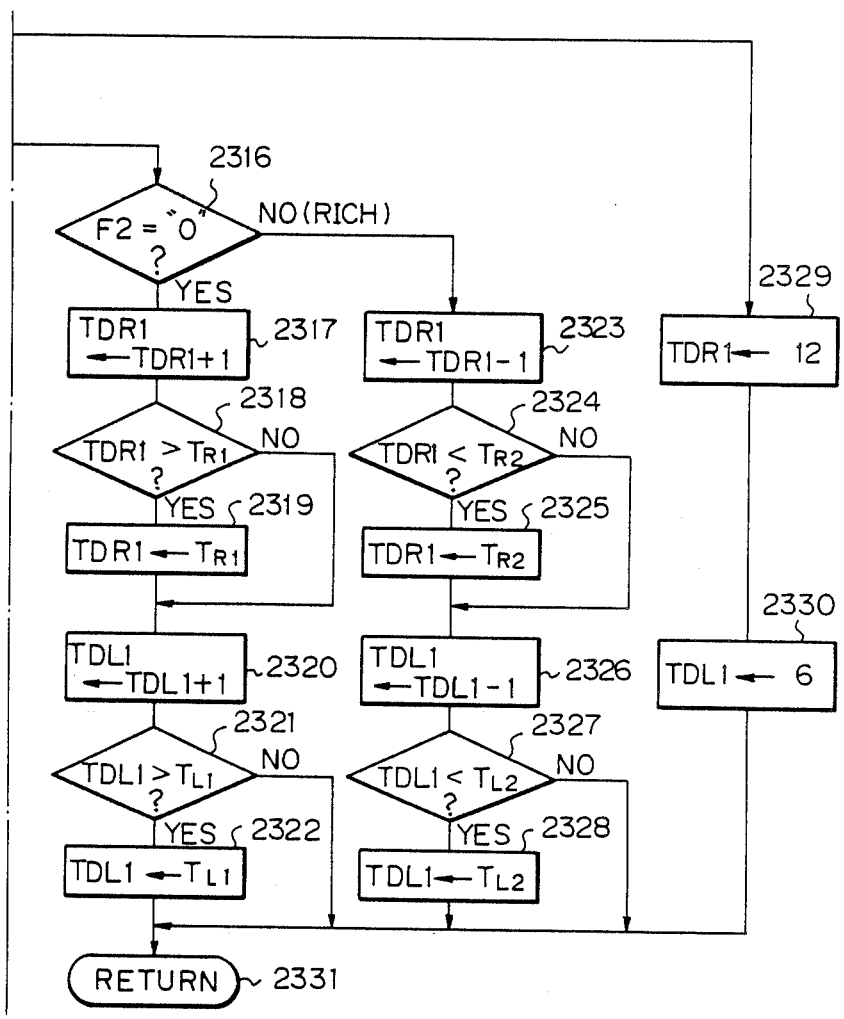

FIG. 23 is a routine for calculating the delay time periods TDR1 and TDL1 in accordance with the output of the downstream-side $O_2$ sensor 15 executed at every predetermined time period such as 1 s.

At step 2301, it is determined whether or not the feedback control execution flag FB2 is "1". If FB2="0", the control proceeds to step 2329 in which the rich delay time period TDR1 is caused to be a definite value such as 12(48 ms), and also proceeds to step 2330 in which the lean delay time period TDL1 is caused to be a definite value such as −6(24 ms), thereby carrying out an open-loop control for the downstream-side $O_2$ sensor 15.

Contrary to the above, at step 2301, if FB2="1", the control proceeds to step 2302.

At step 2302, an A/D conversion is performed upon the output voltage $V_2$ of the second $O_2$ sensor 15, and the A/D converted value thereof is then fetched from the A/D converter 101. Then, at step 2303, the voltage $V_2$ is compared with a reference voltage $V_{R2}$ such as 0.55 V, thereby determining whether the current air-fuel ratio detected by the downstream-side $O_2$ sensor 15 is on the rich side or on the lean side with respect to the stoichiometric air-fuel ratio. Note that the reference voltage $V_{R2}$ (=0.55 V) is preferably higher than the reference voltage $V_{R1}$ (=0.45 V), in consideration of the difference in output characteristics and deterioration speed between the $O_2$ sensor 13 upstream of the catalyst converter 12 and the second $O_2$ sensor 15 downstream of the catalyst converter 12.

Steps 2304 through 2315 correspond to steps 2104 through 2115, respectively, thereby performing a delay operation upon the determination at step 2303. Here, a rich delay time period is defined by TDR2, and a lean delay time period is defined by TDL2. As a result of the delayed determination, if the air-fuel ratio is rich, a second air-fuel ratio flag F2 is caused to be "1", and if the air-fuel ratio is lean, the second air-fuel ratio flag F2 is caused to be "0".

At step 2316, it is determined whether or not the second air-fuel ratio flag F2 is "0". If F2="0", which means that the air-fuel ratio is lean, the control proceeds to steps 2317 through 2322, and if F2="1", which means that the air-fuel ratio is rich, the control proceeds to steps 2323 through 2328.

At step 2317, the rich delay time period TDR1 is increased by 1 to move the air-fuel ratio to the rich side. At steps 2318 and 2319, the rich delay time period TDR1 is guarded by a maximum value $T_{R1}$. Further, at step 2320, the lean delay time period TDL1 is decreased by 1 to move the air-fuel ratio to the rich side. At steps 2321 and 2322, the lean delay time period TDL1 is guarded by a minimum value $T_{L1}$.

On the other hand, at step 2323, the rich delay time period TDR1 is decreased by 1 to move the air-fuel ratio to the lean side. At steps 2324 and 2325, the rich delay time period TDR1 is guarded by the minimum value $T_{R1}$. Further, at step 2326, the lean delay time period TDL1 is increased by 1 to move the air-fuel ratio to the lean side. At steps 2327 and 2328, the lean delay time period TDL1 is guarded by the maximum value MAX.

The delay time periods TDR1 and TDL1 are then stored in the RAM 105, thereby completing this routine of FIG. 23 at step 2331.

Thus, according to the routine of FIG. 23, when the delayed output of the downstream-side $O_2$ sensor 15 is lean, the rich delay time period TDR1 is gradually increased, and the lean delay time period TDL1 is gradually decreased, thereby moving the air-fuel ratio to the rich side. Contrary to this, when the delayed output of the downstream-side $O_2$ sensor 15 is rich, the rich delay time period TDR1 is gradually decreased, and the lean delay time period TDL1 is gradually increased, thereby moving the air-fuel ratio to the lean side.

FIGS. 24A through 24I are timing diagrams for explaining the air-fuel ratio correction amount FAF and the delay time periods TDR1 and TDL1 obtained by the flow charts of FIGS. 21 and 23. When the output $V_1$ of the upstream-side $O_2$ sensor 13 is changed as illustrated in FIG. 24A, the determination at step 2103 of FIG. 21 is shown in FIG. 24B, and a delayed determination thereof corresponding to the first air-fuel ratio flag F1 is shown in FIG. 24C. As a result, as shown in FIG. 24D, every time the delayed determination is changed from the rich side to the lean side, or vice versa, the air-fuel ratio correction amount FAF is shipped by the skip amount RSR or RSL, and is also gradually increased or decreased by the integration amount KIR or KIL in accordance with the delayed air-fuel ratio F1. On the other hand, when the output of the downstream-side $O_2$ sensor 15 is changed as illustrated in FIG. 24E, the determination of step 2303 of FIG. 23 is shown in FIG. 24F, and the delayed determination thereof corresponding to the second air-fuel ratio flag F2 is shown in FIG. 34G. As shown in FIGS. 24H and 24I, when the delayed determination F2 is lean, the rich delay time period TDR1 and the lean delay time period TDL1 are both increased, and when the delayed determination F2 is rich, the rich delay time period TDR1 and the lean delay time period TDL1 are both decreased. In this case, the rich delay time-period TDR1 and the lean delay time period TDL1 are changed within a range from $T_{R1}$ to $T_{R3}$ (or from $T_{L1}$ to $T_{L2}$).

Figure 25:
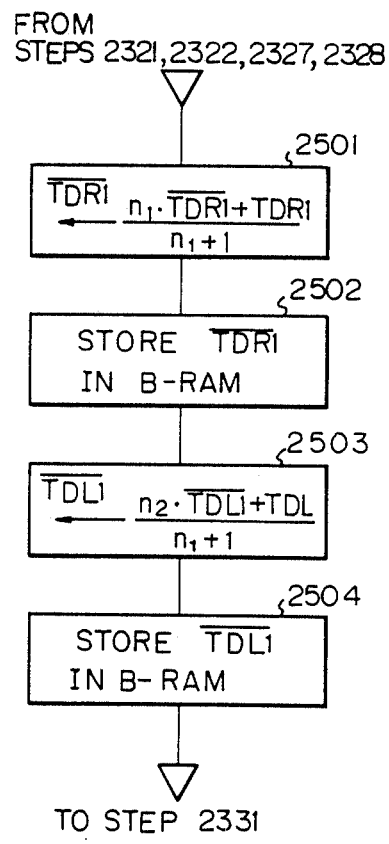

FIG. 25 is a modification of the routine of FIG. 23. That is, the flow at step 2321, 2322, 2327, or 2328 proceeds via steps 2501 through 2504 of FIG. 25 to step 2331. Namely, steps 2329 and 2330 of FIG. 23 are deleted. At step 2501, the blunt value TDR1 of the rich delay time period TDR1 is calculated by $$TDR1 \leftarrow \frac{n_1 \cdot TDR1 + TDR1}{n_1 + 1}$$

where $n_1$ is a constant. Note that the value TDR1 can be a mean value of TDR1. Then, at step 2502, the mean or blunt value TDR1 is stored in the backup RAM 106.

Similarly, at step 2503, the blunt value TDL1 of the lean delay time period TDL1 is calculated by $$TDL1 \leftarrow \frac{n_2 \cdot TDL1 + TDL1}{n_2 + 1}$$

where $n_2$ is a constant. Note that the value TDL1 can be also a mean value of TDL1. Then, at step 2504, the mean or blunt value TDL1 is stored in the backup RAM 106. Thus, if the routine of FIG. 23 is modified by FIG. 25, the routine of FIG. 21 uses the mean or blunt values TDR1 and TDL1 stored in the backup RAM 106 instead of the values TDR1 and TDL1 stored in the RAM 105.

According to the routine of FIG. 23 modified by FIG. 25, when the downstream-side $O_2$ sensor 15 is in a nonactivation state, i.e., in an abnormal state before the completion of engine warming up, the feedback control by the upstream-side $O_2$ sensor 13 is carried out by using the mean or blunted delay time periods TDR1 and TDL1 which are determined immediately after a previous activation state of the downstream-side $O_2$ sensor 15. This is helpful in avoiding the fluctuation of the controlled air-fuel ratio when the downstream-side $O_2$ sensor 15 is in an abnormal state (or in a nonactivation state).

Figure 26:
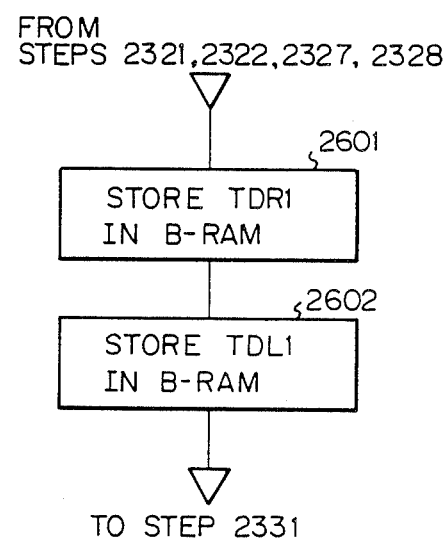

FIG. 26 is also a modification of the routine of FIG. 23. That is, the flow at step 2321, 2322, 2327, or 2328 proceeds via steps 2601 through 2602 of FIG. 26 to step 2331. Instead of this, steps 2329 and 2330 of FIG. 23 are also deleted. At step 2601, the rich delay time period TDR1 is stored in the backup RAM 106, and at step 2602, the lean delay time period TDL1 is stored in the backup RAM 106. Thus, if the routine of FIG. 23 is modified by FIG. 26, the routine of FIG. 21 uses the values TDR1 and TDL1 stored in the backup RAM 106 instead of the values TDR1 and TDL1 stored in the RAM 105.

According to the routine of FIG. 23 modified by FIG. 26, the same effect can be obtained in the same way in the routine of FIG. 23 modified by FIG. 25.

In FIGS. 23, 25, and 26, note that only one of the rich delay time period TDR1 and the lean delay time period TDL1 can be variable by the output $V_2$ of the downstream-side $O_2$ sensor 15.

Another double $O_2$ sensor system will be explained with reference to FIGS. 27, 28A through 28I, 39, and 30. In this case, the skip amounts RSR and RSL as the air-fuel ratio feedback control constants are variable.

Figure 27A:
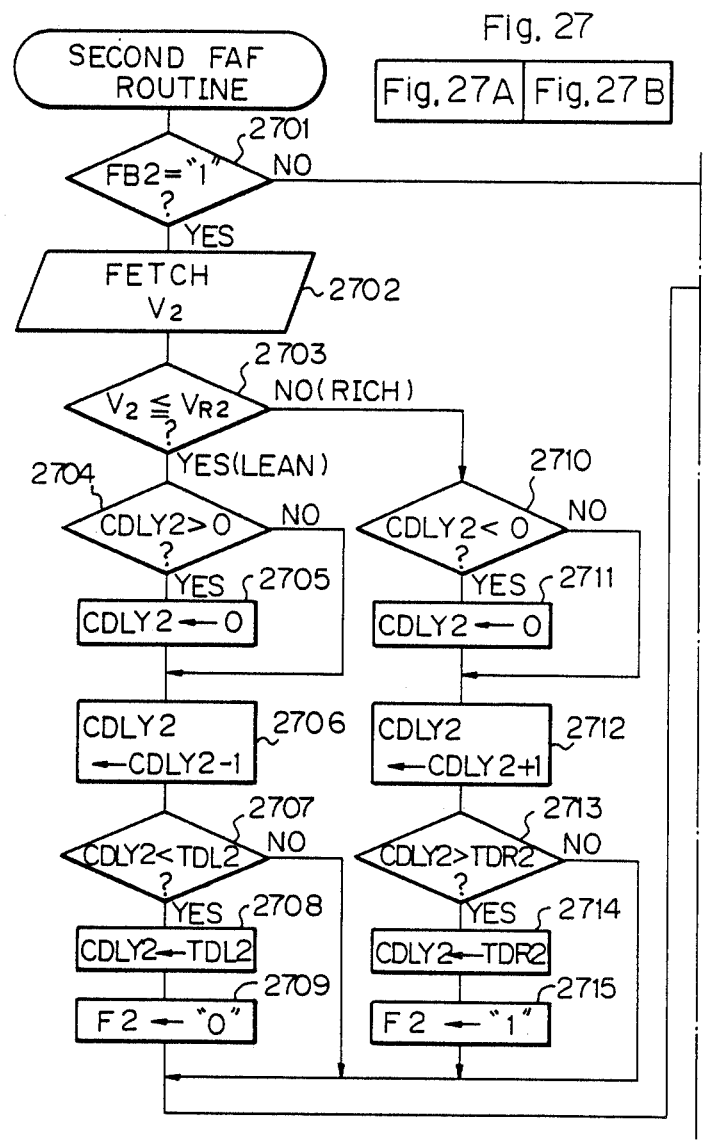
Figure 27B:
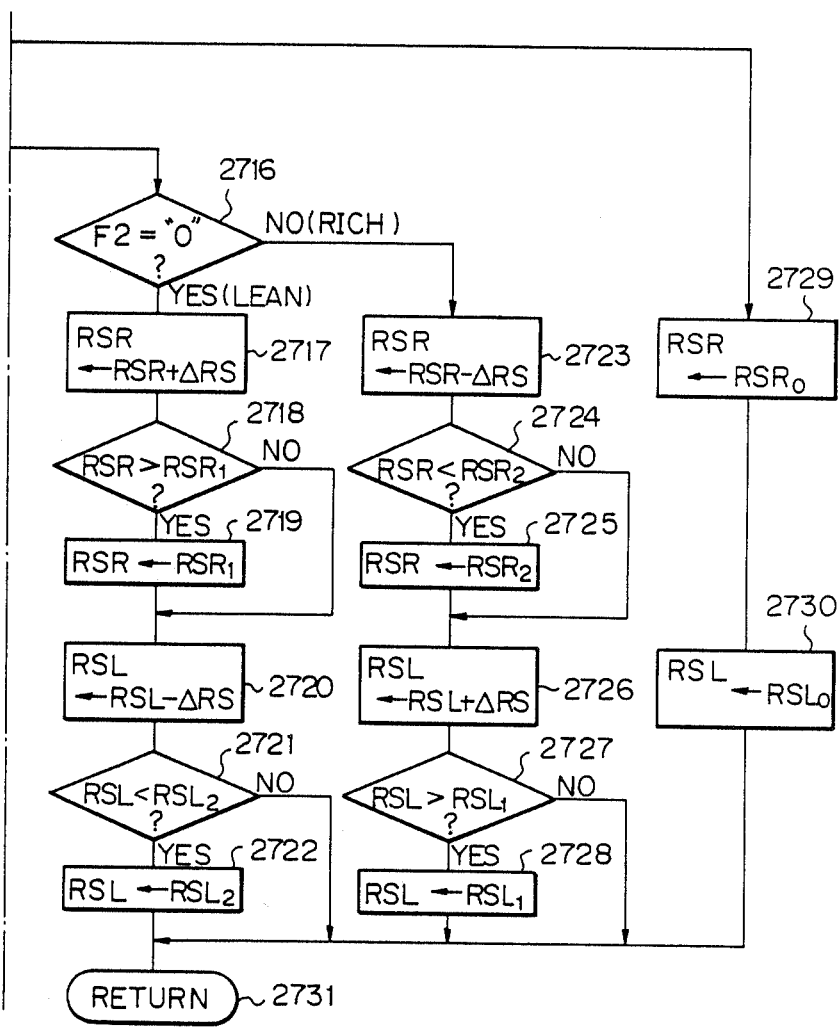

FIG. 27 is a routine for calculating the skip amounts RSR1 and RSL1 in accordance with the output of the downstream-side $O_2$ sensor 15 executed at every predetermined time period such as 1 s.

Steps 2701 through 2715 are the same as steps 2301 through 2315 of FIG. 23. That is, if FB2="0", the control proceeds to steps 2729 and 2730, thereby carrying out an open-loop control operation. For example, the rich skip amount RSR and the lean skip amount RSL are made definite values $RSR_0$ and $RSL_0$ which are, for example, 5%. Contrary to the above, if FB2="1", the second air-fuel ratio flag F2 is determined by the routine or steps 2703 through 2715.

At step 2716, it is determined whether or not the second air-fuel ratio F2 is "0". If F2="0", which means that the air-fuel ratio is lean, the control proceeds to steps 2717 through 2722, and if F2="1", which means that the air-fuel ratio is rich, the control proceeds to steps 2723 through 2738.

At step 2717, the rich skip amount RSR is increased by a definite value ΔRS which is, for example, 0.08, to move the air-fuel ratio to the rich side. At steps 2718 and 2719, the rich skip amount RSR1 is guarded by a maximum value $RSR_1$ which is, for example, 6.2%. Further, at step 2720, the lean skip amount RSL is decreased by the definite value ΔRS to move the air-fuel ratio to the lean side. At steps 2721 and 2722, the lean skip amount RSL is guarded by a minimum value RSL which is, for example, 2.5%.

On the other hand, at step 2723, the rich skip amount RSR is decreased by the definite value ΔRS to move the air-fuel ratio to the lean side. At steps 2724 and 2725, the rich skip amount RSR is guarded by the minimum value RSR. Further, at step 2726, the lean skip amount RSL is decreased by the definite value ΔRS to move the air-fuel ratio to the rich side. At steps 2727 and 2728, the lean skip amount RSL is guarded by the maximum value $RSL_1$.

The skip amounts RSR and RSL are then stored in the RAM 105, thereby completing this routine of FIG. 27 at step 2728.

Thus, according to the routine of FIG. 27, when the delayed output of the downstream-side $O_2$ sensor 15 is lean, the rich skip amount RSR is gradually increased, and the lean skip amount RSL is gradually decreased, thereby moving the air-fuel ratio to the rich side. Contrary to this, when the delayed output of the downstream-side $O_2$ sensor 15 is rich, the rich skip amount RSR is gradually decreased, and the lean skip amount RSL is gradually increased, thereby moving the air-fuel ratio to the lean side.

Figures 28A, 28B, 28C, 28D, 28E, 28F, 28G, 28H, 28I:
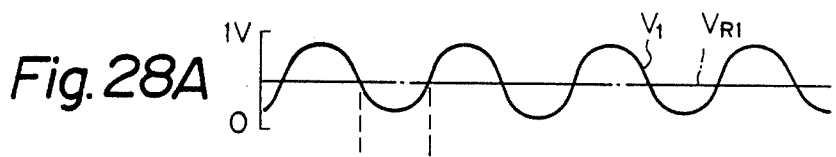
FIGS. 28A through 28I are timing diagrams explaining the flow chart of FIG. 27.

FIGS. 28A through 28I are timing diagrams for explaining the air-fuel ratio correction amount FAF and the skip amounts RSR and RSL obtained by the flow charts of FIGS. 21 and 27. FIGS. 28A through 28G are the same as FIGS. 24A through 24H, respectively. As shown in FIGS. 28G, 28H, and 28I, when the delayed determination F2 is lean, the rich skip amount RSR is increased and the lean skip amount RSL is decreased, and when the delayed determination F2 is rich, the rich skip amount RSR is decreased and the lean skip amount RSL is increased. In this case, the skip amounts RSR and RSL are changed within a range from $RSR_1$ to $RSR_2$ or from $RSL_1$ to $RSL_2$).

FIG. 29 is a modification of the routine of FIG. 27. That is, the flow at step 2721, 2722, 2727, or 2728 proceeds via steps 2901 through 2904 of FIG. 29 to step 2731. Namely, steps 2729 and 2730 of FIG. 27 are deleted. At step 2901, the blunt value $\overline{RSR}$ of the rich skip amount RSR is calculated by $$RSR \leftarrow \frac{n_3 \cdot \overline{RSR} + RSR}{n_3 + 1}$$

where $n_3$ is a constant. Note that the value $\overline{RSR}$ can be a mean value of RSR. Then, at step 2902, the mean or blunt value $\overline{RSR}$ is stored in the backup RAM 106. Similarly, at step 2903, the blunt value $\overline{RSR}$ of the lean skip amount RSL is calculated by $$RSR \leftarrow \frac{n_4 \cdot \overline{RSR} + RSR}{n_4 + 1}$$

where $n_4$ is a constant. Note that the value can be also a mean value of $\overline{RSL}$. Then, at step 2904, the mean or blunt value $\overline{RSL}$ is stored in the backup RAM 106. Thus, if the routine of FIG. 27 is modified by FIG. 29, the routine of FIG. 21 uses the mean or blunt values $\overline{RSR}$ and $\overline{RSL}$ stored in the backup RAM 106 instead of the values RSR and RSL stored in the RAM 105.

According to the routine of FIG. 27 modified by FIG. 29, when the downstream-side $O_2$ sensor 15 is in a nonactivation state, i.e., in an abnormal state before the completion of engine warming up, the feedback control by the upstream-side $O_2$ sensor 13 is carried out by using the mean or blunted delay time periods RSR and RSL which are determined immediately after a previous activation state of the downstream-side $O_2$ sensor 15. This is also helpful in avoiding the fluctuation of the controlled air-fuel ratio when the downstream-side $O_2$ sensor 15 is in an abnormal state (or in a nonactivation state).

FIG. 30 is also a modification of the routine of FIG. 27. That is, the flow at step 2721, 2722, 2727, or 2728 proceeds via steps 3001 through 3002 of FIG. 30 to step 2731. Instead of this, steps 2729 and 2730 of FIG. 27 are also deleted. At step 3001, the rich skip amount RSR is stored in the backup RAM 106, and at step 3002, the lean skip amount RSL is stored in the backup RAM 106. Thus, if the routine of FIG. 27 is modified by FIG. 30, the routine of FIG. 21 uses the values RSR and RSL stored in the backup RAM 106 instead of the values RSR and RSL stored in the RAM 105.

According to the routine of FIG. 27 modified by FIG. 30, the same effect can be obtained in the same way in the routine of FIG. 27 modified by FIG. 29.

In FIGS. 27, 29, and 30, note that only one of the rich skip amount RSR and the lean skip amount RSL can be made variable by the output $V_2$ of the downstream-side $O_2$ sensor 15.

A further double $O_2$ sensor system will be explained with reference to FIGS. 31, 32A through 32I, 33, and 34. In this case, the integration amounts KIR and KIL as the air-fuel ratio feedback control constants are variable.

Figure 31A:
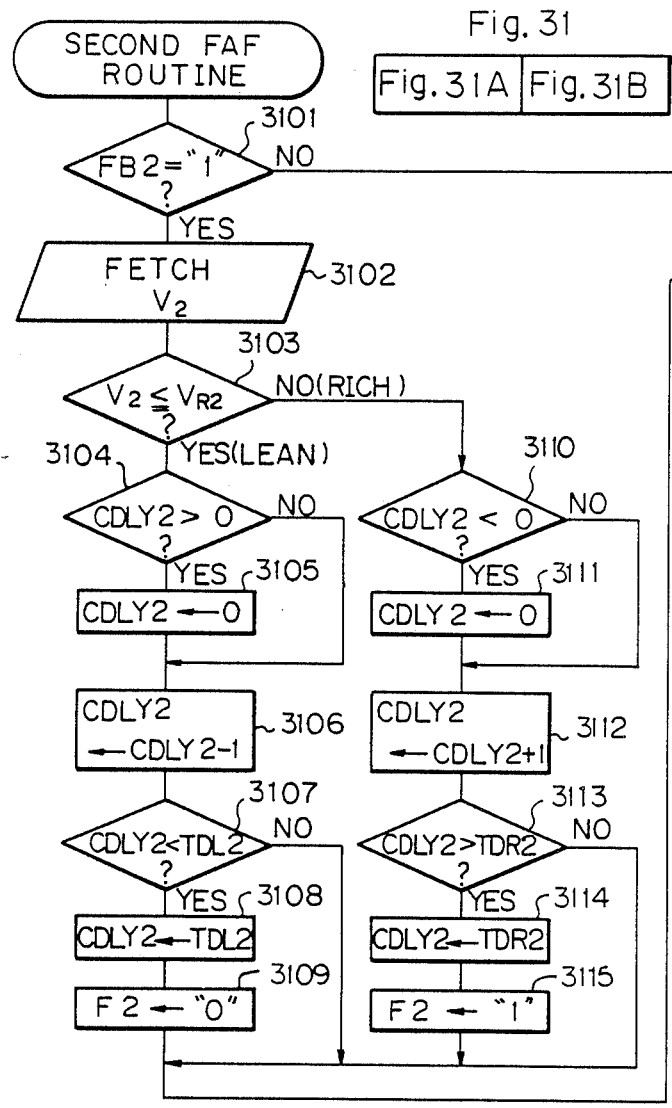
Figure 31B:
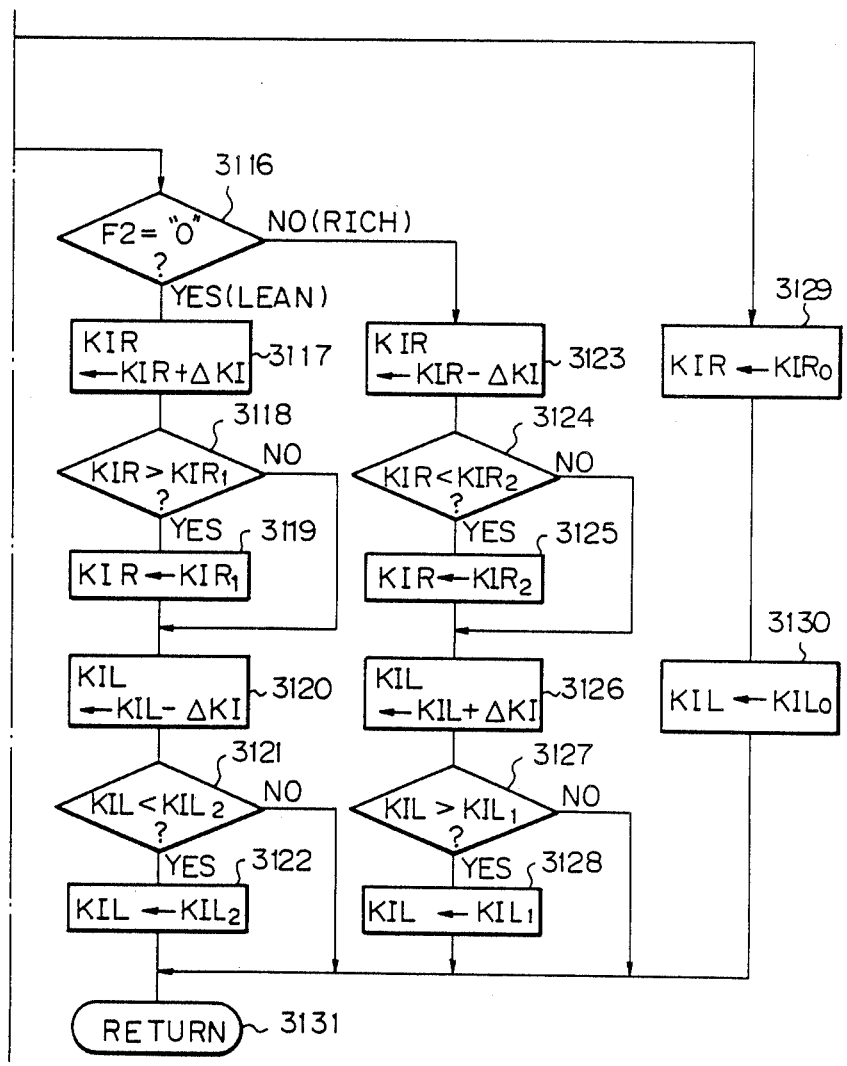

FIG. 31 is a routine for calculating the integration amounts KIR and KIL in accordance with the output of the downstream-side $O_2$ sensor 15 executed at every predetermined time period such as 1 s.

Steps 3101 through 3115 are the same as steps 2301 through 2315 of FIG. 23. That is, if FB2="0", the control proceeds to steps 3129 and 3130, thereby carrying out an open-loop control operation. For example, the rich integration amount KIR and the lean integration amount RIL are made definite values $KIR_0$ and $KIL_0$ which are, for example, 5%/s. Contrary to the above, if FB2="1", the second air-fuel ratio flag F2 is determined by the routine of steps 3103 through 3115.

At step 3116, it is determined whether or not the second air-fuel ratio F2 is "0". If F2="0", which means that the air-fuel ratio is lean, the control proceeds to steps 3117 through 3132, and if F2="1", which means that the air-fuel ratio is rich, the control proceeds to steps 3123 through 3128.

At step 3117, the rich integration amount KIR is increased by a definite value ΔKI to move the air-fuel ratio to the rich side. At steps 3118 and 3119, the rich integration amount KIR is guarded by a maximum value $KIR_1$ which is, for example, 10%/s. Further, at step 3120, the lean integration amount KIL is decreased by the definite value ΔKI to move the air-fuel ratio to the lean side. At steps 3121 and 3122, the lean integration amount KIL is guarded by a minimum value KIL$_2$ which is, for example, 3%/s.

On the other hand, at step 3123, the rich integration amount KIR is decreased by the definite value ΔKI to move the air-fuel ratio to the lean side. At steps 3124 and 3125, the rich integration amount KIR is guarded by the minimum value KIR$_2$. Further, at step 3126, the lean integration amount KIL is decreased by the definite value ΔKI to move the air-fuel ratio to the rich side. At steps 3127 and 3128, the lean integration amount KIL is guarded by the maximum value KIL$_1$.

The integration amounts KIR and KIL are then stored in the RAM 105, thereby completing this routine of FIG. 31 at step 3128.

Thus, according to the routine of FIG. 31, when the delayed output of the downstream-side O$_2$ sensor 15 is lean, the rich integration amount KIR is gradually increased, and the lean integration amount KIL is gradually decreased, thereby moving the air-fuel ratio to the rich side. Contrary to this, when the delayed output of the downstream-side O$_2$ sensor 15 is rich, the rich integration amount KIR is gradually decreased, and the lean integration amount KIR is gradually increased, thereby moving the air-fuel ratio to the lean side.

Figure 32A:
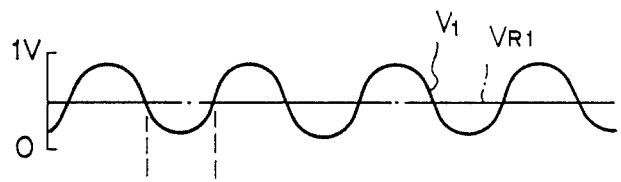
Figure 32D:
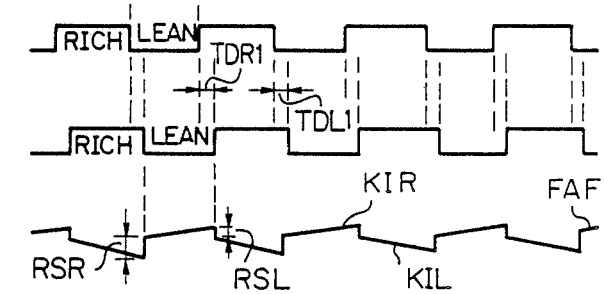
Figure 32E:
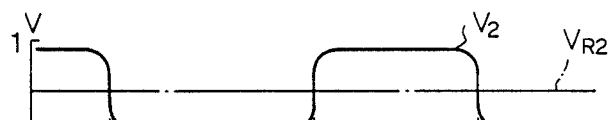
Figure 32G:
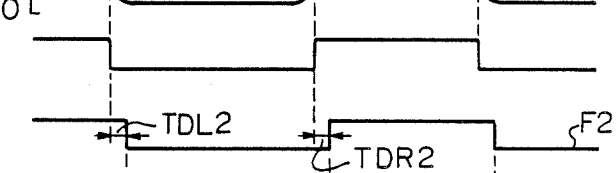
Figure 32I:
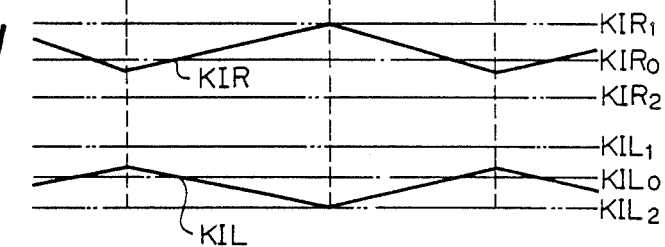

FIGS. 32A through 32I are timing diagrams for explaining the air-fuel ratio correction amount FAF and the integration amounts KIR and KIL obtained by the flow charts of FIGS. 21 and 31. FIGS. 32A through 32G are the same as FIGS. 24A through 24H, respectively. As shown in FIGS. 32G, 32H, and 32J, when the delayed determination F2 is lean, the rich integration amount KIR is increased and the lean integration amount KIL is decreased, and when the delayed determination F2 is rich, the rich integration amount KIR is decreased and the lean integration amount KIL is increased. In this case, the integration amounts KIR and KIL are changed within a range from KIR$_1$ to KIR$_2$ or from KIL$_1$ to KIL$_2$).

Figure 33:
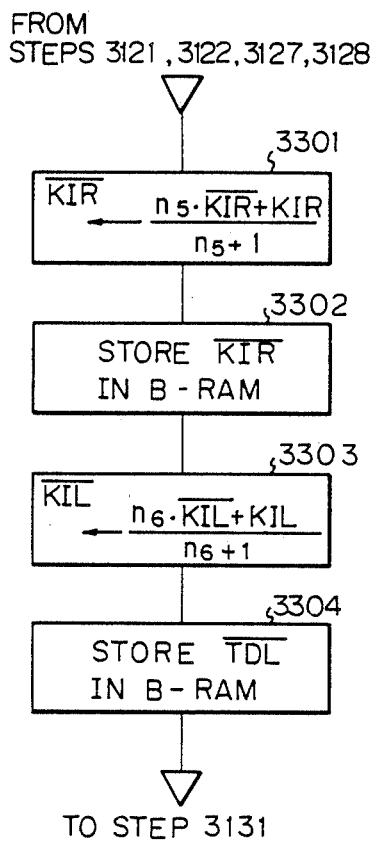

FIG. 33 is a modification of the routine of FIG. 31. That is, the flow at step 3121, 3122, 3127, or 3128 proceeds via steps 3301 through 3304 of FIG. 33 to step 3131. Namely, steps 3129 and 3130 of FIG. 3 are deleted. At step 3301, the blunt value KIR of the rich integration amount KIR is calculated by $$\overline{KIR} \leftarrow \frac{n_5 \cdot \overline{TDR1} + TDR1}{n_5 + 1}$$

where n$_1$ is a constant. Note that the value $\overline{KIR}$ can be a mean value of $\overline{KIR}$. Then, at step 3302, the mean or blunt value $\overline{KIR}$ is stored in the backup RAM 106. Similarly, at step 3303, the blunt value KIL of the lean integration amount KIL is calculated by $$\overline{KIR} \leftarrow \frac{n_6 \cdot \overline{TDR} + TDR}{n_6 + 1}$$

where n$_6$ is a constant. Note that the value $\overline{KIL}$ can be also a mean value of KIL. Then, at step 3304, the mean or blunt value $\overline{KIL}$ is stored in the backup RAM 106. Thus, if the routine of FIG. 31 is modified by FIG. 33, the routine of FIG. 21 uses the mean or blunt values $\overline{KIR}$ and $\overline{KIL}$ stored in the backup RAM 106 instead of the values KIR and KIL stored in the RAM 105.

According to the routine of FIG. 31 modified by FIG. 33, when the downstream-side O$_2$ sensor 15 is in a nonactivation state, i.e., in an abnormal state before the completion of engine warming up, the feedback control by the upstream-side O$_2$ sensor 13 is carried out by using the mean or blunted integration amounts KIR and KIL which are determined immediately after a previous activation state of the downstream-side O$_2$ sensor 15. This is also helpful in avoiding the fluctuation of the controlled air-fuel ratio when the downstream-side O$_2$ sensor 15 is in an abnormal state (or in a nonactivation state).

Figure 34:
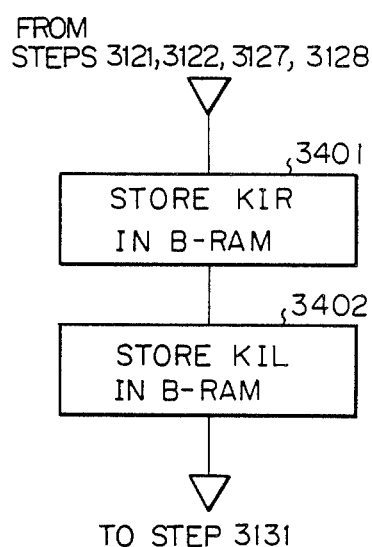

FIG. 34 is also a modification of the routine of FIG. 31. That is, the flow at step 3121, 3122, 3127, or 3128 proceeds via steps 3401 through 3402 of FIG. 34 to step 3131. Namely, steps 3129 and 3130 of FIG. 31 are also deleted. At step 3401, the rich integration amount KIR is stored in the backup RAM 106, and at step 3402, the lean integration amount KIL is stored in the backup RAM 106. Thus, if the routine of FIG. 31 is modified by FIG. 34, the routine of FIG. 21 uses the values KIR and KIL stored in the backup RAM 106 instead of the values KIR and KIL stored in the RAM 105.

According to the routine of FIG. 31 modified by FIG. 34, the same effect can be obtained in the same way in the routine of FIG. 31 modified by FIG. 33.

In FIGS. 31, 33, and 34, note that only one of the rich integration amount KIR and the lean integration amount KIL can be variable by the output V$_2$ of the downstream-side O$_2$ sensor 15.

Figure 35:
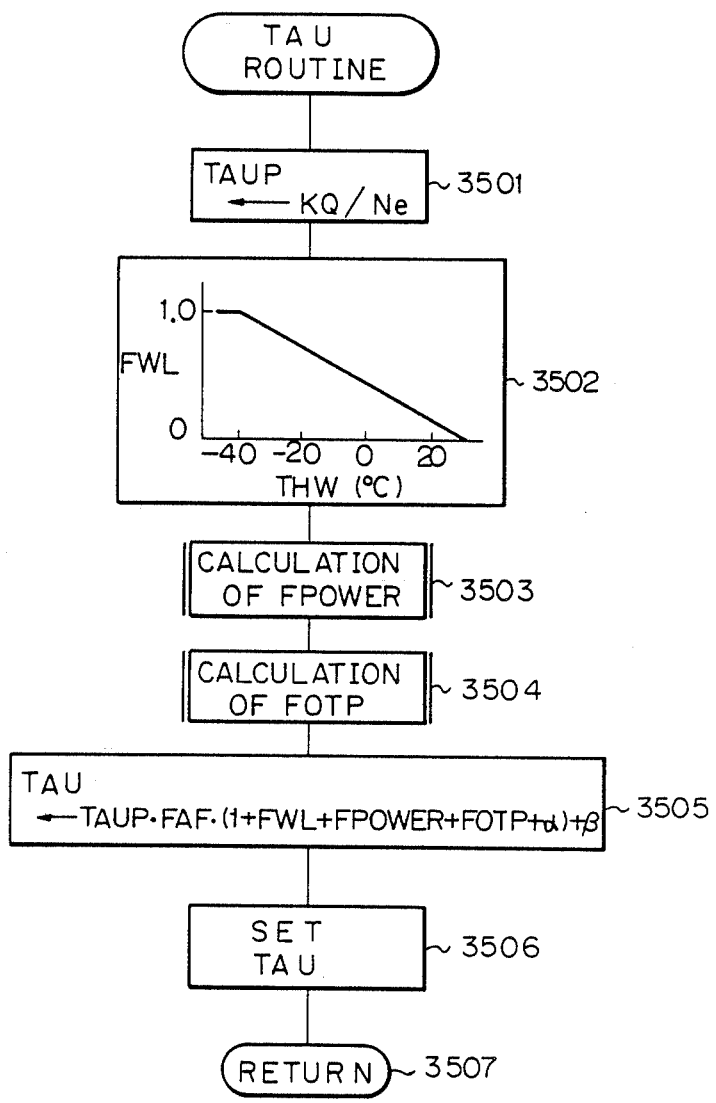

FIG. 35 is a routine for calculating a fuel injection amount TAU executed at every predetermined crank angle such as 360°CA. At step 3501, a base fuel injection amount TAUP is calculated by using the intake air amount data Q and the engine speed data Ne stored in the RAM 105. This is, TAUP←KQ/Ne where K is a constant. Then at step 3502, a warming-up incremental amount FWL is calculated from a one-dimensional map by using the coolant temperature data THW stored in the RAM 105. Note that the warming-up incremental amount FWL decreases when the coolant temperature THW increases.

At step 3503, a driving parameter such as the throttle angle data TA is read out of the RAM 105, and only when TA≧70°, is a power fuel increment FPOWER calculated. This power fuel increment FPOWER is used for increasing the output of the engine during a high load state.

At step 3504, the intake air amount data Q and the engine speed Ne are read out of the RAM 105, and an overtemperature fuel increment FOTP is calculated. The increment FOTP is used for preventing the catalyst converter 12, the exhaust pipe 14, and the like from being overheated.

Then, at step 3505, a final fuel injection amount TAU is calculated by

TAU←TAUP·FAF·(1+FWL+FPOWER+FOTP+α)+β where α and β are correction factors determined by other parameters such as the voltage of the battery and the temperature of the intake air. At step 3506, the final fuel injection amount TAU is set in the down counter 108, and in addition, the flip-flop 109 is set to initiate the activation of the fuel injection value 7. Then, this routine is completed by step 3506. Note that, as explained above, when a time period corresponding to the amount TAU has passed, the flip-flop 109 is reset by the carry-out signal of the down counter 108 to stop the activation of the fuel injection valve 7.

Figure 36A:
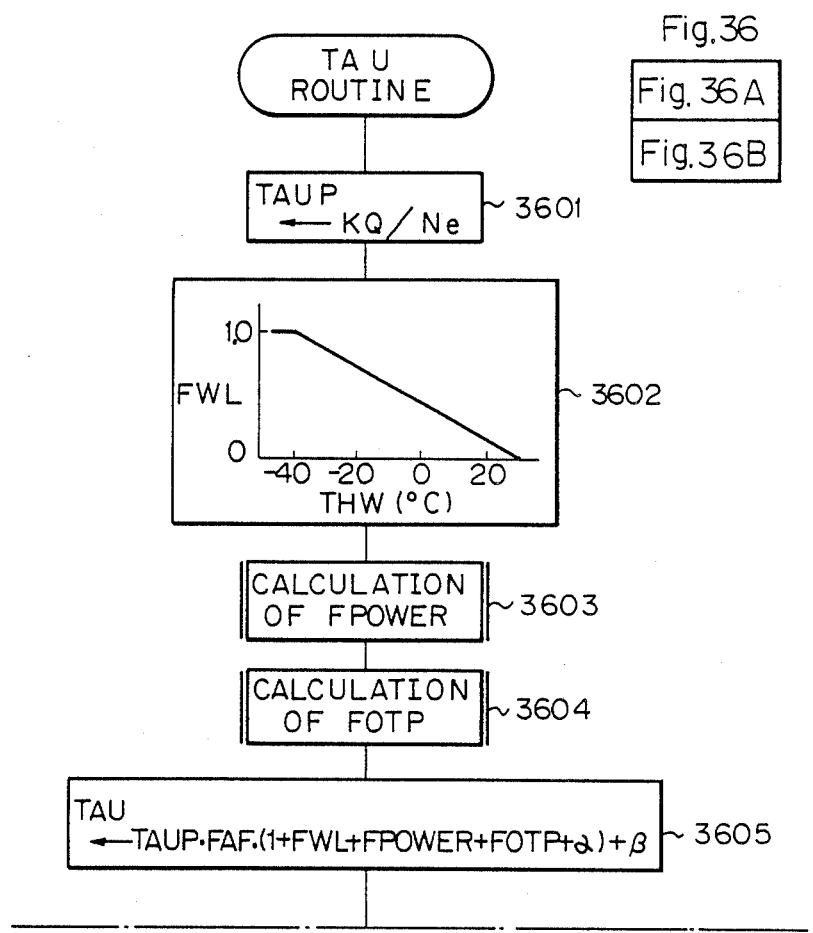
Figure 36B:
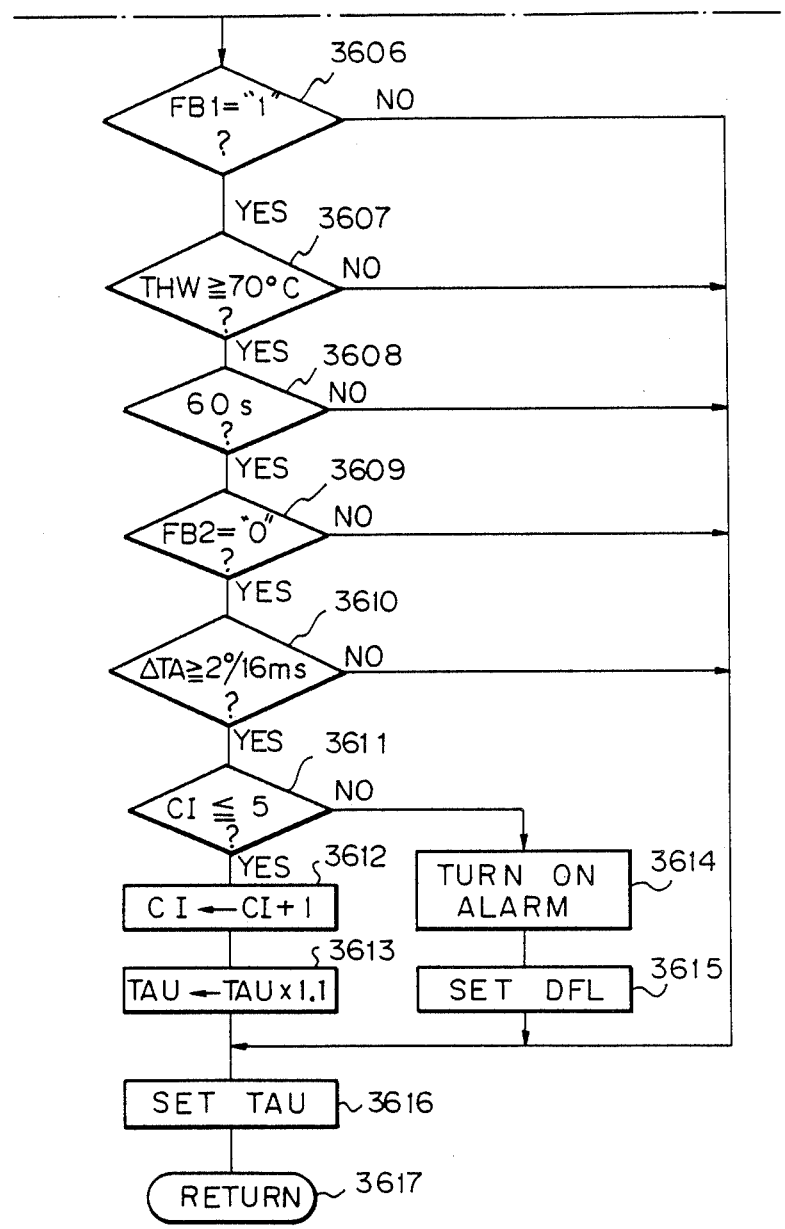

FIG. 36 is a modification of the routine of FIG. 35. In FIG. 36, steps 3601 through 3605, and steps 3616 and 3617 correspond to steps 3501 through 3507, respectively, of FIG. 35, and steps 3606 through 3616 are added thereto. That is, at step 3606, it is determined whether or not the feedback control execution flag FB1 is "1". If FB1="0", i.e., if an open-loop control operation for the upstream-side $O_2$ sensor B is carried out, the control proceeds directly to step 3616, which sets the fuel amount TAU in the down counter 108. Otherwise, the control proceeds to step 3607 which determines whether the coolant temperature THW≧70° C. is satisfied. As a result, only if THW≧70° C., does the control proceed to stop 3608. At step 3608, it is determined whether or not the duration for which THW≧70° C. exceeds 60s. That is, a timer counter is cleared when the determination of step 3607 is negative and is counted up at predetermined time period when the determination at step 3607 is positive. As a result, when the value of the timer counter exceeds 60s, the control proceeds to step 3609, which determines whether or not the feedback control execution flag FB2 is "0".

At step 3609, if FB2="0", i.e., if the downstream-side $O_2$ sensor 15 is considered to be not in an activation state, the control proceeds to step 3610, which determines whether or not the engine is in an acceleration state by determining whether or not the change ΔTA of the throttle angle TA is larger than a predetermined value such as 2°/16 ms. When in an acceleration state, the control proceeds to steps 3611 through 3613, which increases the final fuel amount TAU thereby determining whether or not the downstream-side $O_2$ sensor 15 is actually in an nonactivation state. Such a fuel increment is carried out five times at most. That is, at step 3611, it is determined whether or not a counter CI is not larger than 5. As a result, only if CI≦5, does the control proceed to step 3612, which counts up the counter CI by 1 and further proceeds to step 3613 which increases the fuel amount TAU by 10%. Then, the control proceeds to step 3616. Before the number of such fuel increments becomes smaller than 5, the air-fuel ratio detected by the downstream-side $O_2$ sensor 15 becomes rich, thereby setting the feedback control execution flag FB2, and such a fuel increment operation is suspended. Contrary to this, even after the number of such fuel increments is 5, the air-fuel ratio detected by the downstream-side $O_2$ sensor 15 does not become rich, the control proceeds to step 3614 which turns ON the alarm, which may be different from the alarm 18, and the proceeds to step 3615 which sets a diagonosis flag DFL which is stored in the backup RAM 106, thereby repairing the downstream-side $O_2$ sensor 15. Then, the control proceeds to step 3616.

Note that the routine of FIG. 36 is applied to an engine having signal processing circuits of a flow-out type as shown in FIG. 3A, since the activation/nonactivation state of the downstream-side $O_2$ sensor 15 is carried out by forcibly enriching the air-fuel ratio. When the routine of FIG. 36 is applied to an engine having signal processing circuits of a flow-in type as shown in FIG. 3B, at step 3613, a fuel decremental operation is carried out for example by

TAU←TAU×0.9

According to the routine of FIG. 36, the determination of an activation/nonactivation state (or normal/abnormal state) of the downstream-side $O_2$ sensor 15 is enhanced, and accordingly, when the downstream-side $O_2$ sensor 15 is in an activation state, the feedback control by the downstream-side $O_2$ sensor 15 is started early. Also, the determination of an activation/nonactivation state according to the routine of FIG. 36 can be carried out whether additional hardware when compared with a system for the determination of an activation/nonactivation state by reading the resistance value of the downstream-side $O_2$ sensor 15. Further, the determination of the activation/nonactivation state according to the routine of FIG. 36 can be reliably carried out as compared with a system for the determination of an activation/nonactivation state by the coolant temperature THW.

Figure 37:
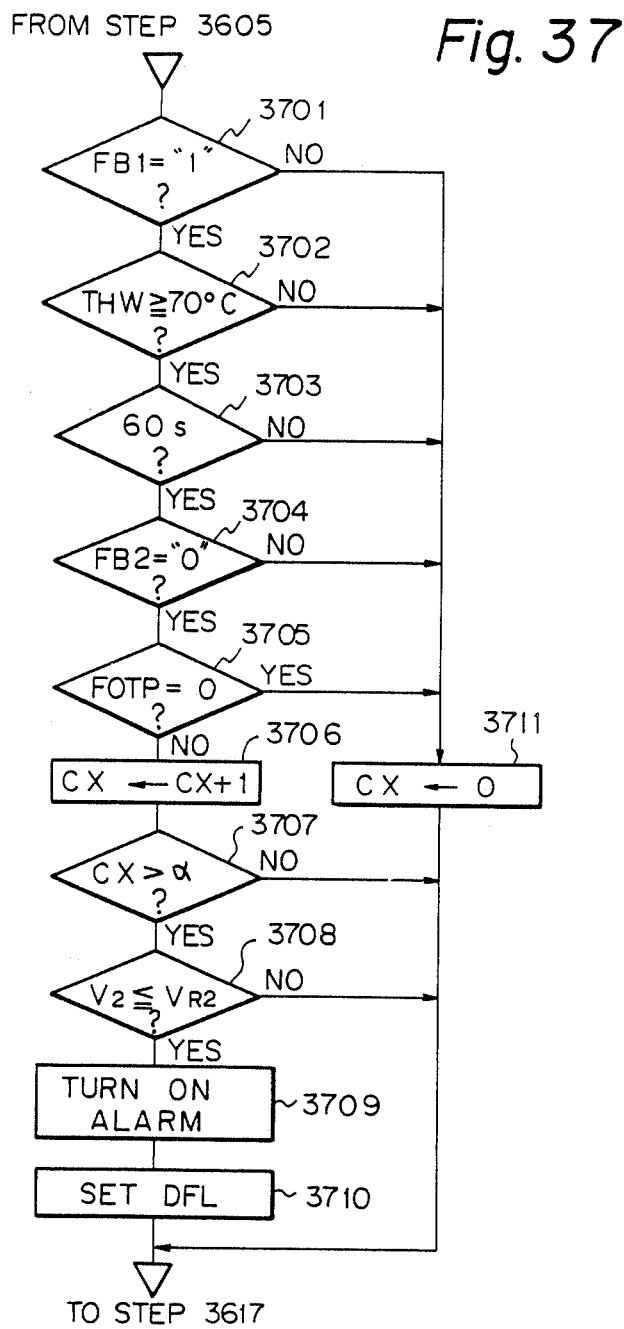

FIG. 37 is a modification of the routine of FIG. 36. That is, steps 3701 through 3711 of FIG. 37 are replaced by steps 3606 through 3615 of FIG. 36, and steps 3701 through 3704 of FIG. 37 correspond to step 3606 through 3609, respectively, of FIG. 36.

At step 3705, it is determined whether or not the engine is in a fuel enrichment state by determining whether or not an enrichment coefficient such as FOTP (or FPOWER) is 0. In this case, the overtemperature fuel increment FOTP is used. If FOTP=0, the control proceeds to step 3711 which clears a duration counter CX, and if FOTP=0, the control proceeds to step 3706 which counts up the duration counter CX by 1. Note that when the determination is made at step 3701, 3702, 3703, or 3704, the duration counter CX is also cleared by step 3711.

At step 3707, it is determined whether or not the value of the duration counter CX exceeds a value α, which is determined by the gas transport lag. As a result, if CX>α, the control proceeds to step 3708, which determines whether or not the downstream-side $O_2$ sensor 15 is in an activation state. That is, in this state, the downstream-side $O_2$ sensor 15 may be in a rich air-fuel ratio atmosphere, and accordingly, if the downstream-side $O_2$ sensor 15 is normal, the downstream-side $O_2$ sensor 15 is expected to generate a rich signal. Therefore, at step 3708, it is determined whether or not the downstream-side $O_2$ sensor 15 generates a rich signal ($V_2 > V_{R2}$) or a lean signal ($V_2 \leq V_{R2}$). If $V_2 \leq V_{R2}$, this means that the downstream-side $O_2$ sensor 15 is abnormal, and accordingly, at step 3709, the alarm is turned ON, and at step 3710, the diagonosis flag DFL is set and is stored in the backup RAM 106 for repairing the downstream-side $O_2$ sensor 15.

Note that the routine of FIG. 36 modified by FIG. 37 is applied to only an engine having signal processing circuits of a flow-out type as shown in FIG. 34, not to an engine having signal processing circuits of a flow-in type as shown in FIG. 3B, since the determination of the activation/nonactivation state is carried out by determining whether or not a rich signal during an active mode is generated therefrom.

According to the routine of FIG. 36 modified by FIG. 37, aa diagonosis operation is not carried out when no fuel increment request is made. Therefore, the drivability is not deteriorated, in addition to the effect of the routine of nonmodified FIG. 36.

In FIG. 2, since the upstream-side $O_2$ sensor 13 is provided in the concentration portion of the exhaust manifold 11, the upstream-side $O_2$ sensor 13 is cooled only by the open air. Therefore, at a high speed of the engine, when the upstream-side $O_2$ sensor 13 is exposed to an exhaust gas having a high temperature such as more than 800° C., the cooling of the upstream-side O₂ sensor 15 is insufficient. As a result, the deterioration of the downstream-side O₂ sensor 15 is enhanced, thereby creating a large fluctuation in the output thereof.

Figure 38:
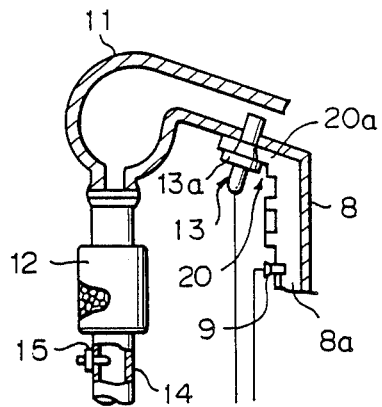
FIG. 38 is a partly cutaway, cross-sectional view of a modification of FIG. 2.
Figure 39:
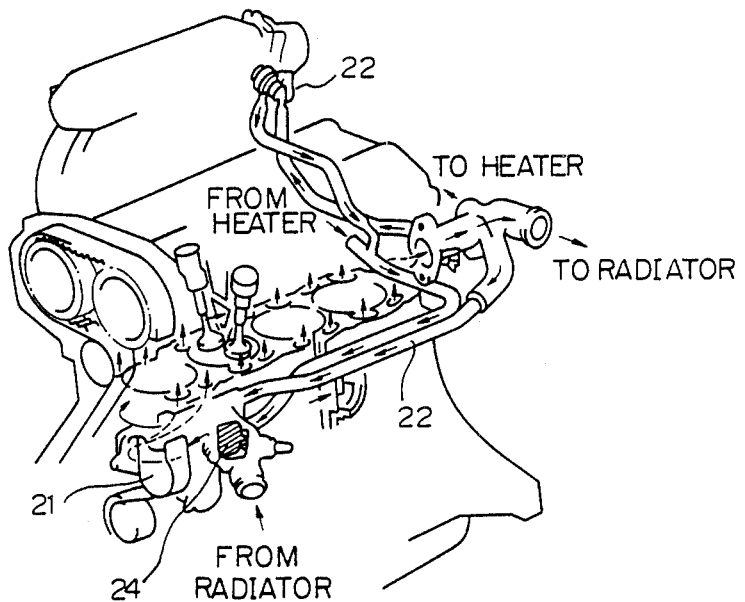
FIG. 39 is a diagram explaining the coolant path in the engine of FIG. 2.

FIG. 38 is a modification of FIG. 2. In FIG. 38, the upstream-side O₂ sensor 13 is provided at a cylinder head portion 20, and in addition, the flange portion 13a of the upstream-side O₂ sensor 13 is adhered closely to the outer wall of the cylinder head portion 20. Therefore, the upstream-side O₂ sensor 13 is cooled directly by the coolant passing through a water jacket 20a of the cylinder head portion 20, and simultaneously, the flange portion 13a of the upstream-side O₂ sensor 13 is also cooled by the above-mentioned coolant. As a result, the heat dissipation of the upstream-side O₂ sensor 13 is improved, thereby reducing the temperature thereof. Note that, as illustrated in FIG. 39, the coolant is circulated from a water pump 21 via the waterjack at 8a of the cylinder block 8, the waterjack at 20a of the cylinder head portion 20 (see FIG. 39), a throttle body portion 22, the radiator (not shown), a bypass passage 23, and a thermostat 24, to the water pump 21.

Generally, the O₂ sensors 13 and 15 are of a zirconia type which requires a reference gas (usually, the open air). Particularly, when the vehicle is driven near a river, a swamp, or a pond, the downstream-side O₂ sensor 15 is subjected to adverse influences from water, mud, or the like, since this O₂ sensor 15 is located downstream of the catalyst converter. In this case, when water, mud, or the like is mingled with the reference gas at the downstream-side O₂ sensor 15, the sensor 15 may be deteriorated thereby generating fluctuation in the output thereof.

In view of the foregoing, it is preferable that at least the downstream-side O₂ sensor 15 be of a semiconductor type which requires no reference gas.

Figure 40:
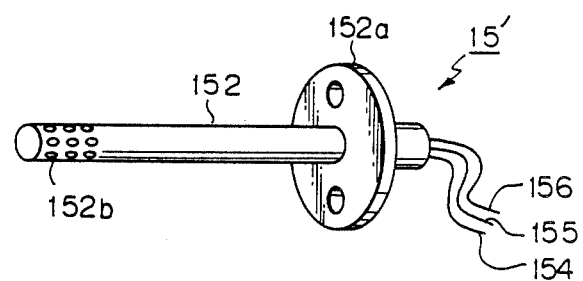
FIG. 40 is a perspective view of an $O_2$ sensor.
Figure 41:
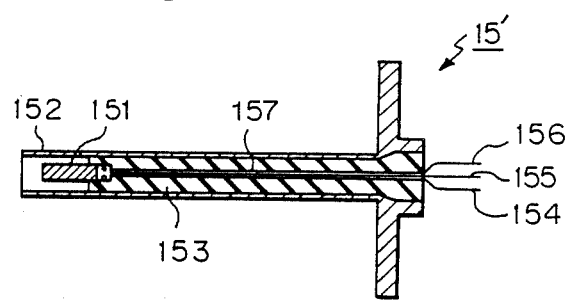
FIG. 41 is a cross-sectional view of the $O_2$ sensor of FIG. 40.

The semiconductor type O₂ sensor, which is defined by reference numeral 15', will be explained with reference to FIGS. 40 and 41. In FIGS. 40 and 41, reference numeral 141 designates a semiconductor oxide element 151, which is encapsulated into a bore housing 152 having a mounting flange 152a and gas exchange holes 152b. In this case, the heater (not shown) is also encapsulated into the housing 152. The semiconductor oxide element 151 and the heater is fixed by mineral adhesives 153 to the housing 152. The semiconductor oxide element 151 including the heater as a detecting portion for the concentration of oxygen has an output terminal, a heater terminal, and a ground terminal which are connected to wires 154, 155, and 156, respectively. The wires 154, 155, and 156 are penetrated through a ceramic insulator tube 157 and are led out of the housing 152. The wires 154 and 155 may be connected to the control circuit 10 of FIG. 2, and the wire 155 may be connected to a grounded object. This kind of semiconductor type O₂ sensor is disclosed in Japanese Unexamined Patent Publication (Kokai) No. 55-124057.

Figure 42:
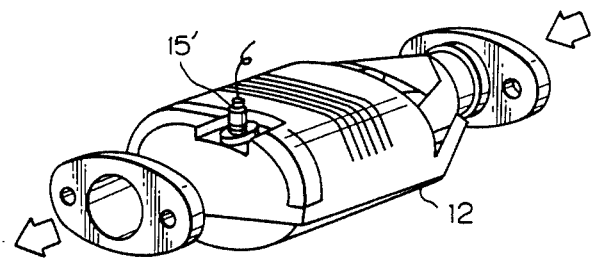
FIG. 42 is a perspective view of the catalyst converter of FIG. 2.
Figure 43:
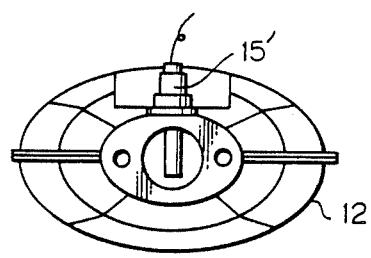
FIG. 43 is a view of the catalyst converter of FIG. 42 as seen from behind.
Figure 44:
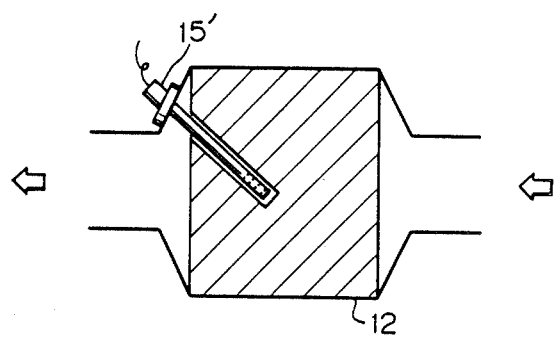
FIGS. 44 and 45 are diagrams showing the interior of the catalyst converter of FIG. 42.
Figure 45:
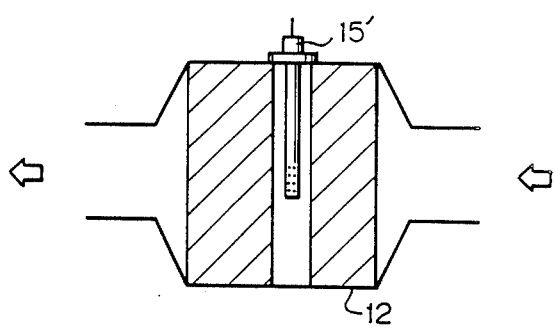

The semiconductor type O₂ sensor also provides a high degree of freedom in the spacing between the detection portion (semiconductor oxide element 151) and the mounting portion (flange 152a). Therefore, the semiconductor type O₂ sensor 15' as the downstream-side O₂ sensor can be provided within the catalyst converter 12, as shown in FIGS. 42, 43, and 44. In this case, the catalyst converter 12 incorporates single-bed monolithic catalysts. Thus, the end of the O₂ sensor 15' is located at the center of the catalyst converter 12.

Where the catalyst converter 12 incorporates double-bed monolithic catalysts, the O₂ sensor 15' can be mounted at the center between the first stage monolithic catalysts and the second stage monolithic catalysts, as illustrated in FIG. 45. That is, the end of the O₂ sensor 15' is located at the center of the catalyst converter 12.

Figure 46:
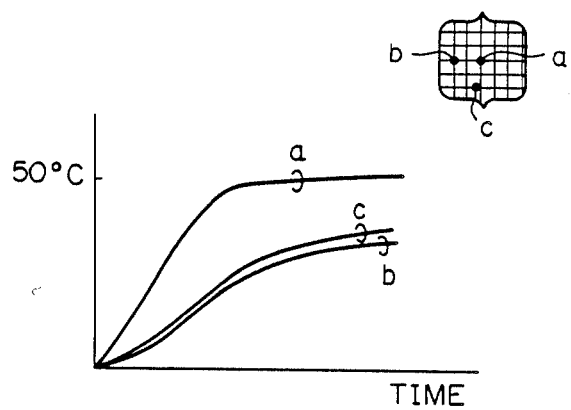
FIG. 46 is a graph showing the temperature characteristics within the catalyst converter of FIG. 42.

As explained above, when the end of the O₂ sensor 15' is located at the center of the catalyst converter 12, the O₂ sensor 15' is activated earlier due to the temperature of the catalyst converter 12. For example, as shown in FIG. 46, where the vehicle speed is steadily changed from 0 km/h to 60 km/h, the increase of the temperature within the catalyst converter 12 is dependent upon the location thereof such as "a", "b", or "c", and the increase of the temperature is most rapid at the center location indicated by "a". Therefore, when the downstream-side O₂ sensor 15 comprises the semiconductor type O₂ sensor 15' located at the center of the catalyst converter 12, the feedback control by this O₂ sensor is started early, thereby stabilizing the controlled air-fuel ratio.

Note that it is impossible to mount the end of a zirconium type O₂ sensor into the center of the catalyst converter 12, since it is necessary to lengthen the detecting element thereof, which easily generates heat distortion therein so that this detecting element cannot withstand the impact of heat such as about 50° C./s, and in addition, the sealing of this detecting element such as talc and a Cu packing are not heat-resistant.

Figure 47:
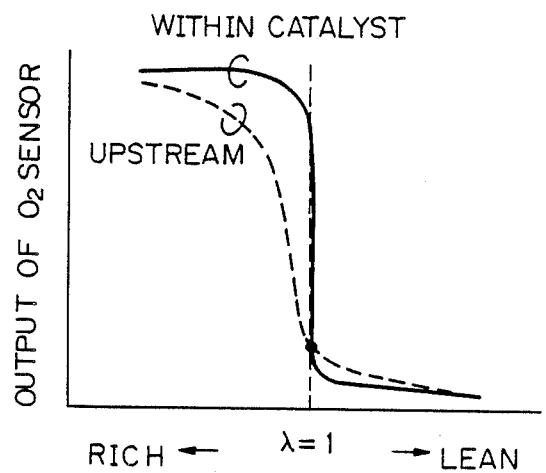
FIG. 47 is a graph showing the output characteristics of an $O_2$ sensor.

As shown in FIG. 47, which shows the output characteristics of an O₂ sensor, the upstream-side O₂ sensor 13 is subjected to a large quantity of unburnt gas such as HC, CO, or NO$_x$, and, therefore it is impossible to precisely detect the stoichiometric air-fuel ratio (x=1), and the O₂ sensor 15 (or 15') downstream (or within) the catalyst converter 12 is subjected to only a small quantity of unburnt gas such as HC, CO, or NO$_x$, and therefore, it is possible to precisely detect the stoichiometric air-fuel ratio ($\lambda$=1).

Note that all the calculated parameters such as FAF can be stored in the backup RAM 106, thereby improving drivability at the re-starting of the engine.

Also, the first air-fuel ratio feedback control by the upstream-side O₂ sensor 13 is carried out at every relatively small time period, such as 4 ms, and the second air-fuel ratio feedback control by the downstream-side O₂ sensor 15 is carried out at every relatively large time period, such as 1 s. This is because the upstream-side O₂ sensor 13 has good response characteristics when compared with the downstream-side O₂ sensor 15.

Still further, a Karman vortex sensor, a heat-wire type flow sensor, and the like can be used instead of the airflow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can be also applied to a carburetor type internal combustion engine in which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 3501 of FIG. 35 or at step 3601 of FIG. 36 is determined by the carburetor itself, i.e., the intake air negative pressure and the engine speed, and the air amount corresponding to TAU at step 3503 of FIG. 35 or at step 3603 of FIG. 36.

Further, a CO sensor, a lean-mixture sensor or the like can be also used instead of the $O_2$ sensor.

As explained above, according to the present invention, when the downstream-side $O_2$ sensor is in an abnormal state (in a nonactivation state), the feedback control by the downstream-side $O_2$ sensor 15 is suspended, thereby avoiding fluctuation of the controlled air-fuel ratio.

We claim:

1. A method for controlling an air-fuel ratio in an internal combustion engine having catalyst means for removing pollutants in an exhaust gas, and upstream-side and downstream-side air-fuel ratio sensors disposed upstream and downstream, respectively, of said catalyst means for detecting a concentration of a specific component in the exhaust gas, comprising the steps of:
   comparing an output of said upstream-side air-fuel ratio sensor with a first predetermined reference voltage;
   calculating an air-fuel ratio feedback correction amount in accordance with the comparison result of the output of said upstream-side air-fuel ratio sensor with said first predetermined reference voltage;
   comparing an output of said downstream-side air-fuel ratio sensor with a second predetermined reference voltage;
   calculating, in accordance with the comparison result of the output of said downstream-side air-fuel ratio sensor, at least one air-fuel ratio feedback control parameter of delay time periods for which the comparison result of the output of said upstream-side air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;
   adjusting the actual air-fuel ratio in accordance with said air-fuel ratio feedback correction amount and said air-fuel ratio feedback control parameter;
   determining whether said downstream-side air-fuel ratio sensor is in a normal state or in an abnormal state; and
   prohibiting the calculation of said air-fuel ratio feedback control parameter when said downstream-side air-fuel ratio sensor is in an abnormal state while continuing the calculation of the air-fuel ratio correction amount.

2. A method as set forth in claim 1, further comprising a step of activating an alarm when said downstream-side air-fuel ratio sensor is in an abnormal state.

3. A method as set forth in claim 1, wherein said downstream-side air-fuel ratio sensor state determining step comprises a step of determining whether or not the output of said downstream-side air-fuel sensor crosses over a predetermined voltage, thereby determining that said downstream-side air-fuel ratio sensor is in a normal state after the output of said downstream-side air-fuel ratio sensor crosses over said predetermined voltage and wherein said predetermined voltage is set at an intermediate level between said second reference voltage of said downstream-side air-fuel ratio sensor and a nonactive output level thereof; and wherein said downstream-side air-fuel ratio state determining step further comprises the steps of calculating a time duration for which said downstream-side air-fuel ratio sensor is in an abnormal state;

determining whether or not the calculated time duration is longer than a predetermined time duration; and changing said predetermined voltage when the calculated time duration is longer than said predetermined time duration.

4. A method as set forth in claim 1, further comprising a step of holding said air-fuel ratio feedback control parameter immediately before said downstream-side air-fuel ratio sensor is switched from a normal state to an abnormal state.

5. A method as set forth in claim 4, wherein said air-fuel ratio adjusting step adjusts the actual air-fuel ratio in accordance with said air-fuel ratio feedback correction amount and said held air-fuel ratio feedback control parameter, when said downstream-side air-fuel ratio sensor is in an abnormal state.

6. A method as set forth in claim 1, further comprising a step of holding said air-fuel ratio feedback control parameter at a definite value when said downstream-side air-fuel ratio sensor is in an abnormal state.

7. A method as set forth in claim 6, wherein said air-fuel ratio adjusting step adjusts the actual air-fuel ratio in accordance with said air-fuel ratio feedback correction amount and said held air-fuel ratio feedback control parameter, when said downstream-side air-fuel ratio sensor is in an abnormal state.

8. A method as set forth in claim 1, further comprising a step of forcibly changing the actual air-fuel ratio when said downstream-side air-fuel ratio sensor is in an abnormal state.

9. A method as set forth in claim 8, further comprising a step of pulling down the output of said downstream-side air-fuel ratio sensor via a resistor thereby generating a lean signal during a nonactive mode,
   said air-fuel ratio forcible-change step changing the actual air-fuel ratio on the rich side.

10. A method as set forth in claim 9, further comprising a step of determining whether or not said engine is in an acceleration state,
    said air-fuel ratio forcible-change step changing the actual air-fuel ratio on the rich side, only when said engine is in an acceleration state.

11. A method as set forth in claim 8, further comprising a step of pulling up the output of said downstream-side air-fuel ratio sensor via a resistor thereby generating a rich signal during a nonactive mode,
    said air-fuel ratio forcible-change step changing the actual air-fuel ratio on the lean side.

12. A method as set forth in claim 1, further comprising the steps of:
    pulling down the output of said downstream-side air-fuel ratio sensor via a resistor;
    determining whether or not a fuel enrichment state of said engine continues for a predetermined time period;
    said downstream-side air-fuel ratio sensor state predetermining step comprising a step of determining whether or not the output of said downstream-side air-fuel ratio sensor indicates a lean signal, thereby determining that said downstream-side air-fuel ratio sensor is in an abnormal state when the output of said downstream-side air-fuel ratio sensor indicates a lean signal.

13. A method as set forth in claim 1, wherein said air-fuel correction amount calculating step comprises the steps of:

gradually decreasing said air-fuel ratio correction amount when the output of said upstream-side air-fuel ratio sensor is on the rich side with respect to said first predetermined reference voltage;

gradually increasing said air-fuel ratio correction amount when the output of said donwstream-side air-fuel ratio sensor is on the lean side with respect to said first predetermined reference voltage;

remarkably decreasing said air-fuel ratio correction amount when the output of said upstream-side air-fuel ratio sensor is switched from the lean side to the rich side; and remarkably increasing said air-fuel ratio correction amount when the output of said upstream-side air-fuel ratio sensor is switched from the rich side to the lean side.

14. A method as set forth in claim 1, further comprising a step of delaying the result of the comparison of said upstream-side air-fuel ratio sensor with said first predetermined reference voltage.

15. A method as set forth in claim 1, further comprising a step of delaying the result of the comparison of said downstream-side air-fuel ratio sensor with said second predetermined reference voltage.

16. A method as set forth in claim 14, wherein said air-fuel ratio feedback control parameter is determined by a rich delay time period in said delaying step for delaying the result of the comparison of said upstream-side air-fuel ratio sensor switched from the lean side to the rich side and a lean delay time period in said delaying step for delaying the result of the comparison of said upstream-side air-fuel ratio sensor switched from the rich side to the lean side.

17. A method as set forth in claim 16, wherein said air-fuel ratio feedback control parameter calculating step comprises the steps of:

increasing said lean delay time period when the output of said downstream-side air-fuel ratio sensor is on the rich side with respect to said second predetermined reference voltage; and decreasing said lean delay time period when the output of said downstream-side air-fuel ratio sensor is on the lean side with respect to said second predetermined reference voltage.

18. A method as set forth in claim 16, wherein said air-fuel ratio feedback control parameter calculating step comprises the steps of:

decreasing said rich delay time period when the output of said downstream-side air-fuel ratio sensor is on the rich side with respect to said second predetermined reference voltage; and increasing said rich delay time period when the output of said downstream-side air-fuel ratio sensor is on the lean side with respect to said second predetermined reference voltage.

19. A method as set forth in claim 16, wherein said air-fuel ratio feedback control parameter calculating step comprises the steps of:

increasing said lean delay time period and decreasing said rich delay time period when the output of said downstream-side air-fuel ratio sensor is on the rich side with respect to said second predetermined reference voltage; and decreasing said lean delay time period and increasing said rich delay time period when the output of said downstream-side air-fuel ratio sensor is on the lean side with respect to said second predetermined reference voltage.

20. A method as set forth in claim 13, wherein said air-fuel ratio feedback control parameter is determined by a lean skip amount in said remarkable-decrease step and a rich skip amount in said remarkable-increase step.

21. A method as set forth in claim 20, wherein said air-fuel ratio feedback control parameter calculating step comprises the steps of:

increasing said lean skip amount when the output of said downstream-side air-fuel ratio sensor is on the rich side with respect to said second predetermined reference voltage; and decreasing said lean skip amount when the output of said downstream-side air-fuel ratio sensor is on the lean side with respect to said second predetermined reference voltage.

22. A method as set forth in claim 20, wherein said air-fuel ratio feedback control parameter calculating step comprises the steps of:

decreasing said rich skip amount when the output of said downstream-side air-fuel ratio sensor is on the rich side with respect to said second predetermined reference voltage; and increasing said rich skip amount when the output of said downstream-side air-fuel ratio sensor is on the lean side with respect to said second predetermined value.

23. A method as set forth in claim 20, wherein said air-fuel ratio feedback control parameter calculating step comprises the steps of:

increasing said lean skip amount and decreasing said rich skip amount when the output of said downstream-side air-fuel ratio sensor is on the rich side with respect to said second predetermined reference voltage; and decreasing said lean skip amount and increasing said rich skip amount when the output of said downstream-side air-fuel ratio sensor is on the lean side with respect to said second predetermined value.

24. A method as set forth in claim 20, wherein said air-fuel ratio feedback control parameter is determined by the decreasing speed of said gradual-decrease step and the increasing speed of said gradual-increase step.

25. A method as set forth in claim 24, wherein said air-fuel ratio feedback control parameter calculating step comprises the steps of:

increasing the decreasing speed of said gradual-decrease step when the output of said downstream-side air-fuel ratio sensor is on the rich side with respect to said second predetermined reference voltage; and decreasing the decreasing speed of said gradual-decrease step when the output of said downstream-side air-fuel ratio sensor is on the lean side with respect to said second predetermined reference voltage.

26. A method as set forth in claim 24, wherein said air-fuel ratio feedback control parameter calculating step comprises the steps of:

decreasing the increasing speed of said gradual-increase step when the output of said downstream-side air-fuel ratio sensor is on the rich side with respect to said second predetermined reference voltage; and increasing the increasing speed of said gradual-increase step when the output of said downstream-side air-fuel ratio sensor is on the lean side with respect to said second predetermined reference voltage.

27. A method as set forth in claim 24, wherein said air-fuel ratio feedback control parameter calculating step comprises the steps of:

increasing the decreasing speed of said gradual-decrease step and decreasing the increasing speed of said gradual-increase step when the output of said downstream-side air-fuel ratio sensor is on the rich side with respect to said second predetermined reference voltage; and decreasing the decreasing speed of said gradual-decrease step and increasing the increasing speed of said gradual-increase step when the output of said downstream-side air-fuel ratio sensor is on the lean side with respect to said second predetermined reference voltage.

28. A method as set forth in claim 1, wherein said upstream-side air-fuel ratio sensor is mounted on a water-cooled cylinder head portion of said engine.

29. A method as set forth in claim 1, wherein said downstream-side air-fuel ratio sensor is of a semiconductor type which is mounted within a catalyst converter on a downstream-side of said catalyst means.

30. A method as set forth in claim 29, wherein said semiconductor type air-fuel ratio sensor is mounted in the center of said catalyst converter.

31. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said downstream-side air-fuel ratio sensor by a relationship between the output of said upstream-side air-fuel ratio sensor and the output of said downstream-side air-fuel ratio sensor.

32. A method as set forth in claim 31, wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term.

33. A method as set forth in claim 32, further comprising a step of releasing the operation of said prohibiting step when the output of said downstream-side air-fuel ratio sensor indicates a rich signal during an active mode.

34. A method as set forth in claim 32, wherein said determining step for determining whether said upstream-side air-fuel ratio is rich comprises the steps of calculating an average value or blunt value of the output of said upstream-side air-fuel ratio sensor; and determining whether or not the average value or blunt value of the output of said upstream-side air-fuel ratio sensor is larger than a predetermined value, thereby determining a rich signal during an active mode for said upstream-side air-fuel ratio sensor, when the average value or blunt value of the output of said upstream-side air-fuel ratio sensor is larger than said predetermined value.

35. A method as set forth in claim 31, wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not said duration is longer than a predetermined term, thereby determining that said downstream-side air-fuel ratio sensor is in an abnormal state when said duration is longer than said predetermined term.

36. A method as set forth in claim 35, further comprising a step of releasing the operation of said prohibiting step when the output of said downstream-side air-fuel ratio sensor indicates a lean signal during an active mode.

37. A method as set forth in claim 35, wherein said determining step for determining whether said upstream-side air-fuel ratio is lean comprises the steps of
calculating an average value or blunt value of the output of said upstream-side air-fuel ratio sensor; and determining whether or not the average value or blunt value of the output of said upstream-side air-fuel ratio sensor is smaller than a predetermined value, thereby determining a lean signal during an active mode for said upstream-side air-fuel ratio sensor, when the average value or blunt value of the output of said upstream-side air-fuel ratio sensor is smaller than said predetermined value.

38. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state;; and prohibiting the calculation of said air-fuel ratio feedback control parameter when said downstream-side air-fuel ratio sensor is in an abnormal state;

wherein said downstream-side air-fuel ratio sensor state determining step comprises the steps of:

determining whether or not the output of said downstream-side air-fuel ratio sensor is reversed;

counting the number of reversals of the output of said upstream-side air-fuel ratio sensor after each reversal of the output of said downstream-side air-fuel ratio sensor; and determining whether or not the number of reversals of the output of said upstream-side air-fuel ratio sensor is larger than a predetermined value, thereby determining that said downstream-side air-fuel ratio sensor is in an abnormal state when the number of reversals of the output of said upstream-side air-fuel ratio sensor is larger than said predetermined value.

39. A method as set forth in claim 38, wherein said predetermined value is dependent upon the speed of said engine.

40. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprisingg the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said downstream-side air-fuel ratio sensor by a relationship between the output of said upstream-side air-fuel ratio sensor and the output of said downstream-side air-fuel ratio sensor; and wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term;

wherein said determining step for determining whether said upstream-side air-fuel ratio is rich comprises the steps of calculating an average value or blunt value of maximum values of the output of said upstream-side air-fuel ratio sensor; and determining whether or not the average value or blunt value of maximum values of the output of said upstream-side air-fuel ratio sensor is larger than a predetermined value, thereby determining a rich signal during an active mode for said upstream-side air-fuel ratio sensor, when the average value or the blunt value of maximum values of the output of said upstream-side air-fuel ratio sensor is larger than said predetermined value.

41. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said downstream-side air-fuel ratio sensor by a relationship between the output of said upstream-side air-fuel ratio sensor and the output of said downstream-side air-fuel ratio sensor; and wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term;

wherein said determining step for determining whether said upstream-side air-fuel ratio is rich comprises the steps of calculating an average value or blunt value of duty ratios of a rich signal in the output of said upstream-side air-fuel ratio sensor; and determining whether or not the average value or blunt value of duty ratios of a rich signal in the output of said upstream-side air-fuel ratio sensor is smaller than a predetermined value, thereby determining a rich signal during an active mode for said upstream-side air-fuel ratio sensor, when the average value or the blunt value of duty ratios of a rich signal in the output of said upstream-side air-fuel ratio sensor is smaller than said predetermined value.

42. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said downstream-side air-fuel ratio sensor by a relationship between the output of said upstream-side air-fuel ratio sensor and the output of said downstream-side air-fuel ratio sensor; and wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term;

wherein said determining step for determining whether said downstream-side air-fuel ratio is lean comprises the steps of calculating an average value or blunt value of the output of said downstream-side air-fuel ratio sensor; and determining whether or not the average value or blunt value of the output of said downstream-side air-fuel ratio sensor is smaller than a predetermined value, thereby determining a lean signal for said downstream-side air-fuel ratio sensor, when the average value or the blunt value of the output of said downstream-side air-fuel ratio sensor is smaller than said predetermined value.

43. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said downstream-side air-fuel ratio sensor by a relationship between the output of said upstream-side air-fuel ratio sensor and the output of said downstream-side air-fuel ratio sensor; and wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term;

wherein said determining step for determining whether said upstream-side air-fuel ratio is lean comprises the steps of:

calculating an average value or a blunt value of minimum values of the output of said upstream-side air-fuel ratio sensor; and determining whether or not the average value or blunt value of minimum values of the output of said upstream-side air-fuel ratio sensor is smaller than a predetermined value, thereby determining a lean signal during an active mode for said upstream-side air-fuel ratio sensor, when the average value or blunt value of minimum values of the output of said upsteam-side air-fuel ratio sensor is smaller than said predetermined value.

44. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said downstream-side air-fuel ratio sensor by a relationship between the output of said upstream-side air-fuel ratio sensor and the output of said downstream-side air-fuel ratio sensor; and wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term;

wherein said determining step for determining whether said upstream-side air-fuel ratio is lean comprises the steps of:

calculating an average value or blunt value of duty ratios of a lean signal in the output of said upstream-side air-fuel ratio sensor; and determining whether or not the average value or blunt value of duty ratios of a lean signal in the output of said upstream-side air-fuel ratio sensor is smaller than a predetermined value, thereby determining a lean signal during an active mode for said upstream-side air-fuel ratio sensor, when the average value or blunt value of duty ratios of a lean signal in the output of said upstream-side air-fuel ratio sensor is smaller than said predetermined value.

45. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter:

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step determines a normal or abnormal state of said dowstream-side air-fuel ratio sensor by a relationship between the output of said upstream-side air-fuel ratio sensor and the output of said downstream-side air-fuel ratio sensor; and wherein said downstream-side air-fuel ratio sensor state determining step comprises the steps of:

determining whether or not said upstream-side air-fuel ratio is rich in accordance with the output of said upstream-side air-fuel ratio sensor;

determining whether or not said downstream-side air-fuel ratio sensor outputs a lean signal;

counting a duration for which said downstream-side air-fuel ratio sensor outputs a lean signal when said upstream-side air-fuel ratio is rich; and determining whether or not the duration is longer than a predetermined term, thereby determining that said downstream-side air-fuel ratio sensor is in an abnormal state when the duration is longer than said predetermined term;

wherein said determining step for determining whether said downstream-side air-fuel ratio is rich comprises the steps of:

calculating an average value or blunt value of the output of said downstream-side air-fuel ratio sensor; and determining whether or not the average value or blunt value of the output of said downstream-side air-fuel ratio sensor is longer than a predetermined value, thereby determining a rich signal for said downstream-side air-fuel ratio sensor, when the average value or blunt value of the output of said downstream-side air-fuel ratio sensor is larger than said predetermined value.

46. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step comprises the steps of:

calculating an amplitude of the output of said downstream-side air-fuel ratio sensor;

determining whether or not the amplitude of the output of said downstream-side air-fuel ratio sensor is larger than a predetermined amplitude;

calculating a period of the output of said downstream-side air-fuel ratio sensor; and determining whether or not the period of the output of said downstream-side air-fuel ratio sensor is smaller than a predetermined period, thereby determining that said downstream-side air-fuel ratio sensor is in an abnormal state, when the amplitude of the output of said downstream-side air-fuel ratio sensor is larger than said predetermined amplitude, and the period of the output of said downstream-side air-fuel ratio sensor is smaller than said predetermined period.

47. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream side air-fuel ratio sensor state determining step comprises the steps of:

calculating an amplitude of the output of said downstream-side air-fuel ratio sensor;

determining whether or not the amplitude of the output of said downstream-side air-fuel ratio sensor is larger than a predetermined amplitude;

calculating a period of the output of said upstream-side air-fuel ratio sensor;

calculating a period of the output of said downstream-side air-fuel ratio sensor;

calculating the ratio of the period of the output of said upstream-side air-fuel ratio sensor to the period of the output of said downstream-side air-fuel ratio sensor; and determining whether the calculated ratio is larger than a predetermined ratio, thereby determining that said downstream-side air-fuel ratio sensor is in an abnormal state, when the amplitude of the output of said downstream-side air-fuel ratio sensor is larger than said predetermined amplitude, and the calculated ratio is larger than said predetermined ratio.

48. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

wherein said downstream-side air-fuel ratio sensor state determining step comprises the step of:

calculating a minimum level of the output of said downstream-side air-fuel ratio sensor during a predetermined time period;

calculating a maximum level of the output of said downstream-side air-fuel ratio sensor during said predetermined time period;

calculating a difference between the maximum and minumum levels of the output of said downstream-side air-fuel ratio sensor during said predetermined time period; and determining whether or not said difference is larger than a predetermined value;

thereby determining that said downstream-side air-fuel ratio sensor is in an abnormal state, when said difference is larger than said predetermined value.

49. A method as set forth in claim 48, wherein said predetermined time period is dependent upon the load of said engine.

50. A method as set forth in claim 48, wherein said predetermined value is dependent upon the load of said engine.

51. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result in the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

determining whether said downstream-side air-fuel ratio sensor is in a normal state or in an abnormal state;

prohibiting the calculating of said air-fuel ratio feedback control parameter when said downstream-side air-fuel ratio sensor is in an abnormal state;

calculating an average value or blunt value of said air-fuel ratio feedback control parameter when said downstream-side air-fuel ratio sensor is in a normal state;

holding the average value or blunt value of said air-fuel ratio feedback control parameter when said downstream-side air-fuel ratio sensor is in an abnormal state; and adjusting an actual air-fuel ratio in accordance with said air-fuel ratio feed back correction amount and said calculated air-fuel ratio feedback control parameter when said downstream-side air-fuel ratio sensor is in a normal state, or in accordance with said air-fuel ratio feedback correction amount and said held average or blunt value as said air-fuel ratio feedback control parameter when said downstream-side air-fuel ratio sensor is an abnormal state.

52. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

renewing an average value or blunt value of said air-fuel ratio feedback control parameter when said downstream-side air-fuel ratio sensor is in a normal state;

holding the average value or blunt value of said air-fuel ratio feedback control parameter when said downstream-side air-fuel ratio sensor is in an abnormal state; and further comprising a step of determining whether or not a vehicle speed is within a predetermined range, said renewing step renewing said average value or blunt value of said air-fuel ratio feedback control parameter only when the vehicle speed is within said predetermined range.

53. A method for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said donwstream-side air-fuel ratio sensor is in an abnormal state;

forcibly changing the actual air-fuel ratio when said downstream-side air-fuel ratio sensor is in an abnormal state;

pulling down the output of said downstream-side air-fuel ratio sensor via a resistor thereby generating a lean signal during a nonactive mode, said air-fuel ratio forcible-change step changing the actual air-fuel ratio on the rich side;

further comprising a step of determining whether or not a predetermined time period has passed after a coolant temperature of said engine becomes higher than a predetermined temperature, said air-fuel ratio forcible-change step changing the actual air-fuel ratio on the rich side, only when said predetermined time period has passed.

54. A method for controlling an air-fuel ratio in an internal combustion engine having a catalyst converter for removing pollutants in an exhaust gas, and upstream-side and downstream-side air-fuel ratio sensor disposed upstream and downstream, respectively, of said catalyst converter for detecting a concentration of a specific component in the exhaust gas, comprising the steps of:

comparing an output of said upstream-side air-fuel ratio sensor with a first predetermined reference voltage;

calculating an air-fuel ratio feedback correction amount in accordance with the comparison result of the output of said upstream-side air-fuel ratio sensor with said first predetermined reference voltage;

comparing an output of said downstream-side air-fuel ratio sensor with a second predetermined reference voltage;

calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount it skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

adjusting the actual air-fuel ratio in accordance with said air-fuel ratio feedback correction amount and said air-fuel ratio feedback control parameter;

determining whether said downstream-side air-fuel ratio sensor is in a normal state or in an abnormal state; and prohibiting the calculation of said air-fuel ratio feedback control parameter when said downstream-side air-fuel ratio sensor is in an abnormal state;

forcibly changing the actual air-fuel ratio when said downstream-side air-fuel sensor is in an abnormal state;

pulling up the output of said downstream-side air-fuel ratio sensor via a resistor thereby generating a rich signal during a nonactive mode, said air-fuel ratio forcible-change step changing the actual air-fuel ratio on the lean side;

further comprising a step of determining whether or not a predetermined time period has passed after the coolant temperature of said engine becomes higher then a predetermined temperature, said air-fuel ratio forcible-changing step changing the actual air-fuel ratio on the rich side, only when said predetermined time period has passed.

55. An apparatus for controlling an air-fuel ratio in an interval combusion engine having catalyst means for removing pollutants in an exhaust gas, and upstream-side and downstream-side air-fuel ratio sensors disposed upstream and downstream, respectively, of said catalyst means for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with a comparison result of the output of said upstream-side air-fuel radio sensor with said first predetermined reference voltage;

means for comparing the output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state while continuing the calculation fo the air-fuel ratio correction amount.

56. An apparatus as set forth in claim 55, further comprising means for activating an alarm when said downstream-side air-fuel ratio sensor is in an abnormal state.

57. An apparatus as set forth in claim 55, wherein said downstream-side air-fuel sensor state determining means comprises means for determining whether or not the output of said downstream-side air-fuel ratio sensor crosses over a predetermined voltage, thereby determining whether said downstream-side air-fuel ratio sensor is in a normal state after the output of said downstream-side air-fuel ratio sensor crosses over said predetermined voltage;

wherein said predetermined voltage is set at an intermediate level between said second reference voltage of said downstream-side air-fuel ratio sensor and a nonactive output level thereof; and wherein said downstream side air-fuel ratio state determining means further comprises:

means for calculating a time duration when said downstream-side air-fuel ratio sensor is in an abnormal state;

means for determining whether or not the calculated time duration is longer than a predetermined time duration; and means for changing said predetermined voltage when the calculated time is longer than said predetermined time duration.

58. An apparatus as set forth in claim 55, further comprising means for holding said air-fuel ratio feedback control parameter immediately before said downstream-side air-fuel ratio sensor is switched from a normal state to an abnormal state.

59. An apparatus as set forth in claim 58, wherein said air-fuel ratio adjusting means adjusts the actual air-fuel ratio in accordance with said air-fuel ratio feedback correction amount and said held air-fuel ratio feedback control parameter, when said downstream-side air-fuel ratio sensor is in an abnormal state.

60. An apparatus as set forth in claim 55, further comprising means for holding said air-fuel ratio feedback control parameter at a definite value when said downstream-side air-fuel ratio sensor is in an abnormal state.

61. An apparatus as set forth in claim 60, wherein said air-fuel ratio adjusting means adjusts the actual air-fuel ratio in accordance with said air-fuel ratio feedback correction amount and said held air-fuel ratio feedback control parameter, when said downstream-side air-fuel ratio sensor is in an abnormal state.

62. An apparatus as set forth in claim 55, further comprising means for forcibly changing the actual air-fuel ratio when said downstream-side air-fuel ratio sensor is in an abnormal state.

63. An apparatus as set forth in claim 62, further comprising means for pulling down the output of said downstream-side air-fuel ratio sensor via a resistor thereby generating a lean signal during a nonactive mode, said air-fuel ratio forcible-change means changing the actual air-fuel ratio on the rich side.

64. An apparatus as set forth in claim 63, further comprising means for determining whether or not said engine is in an acceleration state, said air-fuel ratio forcible-change means changing the actual air-fuel ratio on the rich side, only when said engine is in an acceleration state.

65. An apparatus as set forth in claim 62, further comprising means for pulling up the output of said downstream-side air-fuel ratio sensor via a resistor thereby generating a rich signal during a nonactive mode, said air-fuel ratio forcible-change means changing the actual air-fuel ratio on the lean side.

66. An apparatus as set forth in claim 55, further comprising:
means for pulling down the output of said downstream-side air-fuel ratio sensor via a resistor;
means for determining whether or not a fuel enrichment state of said engine continues for a predetermined time period;
said downstream-side air-fuel ratio sensor state determining means comprising means for determining whether or not the output of said downstream-side air-fuel ratio sensor indicates a lean signal, thereby determining that said downstream-side air-fuel ratio sensor is in an abnormal state when the output of said downstream-side air-fuel ratio sensor indicates a lean signal.

67. An apparatus as set forth in claim 55, wherein said air-fuel correction amount calculating means comprises:
means for gradually decreasing said air-fuel ratio correction amount when the output of said upstream-side air-fuel ratio sensor is on the rich side with respect to said first predetermined reference voltage;
means for gradually increasing said air-fuel ratio correction amount when the output of said downstream-side air-fuel ratio sensor is on the lean side with respect to said first predetermined reference voltage;
means for remarkably decreasing said air-fuel ratio correction amount when the output of said upsteam-side air-fuel ratio sensor is switched from the lean side to the rich side; and
means for remarkably increasing said air-fuel ratio correction amount when the output of said upstream-side air-fuel ratio sensor is switched from the rich side to the lean side.

68. An apparatus as set forth in claim 55, further comprising means for delaying the result of the comparison of said upstream-side air-fuel ratio sensor with said first predetermined reference voltage.

69. An apparatus as set forth in claim 55, further comprising means for delaying the result of the comparison of said downstream-side air-fuel ratio sensor with said second predetermined reference voltage.

70. An apparatus as set forth in claim 68, wherein said air-fuel ratio feedback control parameter is determined by a rich delay time period in said delaying means for delaying the result of the comparison of said upsteam-side air-fuel ratio sensor switched from the lean side to the rich side and a lean delay time period in said delaying means for delaying the result of the comparison of said upstream-side air-fuel ratio sensor switched from the rich side to the lean side.

71. An apparatus as set forth in claim 70, wherein said air-fuel ratio feedback control parameter calculating means comprises:
means for increasing said lean delay time period when the output of said downstream-side air-fuel ratio sensor is on the rich side with respect to said second predetermined reference voltage; and
means for decreasing said lean delay time period when the output of said downstream-side air-fuel ratio sensor is on the lean side with respect to said second predetermined reference voltage.

72. An apparatus as set forth in claim 70, wherein said air-fuel ratio feedback control parameter calculating means comprises:
means for decreasing said rich delay time period when the output of said downstream-side air-fuel ratio sensor is on the rich side with respect to said second predetermined reference voltage; and
means for increasing said rich delay time period when the output of said downstream-side air-fuel ratio sensor is on the lean side with respect to said second predetermined reference voltage.

73. An apparatus as set forth in claim 70, wherein said air-fuel ratio feedback control parameter calculating means comprises:
means for increasing said lean delay time period and decreasing said rich delay time period when the output of said downstream-side air-fuel ratio sensor is on the rich side with respect to said second predetermined reference voltage; and
means for decreasing said lean delay time period and increasing said rich delay time period when the output of said downstream-side air-fuel ratio sensor is on the lean side with respect to said second predetermined reference voltage.

74. An apparatus as set forth in claim 67, wherein said air-fuel ratio feedback control parameter is determined by a lean skip amount in said remarkable-decrease means and a rich skip amount in said remarkable-increase means.

75. An apparatus as set forth in claim 74, wherein said air-fuel ratio feedback control parameter calculating means comprises:
means for increasing said lean skip amount when the output of said downstream-side air-fuel ratio sensor is on the rich side with respect to said second predetermined reference voltage; and
means for decreasing said lean skip amount when the output of said downstream-side air-fuel ratio sensor is on the lean side with respect to said second predetermined reference voltage.

76. An apparatus as set forth in claim 74, wherein said air-fuel ratio feedback control parameter calculating means comprises:
means for decreasing said rich skip amount when the output of said downstream-side air-fuel ratio sensor is on the rich side with respect to said second predetermined reference voltage; and
means for increasing said rich skip amount when the output of said downstream-side air-fuel ratio sensor is on the lean side with respect to said second predetermined voltage.

77. An apparatus as set forth in claim 74, wherein said air-fuel ratio feedback control parameter calculating means comprises:
means for increasing said lean skip amount and decreasing said rich skip amount when the output of said downstream-side air-fuel ratio sensor is on the rich side with respect to said second predetermined reference voltage; and
means for decreasing said lean skip amount and increasing said rich skip amount when the output of said downstream-side air-fuel ratio sensor is on the lean side with respect to said second predetermined voltage.

78. An apparatus as set forth in claim 74, wherein said air-fuel ratio feedback control parameter is determined by the decreasing speed of said gradually-decreasing means and the increasing speed of said gradually-increasing means.

79. An apparatus as set forth in claim 78, wherein said air-fuel ratio feedback control parameter calculating means comprises:
means for increasing the decreasing speed of said gradually-decreasing means when the output of said downstream-side air-fuel ratio sensor is on the rich side with respect to said second predetermined reference voltage; and
means for decreasing the decreasing speed of said gradually-decreasing means when the output of said downstream-side air-fuel ratio sensor is on the lean side with respect to said second predetermined reference voltage.

80. An apparatus as set forth in claim 78, wherein said air-fuel ratio feedback control parameter calculating means comprises:
means for decreasing the increasing speed of said gradual-increase means when the output of said downstream-side air-fuel ratio sensor is on the rich side with respect to said second predetermined reference voltage; and
means for increasing the increasing speed of said gradual-increase means when the output of said downstream-side air-fuel ratio sensor is on the lean side with respect to said second predetermined reference voltage.

81. An apparatus as set forth in claim 78, wherein said air-fuel ratio feedback control parameter calculating means comprises:
means for increasing the decreasing speed of said gradual-decrease means and decreasing the increasing speed of said gradual-increase means when the output of said downstream-side air-fuel ratio sensor is on the rich side with respect to said second predetermined reference voltage; and
means for decreasing the decreasing speed of said gradual-decrease means and increasing the increasing speed of said gradual-increase means when the output of said downstream-side air-fuel ratio sensor is on the lean side with rspect to said second predetermined reference voltage.

82. An apparatus as set forth in claim 55, wherein said upstream-side air-fuel ratio sensor is mounted on a water-cooled cylinder head portion of said engine.

83. An apparatus as set forth in claim 55, wherein said downstream-side air-fuel ratio sensor is of a semi-conductor type which is mounted within a catalyst converter on a downstream-side of said catalyst means.

84. An apparatus as set forth in claim 83, wherein said semiconductor type air-fuel ratio sensor is mounted in the center of said catalyst converter.

85. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:
means for comparing an output of said upstream-side air-fuel ratio sensor with a first predetermined reference voltage;
means for calculating an air-fuel ratio feedback correction amount in accordance with the comparison result of the output of said upstream-side air-fuel ratio sensor with said first predetermined reference voltage;
means for comparing an output of said downstream-side air-fuel ratio sensor with a second predetermined reference voltage;
means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;
means for adjusting the actual air-fuel ratio in accordance with said air-fuel ratio feedback correction amount and said air-fuel ratio feedback control parameter;
means for determining whether said downstream-side air-fuel ratio sensor is in a normal state or in an abnormal state; and
means for prohibiting the calculation of said air-fuel ratio feedback control parameter when said downstream-side air-fuel ratio sensor is in an abnormal state;
wherein said downstream-side air-fuel ratio sensor state determining means determines a normal or abnormal state of said downstream-side air-fuel ratio sensor by a relationship between the output of said upstream-side air-fuel ratio sensor and the output of said downstream-side air-fuel ratio sensor.

86. An aparatus as set forth in claim 85,
wherein said means for determining said downstream-side air-fuel ratio sensor state comprises:
means for determining whether or not said upstream-side air-fuel ratio is rich in accordance with the output of said upstream-side air-fuel ratio sensor;
means for determining whether or not said downstream-side air-fuel ratio sensor outputs a lean signal;
means for counting a duration for which said downstream-side air-fuel ratio sensor outputs a lean signal when said upstream-side air-fuel ratio is rich; and
means for determining whether or not the duration is longer than a predetermined term,
thereby determining that said downstream-side air-fuel ratio sensor is in an abnormal state when the duration is longer than said predetermined term.

87. An apparatus as set forth in claim 86, further comprising means for releasing the operation of said prohibiting means when the output of said downstream-side air-fuel ratio sensor indicates a rich signal during an active mode.

88. An apparatus as set forth in claim 86, wherein said means for determining whether said upstream-side air-fuel ratio is rich comprises:
means for calculating an average value or blunt value of the output of said upstream-side air-fuel ratio sensor; and
means for determining whether or not the average value or blunt value of the output of said upstream-side air-fuel ratio sensor is larger than a predetermined value, thereby determining a rich signal during an active mode for said upstream-side air-fuel ratio sensor, when the average value or blunt value of the output of said upstream-side air-fuel ratio sensor is larger than said predetermined value.

89. An apparatus as set forth in claim 85, wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not said duration is longer than a predetermined term, thereby determining that said downstream-side air-fuel ratio sensor is in an abnormal state when said duration is longer than said predetermined term.

90. An apparatus as set forth in claim 89, further comprising means for releasing the operation of said prohibiting means when the output of said downstream-side air-fuel ratio sensor indicates a lean signal during an active mode.

91. An apparatus as set forth in claim 89, wherein said means for determining whether said upstream side air-fuel ratio is lean comprises;

means for calculating an average value or blunt value of the output of said upstream-side air-fuel ratio sensor; and means for determining whether or not the average value or blunt value of the output of said upstream-side air-fuel ratio sensor is smaller than a predetermined value, thereby determining a lean signal during an active mode for said upstream-side air-fuel ratio sensor, when the average value or blunt value of the output of said upstream-side air-fuel ratio sensor is smaller than said predetermined value.

92. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said downstream-side air-fuel ratio sensor state determining means comprises:

means for determining whether or not the output of said downstream-side air-fuel ratio sensor is reversed;

means for counting the number of reversals of the output of said upstream-side air-fuel ratio sensor after each reversal of the output of said downstream-side air-fuel ratio sensor; and means for determining whether or not the number of reversals of the output of said upstream-side air-fuel ratio sensor is larger than a predetermined value, thereby determining that said downstream-side air-fuel ratio sensor is in an abnormal state when the number of reversals of the output of said upstream-side air-fuel ratio sensor is larger than said predetermined value.

93. An apparatus as set forth in claim 92, wherein said predetermined value is dependent upon the speed of said engine.

94. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said means for determining said downstream-side air-fuel ratio sensor state determines a normal or abnormal state of said downstream-side air-fuel ratio sensor by a relationship between the output of said upstream-side air-fuel ratio sensor and the output of said downstream-side air-fuel ratio sensor; and wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not the duration is longer than a predetermined term, thereby determining that said downstream-side air-fuel ratio sensor is in an abnormal state when the duration is longer than said predetermined term;

wherein said means for determining whether said upstream-side air-fuel ratio is rich comprises:

means for calculating an average value or blunt value of maximum values of the output of said upstream-side air-fuel ratio sensor; and means for determining whether or not the average value or blunt value of maximum values of the output of said upstream-side air-fuel ratio sensor is larger than a predetermined value, thereby determining a rich signal during an active mode for said upstream-side air-fuel ratio sensor, when the average value or blunt value of maximum values of the output of said upstream-side air-fuel ratio sensor is larger than said predetermined value.

95. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said means for determining said downstream-side air-fuel ratio sensor state determines a normal or abnormal state of said downstream-side air-fuel ratio sensor by a relationship between the output of said upstream-side air-fuel ratio sensor and the output of said downstream-side air-fuel ratio sensor; and wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not the duration is longer than a predetermined term, thereby determining that said downstream-side air-fuel ratio sensor is in an abnormal state when the duration is longer than said predetermined term;

wherein said means for determining whether said upstream-side air-fuel ratio is rich comprises:

means for calculating an average value or blunt value of duty ratios of a rich signal in the output of said upstream-side air-fuel ratio sensor; and means for determining whether or not the average value or blunt value of duty ratios of a rich signal in the output of said upstream-side air-fuel ratio sensor is smaller than a predetermined value, thereby determining a rich signal during an active mode for said upstream-side air-fuel ratio sensor, when the average value or blunt value of duty ratios of a rich signal in the output of said upstream-side air-fuel ratio sensor is smaller than said predetermined value.

96. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said means for determining said downstream-side air-fuel ratio sensor state determines a normal or abnormal state of said downstream-side air-fuel ratio sensor by a relationship between the output of said upstream-side air-fuel ratio sensor and the output of said downstream-side air-fuel ratio sensor; and wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not the duration is longer than a predetermined term, thereby determining that said downstream-side air-fuel ratio sensor is in an abnormal state when the duration is longer than said predetermined term;

wherein said means for determining whether said downstream-side air-fuel ratio is lean comprises:

means for calculating an average value or blunt value of the output of said downstream-side air-fuel ratio sensor; and means for determining whether or not the average value or blunt value of the output of said downstream-side air-fuel ratio sensor is smaller than a predetermined value, thereby determining a lean signal for said downstream-side air-fuel ratio sensor, when the average value or blunt value of the output of said downstream-side air-fuel ratio sensor is smaller than said predetermined value.

97. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said means for determining said downstream-side air-fuel ratio sensor state determines a normal or abnormal state of said downstream-side air-fuel ratio sensor by a relationship between the output of said upstream-side air-fuel ratio sensor and the output of said downstream-side air-fuel ratio sensor; and wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not the duration is longer than a predetermined term, thereby determining that said downstream-side air-fuel ratio sensor is in an abnormal state when the duration is longer than said predetermined term;

wherein said means for determining whether said upstream side air-fuel ratio is lean comprises:

means for calculating an average value or a blunt value of minimum values of the output of said upstream-side air-fuel ratio sensor; and means for determining whether or not the average value or blunt value of minimum values of the output of said upstream-side air-fuel ratio sensor is smaller than a predetermined value, thereby determining a lean signal during an active mode for said upstream-side air-fuel ratio sensor, when the average value or blunt value of minimum values of the output of said upstream-side air-fuel ratio sensor is smaller than said predetermined value.

98. An apparatus for controlling an air-fuel ratio in an internal combustion engie having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upsteam-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said means for determining said downstream-side air-fuel ratio sensor state determines a normal or abnormal state of said downstream-side air-fuel ratio sensor by a relationship between the output of said upstream-side air-fuel ratio sensor and the output of said downstream-side air-fuel ratio sensor; and wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not the duration is longer than a predetermined term, thereby determining that said downstream-side air-fuel ratio sensor is in an abnormal state when the duration is longer than said predetermined term;

where said means for determining whether said upstream side air-fuel ratio is lean comprises:

means for calculating an average value or blunt value of duty ratios of a lean signal in the output of said upstream-side air-fuel ratio sensor;

means for determining whether or not the average value or blunt value of duty ratios of a lean signal in the output of said upstream-side air-fuel ratio sensor is smaller than a predetermined value, thereby determining a lean signal during an active mode for said upstream-side air-fuel ratio sensor, when the average value or blunt value of duty ratios of a lean signal in the output of said upstream-side air-fuel ratio sensor is smaller than said predetermined value.

99. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said means for determining said downstream-side air-fuel ratio sensor state determines a normal or abnormal state of said downstream-side air-fuel ratio sensor by a relationship between the output of said upstream-side air-fuel ratio sensor and the output of said downstream-side air-fuel ratio sensor; and wherein said means for determining said downstream-side air-fuel ratio sensor state comprises:

means for determining whether or not said upstream-side air-fuel ratio is rich in accordance with the output of said upstream-side air-fuel ratio sensor;

means for determining whether or not said downstream-side air-fuel ratio sensor outputs a lean signal;

means for counting a duration for which said downstream-side air-fuel ratio sensor outputs a lean signal when said upstream-side air-fuel ratio is rich; and means for determining whether or not the duration is longer than a predetermined term, thereby determining that said downstream-side air-fuel ratio sensor is in an abnormal state when the duration is longer than said predetermined term;

wherein said means for determining whether said downstream-side air-fuel ratio in rich comprises:

means for calculating an average value or blunt value of the output of said downstream-side air-fuel ratio sensor; and means for determining whether or not the average value or blunt value of the output of said downstream-side air-fuel ratio sensor is longer than a predetermined value, thereby determining a rich signal for said downstream-side air-fuel ratio sensor, when the average value or blunt value of the output of said downstream-side air-fuel ratio sensor is larger than said predetermined value.

100. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said downstream-side air-fuel ratio sensor determining means comprises:

means for calculating an amplitude of the output of said downstream-side air-fuel ratio sensor;

means for determining whether or not the amplitude of the output of said downstream-side air-fuel ratio sensor is larger than a predetermined value;

means for calculating a period of the output of said downstream-side air-fuel ratio sensor; and means for determining whether or not the period of the output of said downstream-side air-fuel ratio sensor is smaller than a predetermined period;

thereby determining that said downstream-side air-fuel ratio sensor is in an abnormal state, when the amplitude of the output of said downstream-side air-fuel ratio sensor is larger than said predetermined amplitude, and theperiod of the output of said downstream-side air-fuel ratio sensor is smaller than said predetermined period.

101. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said downstream-side air-fuel ratio sensor state determining means comprises:

means for calculating an amplitude of the output of said downstream-side air-fuel ratio sensor;

means for determining whether or not the amplitude of the output of said downstream-side air-fuel ratio sensor is larger than a predetermined amplitude;

means for calculating a period of the output of said downstream-side air-fuel ratio sensor;

means for calculating the ratio of the period of the output of said upstream-side air-fuel ratio sensor to the period of the output of said downstream-side air-fuel ratio sensor; and means for determining whether the calculated ratio is larger than a predetermined value;

thereby determining that said downstream-side air-fuel ratio sensor is in an abnormal state, when the amplitude of the output of said downstream-side air-fuel ratio sensor is larger than said predetermined amplitude, and the calculated ratio is larger than said predetermined value.

102. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

wherein said downstream-side air-fuel ratio sensor state determining means comprises:

means for calculating a minimum level of the output of said downstream-side air-fuel ratio sensor during a predetermined time period;

means for calculating a maximum level of the output of said downstream-side air-fuel ratio sensor during said predetermined time period;

means for calculating a difference between the maximum and minimum levels of the output of said downstream-side air-fuel ratio sensor during said predetermined time period; and means for determining whether or not said difference is larger than a predetermined value;

thereby determining that said downstream-side air-fuel ratio sensor is in an abnormal state, when said difference is larger than said predetermined value.

103. An apparatus as set forth in claim 102, wherein said predetermined time period is dependent upon a load of said engine.

104. An apparatus as set forth in claim 102, wherein said predetermined value is dependent upon a load of said engine.

105. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for determining whether said downstream-side air-fuel ratio sensor is in a normal state or in an abnormal state;

means for prohibiting the calculation of said air-fuel ratio feedback control parameter when said downstream-side air-fuel ratio sensor is in an abnormal state;

means for calculating an average value or blunt value of said air-fuel ratio feedback control parameter when said downstream-side air-fuel ratio sensor is in a normal state;

means for holding the average value or blunt value of said air-fuel ratio feedback control parameter when said downstream-side air-fuel ratio sensor is in an abnormal state; and means for adjusting an actual air-fuel ratio in accordance with said air-fuel ratio feedback correction amount and said calculated air-fuel ratio feedback control parameter when said downstream-side air-fuel ratio sensor is in an normal state, or in accordance with said air-fuel ratio feedback correction amount and said held average or blunt value as said air-fuel ratio feedback control parameter when said downstream-side air-fuel ratio sensor is an abnormal state.

106. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordane with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

means for renewing an average value or blunt value of said air-fuel ratio feedback control parameter when said downstream-side air-fuel ratio sensor is in a normal state;

means for holding the average value or blunt value of said air-fuel ratio feedback control parameter when said downstream-side air-fuel ratio sensor is in an abnormal state; and further comprising means for determining whether or not a vehicle speed is within a predetermined range, said renewing means renewing said average value or blunt value of said air-fuel ratio feedback control parameter only when the vehicle speed is within said predetermined range.

107. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibitiing the calculation of said air-fuel ratio feedback control parameter when said downstream-side air-fuel ratio sensor is in an abnormal state;

means for forcibly changing the actual air-fuel ratio when said downstream-side air-fuel ratio sensor is in an abnormal state;

means for pulling down the output of said downstream-side air-fuel ratio sensor via a resistor thereby generating a lean signal during a nonactive mode, said air-fuel ratio forcible-change means changing the actual air-fuel ratio on the rich side;

further comprising means for determining whether or not a predetermined time period has passed after a coolant temperature of said engine becomes higher than a predetermined temperature, said air-fuel ratio forcible-change means changing the actual air-fuel ratio on the rich side, only when said predetermined time period has passed.

108. An apparatus for controlling an air-fuel ratio in an internal combustion engine having a catalyst converter for removing pollutants in an exhaust gas, and upstream-side and downstream-side air-fuel ratio sensors disposed upstream and downstream, respectively, of said catalyst converter for detecting a concentration of a specific component in the exhaust gas, comprising:

means for comparing an output of said upstream-side air-fuel ratio sensor with a first predetermined reference voltage;

means for calculating an air-fuel ratio feedback correction amount in accordance with the comparison result of the output of said upstream-side air-fuel ratio sensor with said first predetermined reference voltage;

means for comparing an output of said downstream-side air-fuel ratio sensor with a second predetermined reference voltage;

means for calculating, in accordance with the comparison result of the output of said downstream-side air-fuel ratio sensor, at least one air-fuel ratio feedback control parameter of delay time periods for which the comparison result of the output of said upstream-side air-fuel ratio sensor is delayed, skip amounts by which said air-fuel ratio feedback correction amount is skipped at a switching of the comparison result of said upstream-side air-fuel ratio sensor, and integration amounts by which said air-fuel ratio feedback correction amount is gradually changed in accordance with the comparison result of the output of said upstream-side air-fuel ratio sensor;

means for adjusting the actual air-fuel ratio in accordance with said air-fuel ratio feedback correction amount and said air-fuel ratio feedback control parameter;

means for determining whether said downstream-side air-fuel ratio sensor is in a normal state or in an abnormal state; and means for prohibiting the calculation of said air-fuel ratio feedback control parameter when said downstream-side air-fuel ratio sensor is in an abnormal state;

means for forcibly changing the actual air-fuel ratio when said downstream-side air-fuel ratio sensor is in an abnormal state;

means for pulling up the output of said downstream-side air-fuel ratio sensor via a resistor thereby generating a rich signal during a nonactive mode, said air-fuel ratio forcible-change means changing the actual air-fuel ratio on the lean side;

further comprising means for determining whether or not a predetermined time period has passed after the coolant temperature of said engine becomes higher than a predetermined temperature, said air-fuel ratio forcible-change means changing the actual air-fuel ratio on the rich side, only when said predetermined time period has passed.

* * * * *

UNITED STATES PATENT AND TRADEMARK OFFICE
CERTIFICATE OF CORRECTION

PATENT NO. : 4,739,614

DATED : April 26, 1988

INVENTOR(S) : KATSUNO et al

It is certified that error appears in the above-identified patent and that said Letters Patent is hereby corrected as shown below:

On the Title Page, item [30]

In the foreign Application Priority Data, line 11, change "JP" to --JU--.

Signed and Sealed this

Fourth Day of October, 1988

Attest:

DONALD J. QUIGG

*Attesting Officer*  *Commissioner of Patents and Trademarks*